("12") United States Patent  
Arakawa et al.

(10) Patent No.: US 9,250,806 B2  
(45) Date of Patent: Feb. 2, 2016

(54) COMPUTER-READABLE RECORDING MEDIUM, INFORMATION PROCESSING DEVICE, AND SYSTEM

(71) Applicant: FUJITSU LIMITED, Kawasaki-shi, Kanagawa (JP)

(72) Inventors: Masanao Arakawa, Akashi (JP); Takahiro Igarashi, Kobe (JP); Hayato Okada, Ikeda (JP); Yoshihide Tomiyama, Kobe (JP); Yasushi Yoneda, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 13/928,075

(22) Filed: Jun. 26, 2013

(65) Prior Publication Data

US 2014/0013065 A1 Jan. 9, 2014

(30) Foreign Application Priority Data

Jul. 5, 2012 (JP) .................................. 2012-151862

(51) Int. Cl.  
*G06F 12/00* (2006.01)  
*G06F 3/06* (2006.01)  
*G06F 21/62* (2013.01)

(52) U.S. Cl.  
CPC ............ *G06F 3/0604* (2013.01); *G06F 3/0644* (2013.01); *G06F 3/0673* (2013.01); *G06F 21/6254* (2013.01)

(58) Field of Classification Search  
CPC ..................................... G06F 5/14; G06F 9/50  
See application file for complete search history.

(56) References Cited

FOREIGN PATENT DOCUMENTS

| JP | 2007-141192 | 6/2007 |
|---|---|---|
| JP | 2007-219636 | 8/2007 |
| JP | 2007-287102 | 11/2007 |
| JP | 2009-181207 | 8/2009 |

*Primary Examiner* — Yong Choe  
(74) *Attorney, Agent, or Firm* — Staas & Halsey LLP

(57) ABSTRACT

An information processing device causes a computer to count the number of data having a predetermined relation on data included in a first data group. Further, when the counted number is N (N is a natural number) or more, the information processing device outputs a plurality of data having a predetermined relation to an output destination. Further, the information processing device counts the number of data having a predetermined relation on data included in the first data group and a second data group different from the first data group. Further, when the number of data having a predetermined relation which is counted on the data included in the first data group and the second data group is N or more, the information processing device output the data included in the second data group among a plurality of data having a predetermined relation to the output destination.

12 Claims, 41 Drawing Sheets

FIG.3

| NO. | INDIVIDUAL ID | NAME | SEX | AGE | HEIGHT | WEIGHT |
|---|---|---|---|---|---|---|
| 1 | 1098 | A | MALE | 29 | 169 | 62 |
| 2 | 1234 | B | FEMALE | 39 | 154 | 46 |
| 3 | 3210 | C | MALE | 21 | 174 | 64 |
| 4 | 3456 | D | MALE | 45 | 164 | 73 |
| 5 | 5432 | E | FEMALE | 32 | 156 | 48 |
| 6 | 5478 | F | MALE | 28 | 162 | 60 |
| 7 | 7654 | G | FEMALE | 24 | 161 | 49 |
| 8 | 7890 | H | FEMALE | 22 | 160 | 60 |
| 9 | 9012 | I | FEMALE | 27 | 160 | 40 |
| 10 | 9876 | J | MALE | 31 | 163 | 60 |

FIG.4

| INDIVIDUAL ID | UPDATE CONTENT |
|---|---|
| 1098 | AGE = 30 |

FIG.5

| INDIVIDUAL ID | UPDATE CONTENT |
|---|---|
| 1098 | DELETION |

FIG.6

| NO. | SEX | AGE | HEIGHT | WEIGHT | RECORD MANAGEMENT ID |
|---|---|---|---|---|---|
| 1 | MALE | 20 TO 29 | 160 TO 169 | 60 TO 69 | aaa01 |
| 2 | FEMALE | 30 TO 39 | 150 TO 159 | 40 TO 49 | aaa02 |
| 3 | MALE | null | null | null | aaa03 |
| 4 | MALE | null | null | null | aaa04 |
| 5 | FEMALE | 30 TO 39 | 150 TO 159 | 40 TO 49 | aaa05 |
| 6 | MALE | 20 TO 29 | 160 TO 169 | 60 TO 69 | aaa06 |
| 7 | FEMALE | 20 TO 29 | 160 TO 169 | 40 TO 49 | aaa07 |
| 8 | FEMALE | null | null | null | aaa08 |
| 9 | FEMALE | 20 TO 29 | 160 TO 169 | 40 TO 49 | aaa09 |
| 10 | MALE | null | null | null | aaa10 |

FIG.8

| NO. | SEX | AGE | HEIGHT | WEIGHT | RECORD MANAGEMENT ID |
|---|---|---|---|---|---|
| 1 | MALE | 20 TO 29 | 160 TO 169 | 60 TO 69 | aaa01 |
| 2 | FEMALE | 30 TO 39 | 150 TO 159 | 40 TO 49 | aaa02 |
| 3 | MALE | 20 TO 29 | 170 TO 179 | 60 TO 69 | aaa03 |
| 4 | MALE | 40 TO 49 | 160 TO 169 | 70 TO 79 | aaa04 |
| 5 | FEMALE | 30 TO 39 | 150 TO 159 | 40 TO 49 | aaa05 |
| 6 | MALE | 20 TO 29 | 160 TO 169 | 60 TO 69 | aaa06 |
| 7 | FEMALE | 20 TO 29 | 160 TO 169 | 40 TO 49 | aaa07 |
| 8 | FEMALE | 20 TO 29 | 160 TO 169 | 60 TO 69 | aaa08 |
| 9 | FEMALE | 20 TO 29 | 160 TO 169 | 40 TO 49 | aaa09 |
| 10 | MALE | 30 TO 39 | 160 TO 169 | 60 TO 69 | aaa10 |

FIG.9

| DUPLICATION NUMBER | | |
|---|---|---|
| 2 | | |
| ITEM NAME | VERIFICATION | ANONYMIZATION |
| SEX | YES | NO |
| AGE | YES | YES |
| HEIGHT | YES | YES |
| WEIGHT | YES | YES |
| RECORD MANAGEMENT ID | NO | NO |

| SEX | AGE | HEIGHT | WEIGHT | DUPLICATION NUMBER |
|---|---|---|---|---|
| MALE | 20 TO 29 | 170 TO 179 | 60 TO 69 | 1 |
| MALE | 40 TO 49 | 160 TO 169 | 70 TO 79 | 1 |
| FEMALE | 20 TO 29 | 160 TO 169 | 60 TO 69 | 1 |
| MALE | 30 TO 39 | 160 TO 169 | 60 TO 69 | 1 |
| MALE | 20 TO 29 | 160 TO 169 | 60 TO 69 | 2 |
| FEMALE | 20 TO 29 | 160 TO 169 | 40 TO 49 | 2 |
| FEMALE | 30 TO 39 | 150 TO 159 | 40 TO 49 | 2 |

| SEX | AGE | HEIGHT | WEIGHT | RECORD MANAGEMENT ID |
|---|---|---|---|---|
| MALE | 20 TO 29 | 170 TO 179 | 60 TO 69 | aaa03 |
| MALE | 40 TO 49 | 160 TO 169 | 60 TO 69 | aaa04 |
| FEMALE | 20 TO 29 | 160 TO 169 | 60 TO 69 | aaa08 |
| MALE | 30 TO 39 | 160 TO 169 | 60 TO 69 | aaa10 |

| NO. | INDIVIDUAL ID | RECORD MANAGEMENT ID |
|---|---|---|
| 1 | 1098 | aaa01 |
| 2 | 1234 | aaa02 |
| 3 | 3210 | aaa03 |
| 4 | 3456 | aaa04 |
| 5 | 5432 | aaa05 |
| 6 | 5678 | aaa06 |
| 7 | 7654 | aaa07 |
| 8 | 7890 | aaa08 |
| 9 | 9012 | aaa09 |
| 10 | 9876 | aaa10 |

| SEX | AGE | HEIGHT | WEIGHT | DUPLICATION NUMBER |
|---|---|---|---|---|
| MALE | 20 TO 29 | 170 TO 179 | 60 TO 69 | 1 |
| MALE | 40 TO 49 | 160 TO 169 | 70 TO 79 | 1 |
| FEMALE | 20 TO 29 | 160 TO 169 | 60 TO 69 | 1 |
| MALE | 30 TO 39 | 160 TO 169 | 60 TO 69 | 1 |
| MALE | 20 TO 29 | 160 TO 169 | 60 TO 69 | 1 |
| FEMALE | 20 TO 29 | 160 TO 169 | 40 TO 49 | 2 |
| FEMALE | 30 TO 39 | 150 TO 159 | 40 TO 49 | 2 |

FIG.14

| SEX | AGE | HEIGHT | WEIGHT | RECORD MANAGEMENT ID |
|---|---|---|---|---|
| MALE | 20 TO 29 | 170 TO 179 | 60 TO 69 | aaa03 |
| MALE | 40 TO 49 | 160 TO 169 | 60 TO 69 | aaa04 |
| MALE | 20 TO 29 | 160 TO 169 | 60 TO 69 | aaa06 |
| FEMALE | 20 TO 29 | 160 TO 169 | 60 TO 69 | aaa08 |
| MALE | 30 TO 39 | 160 TO 169 | 60 TO 69 | aaa10 |

FIG.15

| NO. | SEX | AGE | HEIGHT | WEIGHT | RECORD MANAGEMENT ID |
|---|---|---|---|---|---|
| 1 | MALE | 20 TO 29 | 160 TO 169 | 60 TO 69 | aaa01 |
| 2 | FEMALE | 30 TO 39 | 150 TO 159 | 40 TO 49 | aaa02 |
| 3 | MALE | null | null | null | aaa03 |
| 4 | MALE | null | null | null | aaa04 |
| 5 | FEMALE | 30 TO 39 | 150 TO 159 | 40 TO 49 | aaa05 |
| 6 | MALE | null | null | null | aaa06 |
| 7 | FEMALE | 20 TO 29 | 160 TO 169 | 40 TO 49 | aaa07 |
| 8 | FEMALE | null | null | null | aaa08 |
| 9 | FEMALE | 20 TO 29 | 160 TO 169 | 40 TO 49 | aaa09 |
| 10 | MALE | null | null | null | aaa10 |

FIG.16

| SEX | AGE | HEIGHT | WEIGHT | RECORD MANAGEMENT ID |
|---|---|---|---|---|
| MALE | 20 TO 29 | 160 TO 169 | 60 TO 69 | aaa01 |

FIG.17

| SEX | AGE | HEIGHT | WEIGHT | RECORD MANAGEMENT ID |
|---|---|---|---|---|
| MALE | 30 | 160 TO 169 | 60 TO 69 | aaa01 |

FIG.18

| SEX | AGE | HEIGHT | WEIGHT | RECORD MANAGEMENT ID |
|---|---|---|---|---|
| MALE | 30 TO 39 | 160 TO 169 | 60 TO 69 | aaa01 |

| SEX | AGE | HEIGHT | WEIGHT | DUPLICATION NUMBER |
|---|---|---|---|---|
| MALE | 20 TO 29 | 170 TO 179 | 60 TO 69 | 1 |
| MALE | 40 TO 49 | 160 TO 169 | 70 TO 79 | 1 |
| FEMALE | 20 TO 29 | 160 TO 169 | 60 TO 69 | 1 |
| MALE | 30 TO 39 | 160 TO 169 | 60 TO 69 | 2 |
| MALE | 20 TO 29 | 160 TO 169 | 60 TO 69 | 1 |
| FEMALE | 20 TO 29 | 160 TO 169 | 40 TO 49 | 2 |
| FEMALE | 30 TO 39 | 150 TO 159 | 40 TO 49 | 2 |

FIG.20

| NO. | SEX | AGE | HEIGHT | WEIGHT | RECORD MANAGEMENT ID |
|---|---|---|---|---|---|
| 1 | MALE | 20 TO 29 | 160 TO 169 | 60 TO 69 | aaa01 |
| 2 | FEMALE | 30 TO 39 | 150 TO 159 | 40 TO 49 | aaa02 |
| 3 | MALE | null | null | null | aaa03 |
| 4 | MALE | null | null | null | aaa04 |
| 5 | FEMALE | 30 TO 39 | 150 TO 159 | 40 TO 49 | aaa05 |
| 6 | MALE | null | null | null | aaa06 |
| 7 | FEMALE | 20 TO 29 | 160 TO 169 | 40 TO 49 | aaa07 |
| 8 | FEMALE | null | null | null | aaa08 |
| 9 | FEMALE | 20 TO 29 | 160 TO 169 | 40 TO 49 | aaa09 |
| 10 | MALE | 30 TO 39 | 160 TO 169 | 60 TO 69 | aaa10 |

FIG.21

| NO. | SEX | AGE | HEIGHT | WEIGHT | RECORD MANAGEMENT ID |
|---|---|---|---|---|---|
| 1 | MALE | 30 TO 39 | 160 TO 169 | 60 TO 69 | aaa01 |
| 2 | FEMALE | 30 TO 39 | 150 TO 159 | 40 TO 49 | aaa02 |
| 3 | MALE | null | null | null | aaa03 |
| 4 | MALE | null | null | null | aaa04 |
| 5 | FEMALE | 30 TO 39 | 150 TO 159 | 40 TO 49 | aaa05 |
| 6 | MALE | null | null | null | aaa06 |
| 7 | FEMALE | 20 TO 29 | 160 TO 169 | 40 TO 49 | aaa07 |
| 8 | FEMALE | null | null | null | aaa08 |
| 9 | FEMALE | 20 TO 29 | 160 TO 169 | 40 TO 49 | aaa09 |
| 10 | MALE | 30 TO 39 | 160 TO 169 | 60 TO 69 | aaa10 |

FIG.33

| SEX | AGE | HEIGHT | WEIGHT | GROUP ID |
|---|---|---|---|---|
| MALE | 20 TO 29 | 170 TO 179 | 60 TO 69 | grp1 |
| MALE | 40 TO 49 | 160 TO 169 | 70 TO 79 | grp2 |
| FEMALE | 20 TO 29 | 160 TO 169 | 60 TO 69 | grp3 |
| MALE | 30 TO 39 | 160 TO 169 | 60 TO 69 | grp4 |
| MALE | 20 TO 29 | 160 TO 169 | 60 TO 69 | grp5 |
| FEMALE | 20 TO 29 | 160 TO 169 | 40 TO 49 | grp6 |
| FEMALE | 30 TO 39 | 150 TO 159 | 40 TO 49 | grp7 |

| RECORD MANAGEMENT ID |
|---|
| aaa03 |
| aaa04 |
| aaa08 |
| aaa10 |

| NO. | RECORD MANAGEMENT ID | GROUP ID |
|---|---|---|
| 1 | aaa01 | grp5 |
| 2 | aaa02 | grp7 |
| 3 | aaa03 | grp1 |
| 4 | aaa04 | grp2 |
| 5 | aaa05 | grp7 |
| 6 | aaa06 | grp5 |
| 7 | aaa07 | grp6 |
| 8 | aaa08 | grp3 |
| 9 | aaa09 | grp6 |
| 10 | aaa10 | grp4 |

| RECORD MANAGEMENT ID |
|---|
| aaa03 |
| aaa04 |
| aaa06 |
| aaa08 |
| aaa10 |

FIG.37

| NO. | RECORD MANAGEMENT ID | GROUP ID |
|---|---|---|
| 2 | aaa02 | grp7 |
| 3 | aaa03 | grp1 |
| 4 | aaa04 | grp2 |
| 5 | aaa05 | grp7 |
| 6 | aaa06 | grp5 |
| 7 | aaa07 | grp6 |
| 8 | aaa08 | grp3 |
| 9 | aaa09 | grp6 |
| 10 | aaa10 | grp4 |

| NO. | RECORD MANAGEMENT ID | GROUP ID |
|---|---|---|
| 1 | aaa01 | grp4 |
| 2 | aaa02 | grp7 |
| 3 | aaa03 | grp1 |
| 4 | aaa04 | grp2 |
| 5 | aaa05 | grp7 |
| 6 | aaa06 | grp5 |
| 7 | aaa07 | grp6 |
| 8 | aaa08 | grp3 |
| 9 | aaa09 | grp6 |
| 10 | aaa10 | grp4 |

| RECORD MANAGEMENT ID |
|---|
| aaa03 |
| aaa04 |
| aaa06 |
| aaa08 |

COMPUTER-READABLE RECORDING MEDIUM, INFORMATION PROCESSING DEVICE, AND SYSTEM

CROSS-REFERENCE TO RELATED APPLICATION

This application is based upon and claims the benefit of priority of the prior Japanese Patent Application No. 2012-151862, filed on Jul. 5, 2012, the entire contents of which are incorporated herein by reference.

FIELD

The embodiments discussed herein are directed to a control program, an information processing device, and a system.

BACKGROUND

In recent years, cloud computing has been increasingly used. In the cloud computing, when information in the company is released to the outside of the company, processing of anonymizing information specifying an individual and making it difficult to specify an individual is performed. As a technique of anonymizing and making it difficult to specify an individual, there is a technique of making information specifying an individual vague or removing information specifying an individual (for example, see Japanese Laid-open Patent Publication No. 2007-287102, Japanese Laid-open Patent Publication No. 2007-219636, and Japanese Laid-open Patent Publication No. 2007-141192). As another technique of anonymizing and making it difficult to specify an individual, there is a technique of converting a numerical value specifying an individual into a kana character.

FIG. 51 is a diagram for describing an example of an anonymizing technique. Individual information to be anonymized is illustrated on the left of the example of FIG. 51. For example, individual information to be anonymized illustrated in the example of FIG. 51 is information such as a medical checkup. The individual information to be anonymized illustrated in the example of FIG. 51 includes various items such as "name," "height," "weight," and "age." A person's name is registered to the item of "name." The height of the person whose name is registered to the item of "name" is registered to the item of "height." The weight of the person whose name is registered to the item of "name" is registered to the item of "weight." An age of the person whose name is registered to the item of "name" is registered to the item of "age."

When the individual information illustrated on the left of the example of FIG. 51 is anonymized, anonymous data illustrated in the right of the example of FIG. 51 is obtained. The anonymous data illustrated in the example of FIG. 51 represents an example in which information registered to the item of "name" of the individual information is discarded, and information registered to the items of "height," "weight," and "age" becomes vague.

Further, even when the individual information is processed into anonymous data, it may be possible to specify an individual through collation with other information (hereinafter, referred to as "collation easiness"). For example, in the anonymous data illustrated in the example of FIG. 51, even when information in which a name is "A" and the height of a person is "175 cm" is collated with the anonymous data, since there are two records of the anonymous data representing that the height is "175 cm," it is difficult to specify a corresponding record. Similarly, even when information in which a name is "B" and the height of a person is "173 cm" is collated with the anonymous data, since there are two records of the anonymous data representing that the height is "173 cm," it is difficult to specify a corresponding record. However, when information in which a name is "C" and the height of a person is "182 cm" is collated with the anonymous data, since there is only one record of the anonymous data representing that the height is "182 cm," it is possible to specify a corresponding record. Further, when information in which a name is "D" and the height of a person is "169 cm" is collated with the anonymous data, since there is only one record of the anonymous data representing that the height is "169 cm," it is possible to specify a corresponding record.

Here, there is no objective criterion on whether or not there is "collation easiness," and it is difficult to determine whether or not anonymous data can be safely used. The "collation easiness" has the following points of view:

(1) whether or not it is an environment in which it is possible to easily collate with other information; and (2) whether or not it is possible to identify an individual as a result of collating with other information.

In the point of view of (1), since the collation easiness is rejected by performing a countermeasure including data manage (a collation right, a collation range, and an information leakage countermeasure), it is difficult to perform determination based on only a specification of software generating anonymous data. The point of view of (2) is referred to as an "individual identifiability." When anonymous data is generated, safe anonymous data can be generated by performing processing of discarding the record in which an individual is likely to be identified. Thus, even when it is possible to easily collate with other information or even when information identifying an individual leaks out, since it is difficult to specify an individual, anonymous data can be safely used.

As a technique of processing anonymous data, for example, there is a technique of processing anonymous data by determining and removing information in which an individual is likely to be specified when the information is collated with individual information.

Further, known is a technique of verifying an individual identifiability based on duplication of records in anonymous data and then processing data is also known (for example, see Japanese Laid-open Patent Publication No. 2009-181207). This technique uses the principle in which a duplication number that records are duplicated in anonymous data is N or more, since N or more results are obtained as a result of collating with individual information, it is difficult to identify an individual from anonymous data.

Specifically, processing illustrated in FIG. 52 is performed. Anonymous data illustrated on the left of FIG. 52 includes 3 records, and two upper rows are the same. Since it is determined that there is no individual identifiability when the two or more records are the same, the records are added to verified anonymous data as "OK." However, since a record of ABCD is present in only one row, there is an individual identifiability, and thus the record is determined as "NG." In this case, for example, attribute values B and C of some of ABCD are converted into X, and a record of AXXD is added to verified anonymous data. Meanwhile, the record of ABCD is discarded. This processing method is effective when records previously accumulated in a single database are processed.

However, there is a problem when data appropriately collected from various business systems is anonymized and then output to another system that uses anonymized data. For example, when the three records illustrated on the left of FIG. 52 are first collected and then subjected to the above-described processing, data illustrated on the right of FIG. 52 is output to another system. Thereafter, when three records illustrated on the left of FIG. 53 are newly collected and then subjected to the above-described processing, since two upper rows are the same, it is determined that there is no individual identifiability, and thus the records are added to verified anonymous data as "OK." However, since a record of ABCD is present in only one row, there is an individual identifiability, and the record is determined as "NG." In this case, some attribute values B and C are converted into X, and a record of AXXD is added to verified anonymous data. Then, the record of ABCD is discarded. As described above, the record of ABCD appears twice, but since the records differ in collection timing, the record of "AXXD" is registered to verified anonymous data twice. In this case, information such as ABCD is lost, and this causes a problem in statistical processing or the like in another system. For example, a problem occurs in statistical processing or the like when a large amount of data is determined not to satisfy a predetermined inter-data condition such as a "match of data" among pieces of data included in a collected data group.

SUMMARY

According to an aspect of an embodiment, a computer-readable recording medium stores therein a control program causing a computer to execute a process including counting the number of data having a predetermined relation on data included in a first data group; performing control such that a plurality of data having the predetermined relation is output to an output destination when the counted number is N (N is a natural number) or more; counting the number of data having a predetermined relation on data included in the first data group and a second data group different from the first data group; and performing control such that data included in the second data group among a plurality of data having the predetermined relation is output to the output destination when the number of data having the predetermined relation which is counted on the data included in the first data group and the second data group is N or more.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of data to be transmitted from a server to an information processing device;

FIG. 4 is a diagram illustrating an example of the update data;

FIG. 5 is a diagram illustrating an example of the deletion data;

FIG. 6 is a diagram illustrating an example of a data structure of data to be transmitted from an information processing device to a server;

FIG. 8 is a diagram illustrating an example of a data structure of anonymous data;

FIG. 9 is a diagram illustrating an example of a data structure of definition data;

FIG. 10 is a diagram illustrating an example of a data structure of a duplication number TBL;

FIG. 11 is a diagram illustrating an example of a data structure of a NG data TBL;

FIG. 12 is a diagram illustrating an example of a data structure of an ID TBL;

FIG. 13 is a diagram illustrating an example of an updated duplication number TBL;

FIG. 14 is a diagram illustrating an example of an NG data TBL including an added record;

FIG. 15 is a diagram illustrating an example of updated data;

FIG. 16 is a diagram for describing an example of a process executed by the information processing device according to the first embodiment;

FIG. 17 is a diagram for describing an example of a process executed by the information processing device according to the first embodiment;

FIG. 18 is a diagram for describing an example of a process executed by the information processing device according to the first embodiment;

FIG. 19 is a diagram for describing an example of a process executed by the information processing device according to the first embodiment;

FIG. 20 is a diagram for describing an example of a process executed by the information processing device according to the first embodiment;

FIG. 21 is a diagram for describing an example of a process executed by the information processing device according to the first embodiment;

FIG. 33 is a diagram illustrating an example of a data structure of a group ID TBL;

FIG. 34 is a diagram illustrating an example of a data structure of an NGID TBL;

FIG. 35 is a diagram illustrating an example of a data structure of a group ID string TBL;

FIG. 36 is a diagram for describing an example of a process executed by the information processing device according to the second embodiment;

FIG. 37 is a diagram illustrating an example of the registration content of a group ID string TBL;

FIG. 38 is a diagram illustrating an example of the registration content of the group ID string TBL;

FIG. 39 is a diagram for describing an example of a process executed by the information processing device according to the second embodiment;

DESCRIPTION OF EMBODIMENTS

Preferred embodiments of the present invention will be explained with reference to accompanying drawings. The following embodiments are not intended to limit techniques of the disclosure. The techniques disclosed in the following embodiments may be combined.

[a] First Embodiment

Figure 1:
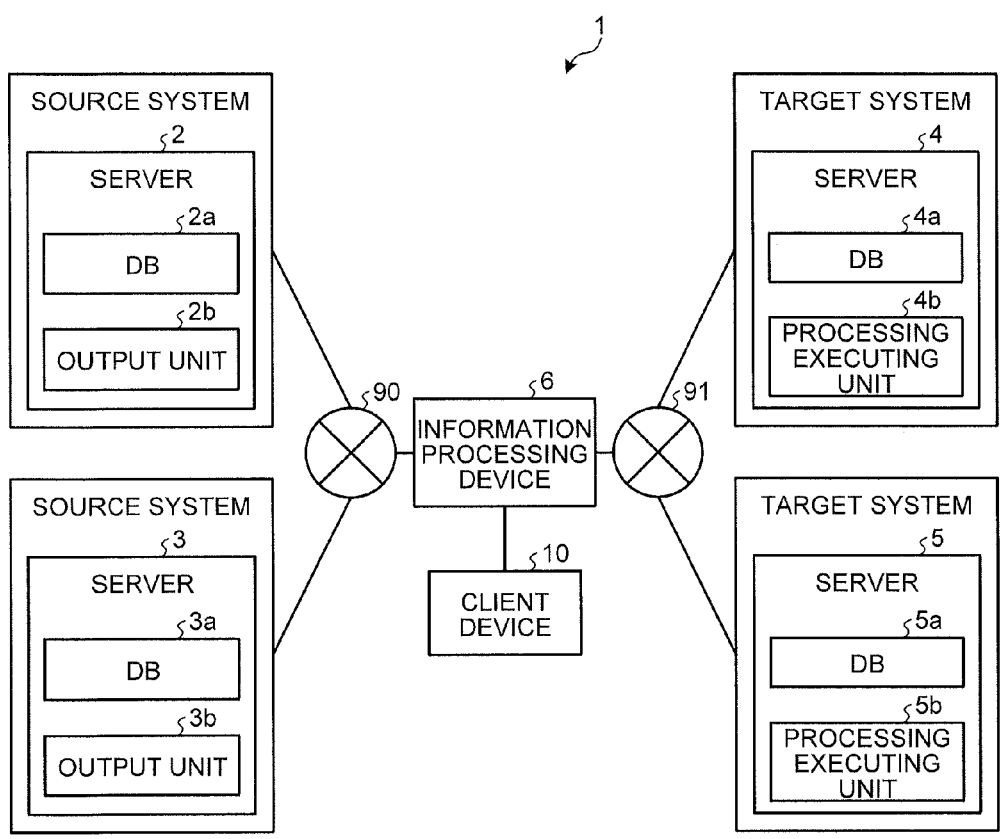
FIG. 1 is a diagram illustrating an example of a configuration of a system according to a first embodiment.

A system according to the first embodiment will be described. FIG. 1 is a diagram illustrating an example of a configuration of the system according to the first embodiment. A system 1 illustrated in the example of FIG. 1 includes servers 2 and 3 in a source system, servers 4 and 5 in a target system, an information processing device 6, and a client device 10. The number of the server 2, the server 3, the server 4, the server 5, the information processing device 6 and the client device 10 in the system 1 is not limited to one as illustrated in FIG. 1, and an arbitrary number of servers or devices may be employed. The server 2 and the server 3 are connected with the information processing device 6 via a network 90. In other words, the server 2 and the server 3 are able to perform communication with the information processing device 6. Further, the server 4 and the server 5 are connected with the information processing device 6 via a network 91. In other words, the server 4 and the server 5 are able to perform communication with the information processing device 6. The information processing device 6 and the client device 10 are connected with each other and able to perform communication with each other. The information processing device 6 can be connected with the servers 2 to 5 and the client device 10 via an arbitrary communication network such as a wireless communication network as well as a wired communication network.

Figure 2A:
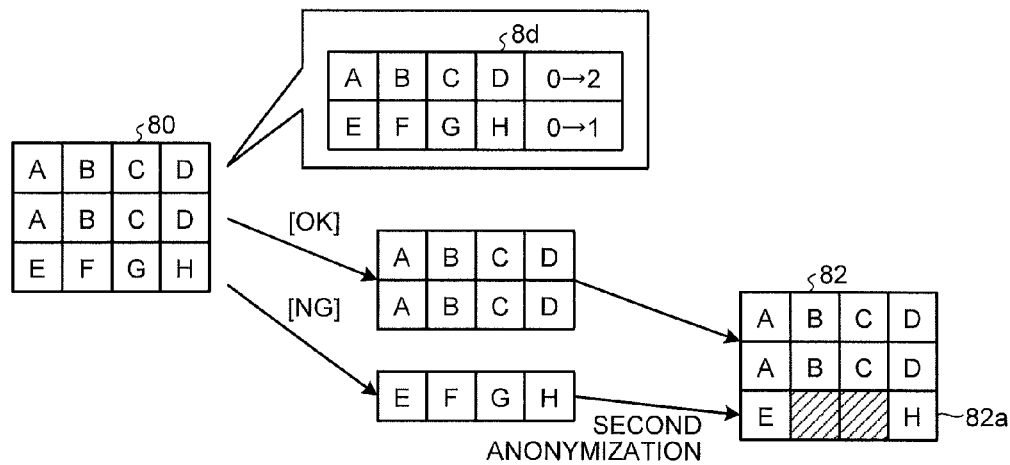
FIG. 2A is a diagram for describing an example of a process executed by an information processing device of the system according to the first embodiment.
Figure 2B:
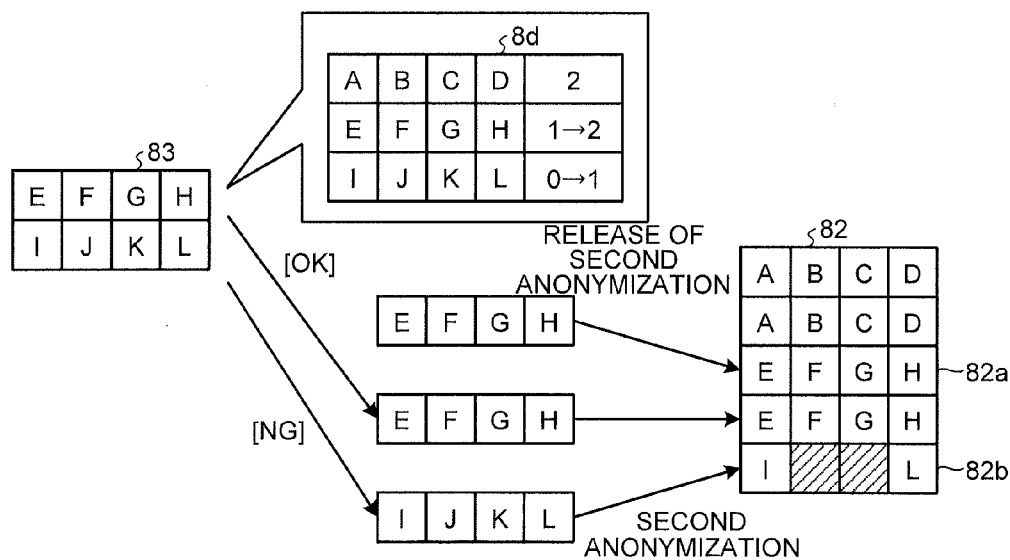
FIG. 2B is a diagram for describing an example of a process executed by the information processing device of the system according to the first embodiment.
Figure 2C:
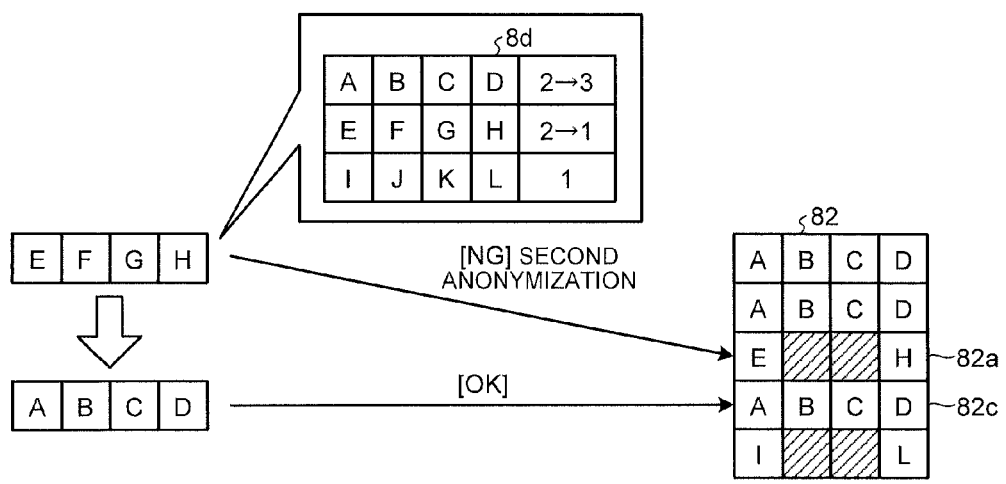
FIG. 2C is a diagram for describing an example of a process executed by the information processing device of the system according to the first embodiment.

FIGS. 2A to 2C are diagrams for describing an example of a process executed by an information processing device of the system according to the first embodiment. The information processing device 6 collects data from the server 2 and the server 3 of the source system. Then, the information processing device 6 anonymizes the collected data. Then, the information processing device 6 executes the following process on the anonymized data, and then distributes the processed data to the server 4 and the server 5 of the target system. For example, when three records are collected, the information processing device 6 anonymizes the collected records, and generates anonymous data 80 as illustrated in the example of FIG. 2A. Here, the anonymous data 80 is not only data which has been subjected to a data converting process for anonymization, but also data which is converted into a value range corresponding to an attribute value, converted into a kana character, or obtained by discarding some attributes of a record. In the example of FIG. 2A, the anonymous data 80 includes two records including attribute values of ABCD and a record including attribute values of EFGH.

Further, the information processing device 6 counts of a duplication number of records of the anonymous data 80. Then, the information processing device 6 registers the counting result to a duplication number table (TBL) 8d, which is a record duplication number counter, provided in the information processing device 6. In the following description, "table" is abbreviated to "TBL." The information processing device 6 registers a duplication number "2" of the records including the attribute values of ABCD to the duplication number TBL 8d as illustrated in the example of FIG. 2A. Further, the information processing device 6 registers a duplication number "1" of the records including the attribute values of EFGH to the duplication number TBL 8d.

Next, the information processing device 6 verifies whether or not each of the records of the anonymous data 80 is the record in which an individual is likely to be identified. For example, the information processing device 6 determines whether or not the duplication number of each record is N (N is a natural number) or more with reference to the duplication number TBL 8d as illustrated in the example of FIG. 2A. The following description will proceed with an example in which a value of N is "2." The information processing device 6 determines "OK," that is, determines that an individual is unlikely to be identified on the two records including the attribute values of ABCD for which the duplication number is N or more, and distributes the records to the server 4 and the server 5 without performing the second anonymization.

Meanwhile, the information processing device 6 determines "NG," that is, determines that an individual is likely to be identified on the record including the attribute values of EFGH for which the duplication number is less than N, and distributes the record to the server 4 and the server 5 after performing the second anonymization. As a result, a verified anonymous data 82 is accumulated in the server 4 and the server 5 as illustrated in the example of FIG. 2A. Further, a record 82a in which attribute values of FG are discarded from the attribute values of EFGH as a result of performing the second anonymization is included in the verified anonymous data 82 as illustrated in the example of FIG. 2A.

Then, when two records are newly collected from the server 2 or the server 3, the information processing device 6 anonymizes the collected records, and generates anonymous data 83 as illustrated in the example of FIG. 2B. In the example of FIG. 2B, the anonymous data 83 includes a record including attribute values of EFGH and a record including attribute values of IJKL.

Then, the information processing device 6 counts of a duplication number of the records of the anonymous data 83. Thereafter, the information processing device 6 reflects the counting result in the duplication number TBL 8d. In other words, as illustrated in the example of FIG. 2B, the information processing device 6 updates the duplication number of the record including the attribute values of EFGH in the duplication number TBL 8d from "1" to "2," and registers "1" as the duplication number of the record including the attribute values of IJKL.

Next, the information processing device 6 verifies whether or not each of the records of the anonymous data 83 is the record in which an individual is likely to be identified. For example, the information processing device 6 determines whether or not the duplication number of each record is N or more with reference to the duplication number TBL 8d as illustrated in the example of FIG. 2B. The information processing device 6 determines "OK" on the record including the attribute values of EFGH for which the duplication number is N or more, and distributes the record to the server 4 and the server 5 without performing the second anonymization. Further, for the record including the attribute values of EFGH, since an individual is unlikely to be identified, the information processing device 6 transmits an instruction for releasing second anonymization of the record 82a accumulated in the server 4 and the server 5 to the server 4 and the server 5. Thus, as illustrated in FIG. 2B, the server 4 and the server 5 release the second anonymization of the record 82a. In other words, the server 4 and the server 5 register the discarded attribute values of FG to the record 82a.

Through the above-described processing, the information processing device 6 can suppress the amount of data determined not to satisfy a predetermined inter-data condition such as a "match of data" among pieces of data included in a collected data group. As a result, more records can be effectively used for predetermined processing such as statistical processing or the like in the server 4 and the server 5 of the target system.

Meanwhile, the information processing device 6 determines "NG," that is, determines that an individual is likely to be identified on the record of IJKL for which the duplication number is less than N, and distributes the record to the server 4 and the server 5 after performing the second anonymization. As a result, the verified anonymous data 82 is accumulated in the server 4 and the server 5 as illustrated in the example of FIG. 2B. Further, a record 82b in which attribute values of JK are discarded from the attribute values of IJKL as a result of performing the second anonymization is included in the verified anonymous data 82 as illustrated in the example of FIG. 2B.

Here, the server 2 and the server 3 update or delete data stored in its database according to an instruction from the user. For example, when an instruction of updating a record including attribute values of efgh to a record including attribute values of abcd is received from the user, the server 2 and the server 3 perform the following processing. In other words, the server 2 and the server 3 update the record including the attribute values of efgh stored in its database to the record including the attribute values of abcd. In this case, the record including the attribute values of efgh before the update corresponds to a record in which the record including the attribute values of EFGH of the anonymous data 80 illustrated in the example of FIG. 2A is not anonymized. Further, the record including the attribute values of abcd is converted into the record including the attribute values of ABCD when anonymization is performed. Then, the server 2 and the server 3 transmit update data representing that the record including the attribute values of efgh has been updated to the record including the attribute values of abcd to the information processing device 6.

Upon receiving the update data representing that the record including the attribute values of efgh has been updated to the record including the attribute values of abcd, the information processing device 6 performs the following processing. In other words, the information processing device 6 instructs the server 4 and the server 5 to update the records accumulated in the server 4 and the server 5 based on the update represented by the received update data. Here, the update data received by the information processing device 6 represents that the record including the attribute values of EFGH accumulated in the server 4 and the server 5 is updated to the record including the attribute values of ABCD. In other words, the update data received by the information processing device 6 means that one record including the attribute values of EFGH included in the data group accumulated in the server 4 and the server 5 is deleted, and one record including the attribute values of ABCD is added. Thus, the information processing device 6 that has received the update data updates the duplication number of the record including the attribute values of EFGH of the duplication number TBL 8d from "2" to "1," and updates the duplication number of the record including the attribute values of ABCD from "2" to "3" as illustrated in the example of FIG. 2C.

Then, the information processing device 6 determines whether or not the duplication number of the record including the attribute values of EFGH before the update and the duplication number of the record including the attribute values of ABCD after the update are N or more with reference to the duplication number TBL 8d as illustrated in the example of FIG. 2C. Then, the information processing device 6 determines that the record including the attribute values of ABCD for which the duplication number is N or more is "OK," and distributes an instruction for updating the record including the attribute values of EFGH to the record including the attribute values of ABCD to the server 4 and the server 5. Thus, the server 4 and the server 5 update a record 82c including the attribute values of EFGH included in the verified anonymous data 82 to the record including the attribute values of ABCD as illustrated in FIG. 2C.

Further, the information processing device 6 determines that one record including the attribute values of EFGH for which the duplication number is less than N is "NG." Here, the duplication number of one record including the attribute values of EFGH changes "N" to "N−1" through the current update. In other words, the record including the attribute values of EFGH accumulated in the server 4 and the server 5 is the record that has not been subjected to the second anonymization, and increases in a possibility that an individual will be identified by the current update. For this reason, the information processing device 6 performs the second anonymization on one record including the attribute values of EFGH for which the duplication number is less than N. Then, the information processing device 6 transmits an instruction for updating the record including the attribute values of EFGH to a record in which the attribute values of FG are discarded from the attribute values of EFGH by the second anonymization to the server 4 and the server 5. As a result, the server 4 and the server 5 update the record 82*a* to the record in which the attribute values of FG are discarded from the attribute values of EFGH by the second anonymization as illustrated in FIG. 2C.

As described above, when the update data serving as update-related information is received, the information processing device 6 determines whether or not the duplication numbers of the record before and after the update are N or more, and performs various kinds of processing according to the determination result. As described above, according to the information processing device 6, when the update data is received, it is possible to update data accumulated in the server 4 and the server 5. Thus, according to the information processing device 6, even when all updated records are not received, as the update data is received, it is possible to update data accumulated in the server 4 and the server 5 through the simple processing.

Further, according to the information processing device 6, it is possible to anonymize a record in which a possibility that an individual will be identified has newly increased by the update among the records accumulated in the server 4 and the server 5. Further, according to the information processing device 6, it is possible to release anonymity on a record in which a possibility that an individual will be identified has newly decreased by the update among the records accumulated in the server 4 and the server 5.

Referring back to FIG. 1, the server 2 includes a database 2*a* and an output unit 2*b*. In the following description, "database" is abbreviated to "DB." The DB 2*a* stores data in which an individual is likely to be identified such as individual information including a person's name, an address, or the like. The output unit 2*b* transmits the data stored in the DB 2*a* to the information processing device 6 via the network 90.

An example of a data structure of data to be transmitted from the server 2 to the information processing device 6 will be described. FIG. 3 is a diagram illustrating an example of a data structure of data to be transmitted from the server 2 to the information processing device 6. A record of data illustrated in the example of FIG. 3 includes items of "individual identification (ID)," "name," "sex," "age," "height," and "weight." An ID (an individual ID) identifying an individual is registered to the item of "individual ID." A name of the person represented by the individual ID registered to the item of "individual ID" is registered to the item of "name." A sex of the person represented by the individual ID registered to the item of "individual ID" is registered to the item of "sex." An age of the person represented by the individual ID registered to the item of "individual ID" is registered to the item of "age." The height of the person represented by the individual ID registered to the item of "individual ID" is registered to the item of "height." The weight of the person represented by the individual ID registered to the item of "individual ID" is registered to the item of "weight." A number registered to the item of "No" is added to easily identify a record for the sake of convenience and thus not actually included. A record in which a number in data in the example of FIG. 3 is "1" represents that a name of a person represented by an individual ID "1098" is "A," a sex is "male," an age is "29," the height is "169 cm," and the weight is "62 kg." As described above, information in which an individual is likely to be identified is registered to the record for which the number is "1." As illustrated in the example of FIG. 3, information in which an individual is likely to be identified is similarly registered to records including different numbers.

Further, when the user of the server 2 inputs an instruction for updating data stored in the DB 2*a* to the server 2, the server 2 update the data stored in the DB 2*a* according to the instruction. Then, the output unit 2*b* of the server 2 transmits the update data which is data representing the update content to the information processing device 6 via the network 90. FIG. 4 is a diagram illustrating an example of the update data. The update data illustrated in the example of FIG. 4 represents that the value registered to the item of "age" of the record including the individual ID "1098" illustrated in the example of FIG. 3 has been updated to "30."

Further, when the user of the server 2 inputs an instruction for deleting the data stored in the DB 2*a* to the server 2, the server 2 deletes the data stored in the DB 2*a* according to the instruction. Then, the output unit 2*b* of the server 2 transmits deletion data which is data representing deletion content to the information processing device 6 via the network 90. FIG. 5 is a diagram illustrating an example of the deletion data. The deletion data illustrated in the example of FIG. 5 represents that the record including the individual ID "1098" illustrated in the example of FIG. 3 has been deleted.

The server 3 includes a DB 3*a* and an output unit 3*b*. The DB 3*a* stores data in which an individual is likely to be identified such as individual information including a person's name, an address, or the like. The output unit 3*b* transmits the data stored in the DB 3*a* to the information processing device 6 via the network 90. For example, the output unit 3*b* transmits the data illustrated in the example of FIG. 3 to the information processing device 6 via the network 90.

Further, when the user of the server 3 inputs an instruction for updating data stored in the DB 3*a* to the server 3, the server 3 updates the data stored in the DB 3*a* according to the instruction. Then, the output unit 3*b* of the server 3 transmits the update data to the information processing device 6 via the network 90.

Further, when the user of the server 3 inputs an instruction for deleting the data stored in the DB 3*a* to the server 3, the server 3 deletes the data stored in the DB 3*a* according to the instruction. Then, the output unit 3*b* of the server 3 transmits the deletion data to the information processing device 6 via the network 90.

As described above, when the records are updated, the server 2 and the server 3 do not transmit all of the updated records to the information processing device 6 and transmits the update data smaller in data size than all of the updated records to the information processing device 6. Thus, the information processing device 6 can detect the content updated by the server 2 and the server 3 through a small amount of information.

Further, when the records are deleted, the server 2 and the server 3 do not transmit all of the deleted records to the information processing device 6 and transmits the deletion data smaller in data size than all of the deleted records to the information processing device 6. Thus, the information processing device 6 can detect the records deleted by the server 2 and the server 3 through a small amount of information.

The server 4 includes a DB 4*a* and a processing executing unit 4*b*. The server 4 receives data transmitted from the information processing device 6 via the network 91 and accumulates the received data in the DB 4*a*. The processing executing unit 4b executes predetermined processing such as statistical processing using the data accumulated in the DB 4a according to a request from another device (not illustrated) in asynchronization with a reception timing of data.

An example of a data structure of data transmitted from the information processing device 6 to the server 4 will be described. FIG. 6 is a diagram illustrating an example of a data structure of data transmitted from the information processing device 6 to the server 4. A record of data illustrated in the example of FIG. 6 includes items of "sex," "age," "height," "weight," and "record management ID." A record management ID is registered to the item of "record management ID." As will be described below, the record management ID is an ID which is generated in association with the individual ID for each individual ID in the information processing device 6. Further, the record management ID is used when processing for the information processing device 6 to cause the data accumulated in the server 4 and the server 5 to be updated or deleted is performed.

Further, a sex of the person represented by the individual ID corresponding to the record management ID registered to the item of "record management ID" is registered to the item of "sex." For example, a value obtained by making vague the age of the person represented by the individual ID corresponding to the record management ID registered to the item of "record management ID" or information of "null" representing discarding of age information is registered to the item of "age." For example, a value obtained by making vague the height of the person represented by the individual ID corresponding to the record management ID registered to the item of "record management ID" or information of "null" representing discarding of height information is registered to the item of "height." For example, a value obtained by making vague the weight of the person represented by the individual ID corresponding to the record management ID registered to the item of "record management ID" or information of "null" representing discarding of weight information is registered to the item of "weight."

In the data of the example of FIG. 6, a record for which the number is "1" represents that a sex of a person represented by an individual ID corresponding to the record management ID "aaa01" is "male," an age is "20 to 29," the height is "160 to 169 cm," and the weight is "60 to 69 kg." As described above, information obtained by making vague various kinds of information other than a sex is registered to the record for which the number is "1." Further, in the data of the example of FIG. 6, a record for which the number is "4" represents that a sex of a person represented by an individual ID corresponding to the record management ID "aaa04" is "male," an age, the height, and the weight are unclear. As described above, information related to the sex is registered to the record for which the number is "4," but information related to the age, the height, and the weight is not registered.

The server 5 includes a DB 5a and a processing executing unit 5b. The server 5 receives data transmitted from the information processing device 6 via the network 91, and accumulates the received data in the DB 5a. The processing executing unit 5b executes predetermined processing such as statistical processing using the data accumulated in the DB 5a according to a request from another device (not illustrated) in asynchronization with a reception timing of data. Further, data transmitted from the information processing device 6 to the server 5 is similar to data transmitted from the information processing device 6 to the server 4. For example, the data illustrated in the example of FIG. 6 is transmitted from the information processing device 6 to the server 5.

Referring back to FIG. 1, the client device 10 transmits an instruction for executing various kinds of processing to the information processing device 6 according to the user's operation. According to the user's operation, the client device 10 generates definition data 8c which will be described below, transmits the generated definition data 8c to the information processing device 6, and causes the information processing device 6 to store the definition data 8c.

The information processing device 6 collects data from the server 2 and the server 3 of the source system. Then, the information processing device 6 anonymizes the collected data. Further, the information processing device 6 executes various kinds of processing on the anonymized data, and then distributes the processed data to the server 4 and the server 5 of the target system.

Figure 7:
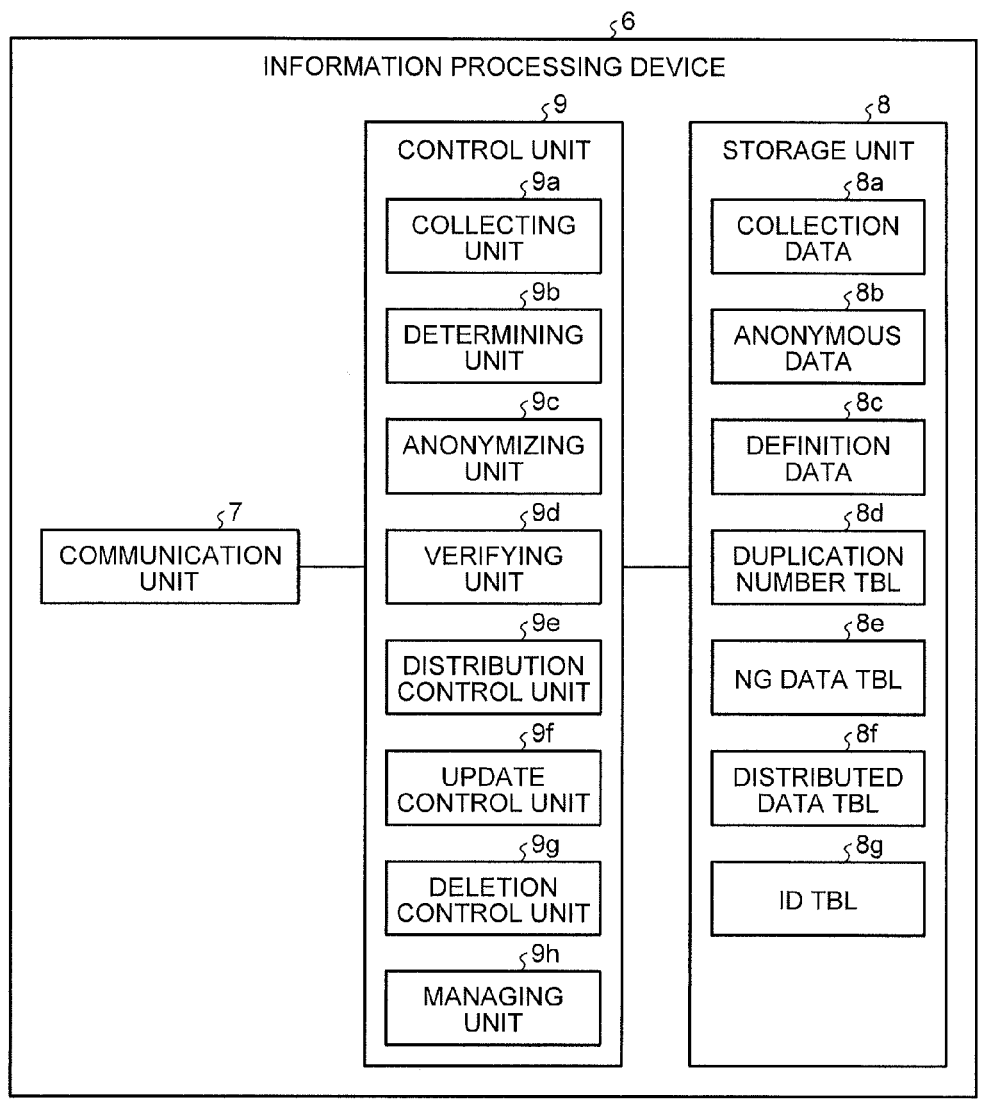
FIG. 7 is a diagram illustrating an example of a functional configuration of the information processing device according to the first embodiment.

FIG. 7 is a diagram illustrating an example of a functional configuration of the information processing device according to the first embodiment. The information processing device 6 includes a communication unit 7, a storage unit 8, and a control unit 9 as illustrated in the example of FIG. 7.

The communication unit 7 is an interface through which communication with the servers 2 to 5 and the client device 10 is performed. For example, when various kinds of data are received from the server 2 via the network 90, the communication unit 7 transmits the received data to the control unit 9. Similarly, when various kinds of data are received from the server 3 via the network 90, the communication unit 7 transmits the received data to the control unit 9. Further, when various kinds of data are received from a distribution control unit 9e which will be described below, the communication unit 7 transmits the received data to the server 4 and the server 5 via the network 91.

The storage unit 8 stores various kinds of information. For example, the storage unit 8 stores collection data 8a, anonymous data 8b, the definition data 8c, the duplication number TBL 8d, a NG data TBL 8e, a distributed data TBL 8f, and an ID TBL 8g.

The collection data 8a is data collected by a collecting unit 9a which will be described below. For example, the collection data 8a is data illustrated in FIG. 3.

The anonymous data 8b is data obtained by anonymizing updated anonymization target data which will be described below through an anonymizing unit 9c which will be described below. FIG. 8 is a diagram illustrating an example of a data structure of the anonymous data. The anonymous data 8b illustrated in the example of FIG. 8 is anonymized data obtained by anonymizing anonymization target data (which will be described below) obtained by updating the data illustrated in FIG. 3. The anonymous data 8b illustrated in the example of FIG. 8 is data obtained by performing processing of discarding the item of "name" and making vague the registration content of the items of "age," "height," and "weight" on the updated anonymization target data through the anonymizing unit 9c which will be described below.

The definition data 8c includes an item of a target to be anonymized through the anonymizing unit 9c which will be described below or the like, an item of a target to be verified by a verifying unit 9d which will be described below or the like, a threshold value of a duplication number of a record used when verification is performed by the verifying unit 9d which will be described below or the like. The definition data 8c is data generated by the client device 10 according to an operation of the user of the client device 10. The definition data 8c is stored in the storage unit 8 through a managing unit 9h which will be described below. FIG. 9 is a diagram illustrating an example of a data structure of the definition data.

The definition data 8c illustrated in the example of FIG. 9 includes a threshold value "2" of a duplication number of a record used when verification is performed by the verifying unit 9d which will be described below or the like.

Further, the definition data 8c illustrated in the example of FIG. 9 includes items of "item name," "verification," and "anonymization." A name of an item included in the anonymization target data is registered to the item of "item name." The example of FIG. 9 represents that names of the items of "sex," "age," "height," "weight," and "record management ID" are registered to "item name" of the definition data.

"YES" or "NO" is registered to the item of "verification." The definition data 8c illustrated in the example of FIG. 9 represents that items in which "YES" is registered to the item of "verification" among the items for which the names are registered to "item name" are to be verified. In other words, the definition data 8c illustrated in the example of FIG. 9 represents that the items of "sex," "age," "height," and "weight" in which "YES" is registered to the item of "verification" are to be verified.

"YES" or "NO" is registered to the item of "anonymization." The definition data 8c illustrated in the example of FIG. 9 represents that registration content of the item to which "YES" is registered is to be anonymized. The definition data 8c illustrated in the example of FIG. 9 represents that the items excluding the item in which "YES" or "NO" is registered to the item of "anonymization" among the items for which the names are registered to "item name" are to be discarded. The definition data 8c illustrated in the example of FIG. 9 represents that the items of "age," "height," and "weight" in which "YES" is registered to the item of "anonymization" are to be anonymized. Further, the definition data 8c illustrated in the example of FIG. 9 represents that the remaining item, for example, "name" is to be discarded.

A duplication number of a record is registered to the duplication number TBL 8d. FIG. 10 is a diagram illustrating an example of a data structure of the duplication number TBL. A record of the duplication number TBL 8d illustrated in the example of FIG. 10 includes items of "sex," "age," "height," and "weight" in which "YES" is registered to the item of "verification" among the items for which the names are registered to "item name" in the definition data 8c, and an item of "duplication number." For example, a first record of the duplication number TBL 8d illustrated in the example of FIG. 10 represents that the duplication number of the record of the sex "male," the age "20 to 29," the height "170 to 179," the weight "60 to 69" is "1."

Registration contents of the items of a record for which the duplication number is less than N among the records registered to the duplication number TBL 8d and a corresponding record management ID are registered to the NG data TBL 8e. FIG. 11 is a diagram illustrating an example of a data structure of the NG data TBL. A record of the NG data TBL 8e illustrated in the example of FIG. 11 includes the items of "sex," "age," "height," and "weight" except "duplication number" in the duplication number TBL 8d and the item of "record management ID." The NG data TBL 8e illustrated in the example of FIG. 11 represents that when the threshold value N of the duplication number is set to "2," registration content of a record for which the duplication number is less than 2, that is, is "1" in the duplication number TBL 8d illustrated in the example of FIG. 10 and a corresponding record management ID are registered.

Data to be transmitted to the server 4 and the server 5 is stored in the distributed data TBL 8f. For example, the data illustrated in the example of FIG. 6 is stored in the distributed data TBL 8f.

An individual ID and a record management ID are registered to the ID TBL 8g in association with each other. FIG. 12 is a diagram illustrating an example of a data structure of the ID TBL. A record of the ID TBL 8g illustrated in the example of FIG. 12 includes the items of "individual ID" and "record management ID." An individual ID is registered to the item of "individual ID." A record management ID is registered to the item of "record management ID." For example, the first record of the ID TBL 8g illustrated in the example of FIG. 12 represents that a record management ID corresponding to an individual ID "1098" is "aaa01."

For example, the storage unit 8 is a semiconductor memory device such as flash memory or a storage device such as a hard disk or an optical disk. The storage unit 8 is not limited to the storage devices of the above-mentioned types, and may be random access memory (RAM) or read only memory (ROM).

The control unit 9 includes internal memory that stores a program in which various processing procedures are specified and control data, and executes various kinds of processing based on the program and the control data. The control unit 9 includes the collecting unit 9a, a determining unit 9b, the anonymizing unit 9c, the verifying unit 9d, the distribution control unit 9e, an update control unit 9f, a deletion control unit 9g, and the managing unit 9h as illustrated in FIG. 7.

The collecting unit 9a collects various kinds of data transmitted from the server 2 and the server 3 via the network 90. For example, the collecting unit 9a collects the anonymization target data illustrated in the example of FIG. 3 which is transmitted from the server 2 and the server 3 via the network 90. Further, the collecting unit 9a collects the update data transmitted from the server 2 and the server 3 via the network 90. Further, the collecting unit 9a collects the deletion data transmitted from the server 2 and the server 3 via the network 90.

The determining unit 9b determines the type of data collected by the collecting unit 9a. For example, the determining unit 9b determines whether or not the data collected by the collecting unit 9a is any one of the anonymization target data, the update data, and the deletion data. Further, when it is determined that the data collected by the collecting unit 9a is the anonymization target data, the determining unit 9b acquires the individual ID included in the anonymization target data. For example, when it is determined that the data illustrated in the example of FIG. 3 is the anonymization target data, the determining unit 9b performs the following process. In other words, the determining unit 9b acquires individual IDs "1098," "1234," "3210," "3456," "5432," "5478," "7654," "7890," "9012," and "9876" included in the anonymization target data. Further, the determining unit 9b generates the record management ID which is an ID identifying the acquired individual ID for each individual ID. For example, when the individual IDs "1098," "1234," "3210," "3456," "5432," "5478," "7654," "7890," "9012," and "9876" are acquired, the determining unit 9b performs the following process. In other words, the determining unit 9b generates record management IDs "aaa01," "aaa02," "aaa03," "aaa04," "aaa05," "aaa06," "aaa07," "aaa08," "aaa09," and "aaa10."

Then, the determining unit 9b discards the individual ID included in the anonymization target data, registers the record management ID to the anonymization target data, and updates the anonymization target data. For example, the determining unit 9b discards the individual IDs "1098," "1234," "3210," "3456," "5432," "5478," "7654," "7890," "9012," and "9876" which are included in the records of the anonymization target data. Further, the determining unit 9b adds the record management IDs "aaa01," "aaa02," "aaa03," "aaa04," "aaa05,"

"aaa06," "aaa07," "aaa08," "aaa09," and "aaa10" to the records, respectively. In a process which will be described below, the updated anonymization target data is used.

As a result, data to be transmitted to the server 4 and the server 5 includes the record management ID rather than the individual ID. When the individual ID is included in the data to be transmitted to the server 4 and the server 5, an individual is likely to be identified based on the individual ID of the data accumulated in the server 4 and the server 5. However, when data including the record management ID through which an individual is unlikely to be identified rather than the individual ID is accumulated in the server 4 and the server 5, an individual is unlikely to be identified based on the record management ID of the accumulated data. Thus, according to the present embodiment, it is possible to suppress the occurrence of an event in which an individual is identified based on the transmitted data.

Further, the determining unit 9b registers the acquired individual ID and the generated record management ID to the ID TBL 8g in association with each other. As described above, the determining unit 9b updates the ID TBL 8g. For example, the determining unit 9b registers the acquired individual ID and the generated record management ID to the ID TBL 8g in association with each other as illustrated in FIG. 12.

The anonymizing unit 9c anonymizes various kinds of data. For example, when the anonymization target data is updated by the determining unit 9b, the anonymizing unit 9c discards registration content of an item, which is to be discarded, represented by the definition data 8c from the registration content of each item of the updated anonymization target data with reference to the definition data 8c. Specifically, for example, when the definition data 8c illustrated in FIG. 9 is stored in the storage unit 8, the anonymizing unit 9c refers to the items of "age," "height," and "weight" in which "YES" is registered to the item of "anonymization" of the definition data 8c. Further, the anonymizing unit 9c discards the registration content of the item of "name" from the registration content of each item of the updated anonymization target data.

Further, the anonymizing unit 9c anonymizes registration content of an item, which is to be anonymized, represented by the definition data 8c from the registration content of the item which has not been discarded among the registration contents of the items of the updated anonymization target data. For example, the anonymizing unit 9c anonymizes the updated anonymization target data so that the anonymization target can be used for statistical processing in the server 4 and the server 5. A concrete example will be described. For the registration contents of the items of "age," "height," and "weight" of the updated anonymization target data, the anonymizing unit 9c performs anonymization of converting a value included in the anonymization target data into a value range to which the value belongs so that the anonymization target data can be used for statistical processing. Further, the anonymizing unit 9c stores the anonymous data 8b obtained as a result of anonymization in the storage unit 8.

When the data illustrated in FIG. 3 is determined as the anonymization target data by the determining unit 9b, the anonymization target data is updated, and the definition data 8c illustrated in FIG. 9 is referred to, the following process is performed. In other words, the anonymizing unit 9c discards the registration content of the item of "name" of the updated anonymization target data, and generates the anonymous data 8b illustrated in the example of FIG. 8 by making vague the registration contents of the items of "age," "height," and "weight." Then, the anonymizing unit 9c stores the generated anonymous data 8b in the storage unit 8.

The verifying unit 9d determines whether or not the duplication number of the record of the verification target is N or more and verifies whether or not the record of the verification target is the record in which an individual is likely to be identified.

As an embodiment, when the anonymous data 8b is generated by the anonymizing unit 9c, the verifying unit 9d refers to the threshold value "N" of the duplication number registered to the definition data 8c. For example, when the definition data 8c illustrated in FIG. 9 remains stored in the storage unit 8, the verifying unit 9d refers to the threshold value "2" of the duplication number of the definition data 8c. The following description will proceed with an example in which "2" is registered to the definition data 8c as the threshold value of the duplication number, but an arbitrary value can be employed as the threshold value of the duplication number as long as the threshold value "N" of the duplication number registered to the definition data 8c is a natural number.

Next, the verifying unit 9d refers to an item, which is to be verified, represented by the definition data 8c. For example, when the definition data 8c illustrated in FIG. 9 remains stored in the storage unit 8, the verifying unit 9d refers to the items of "sex," "age," "height," and "weight" in which "YES" is registered to the item of "verification" of the definition data 8c.

Then, the verifying unit 9d performs the following process on an unprocessed record until an unprocessed record which is not subjected to the following process executed by the verifying unit 9d disappears. In other words, first of all, the verifying unit 9d acquires the anonymous data 8b which is newly generated and then stored in the storage unit 8 from the storage unit 8, and selects an unprocessed record in the acquired anonymous data 8b. For example, when the anonymous data 8b illustrated in FIG. 8 is newly generated by the anonymizing unit 9c and then stored in the storage unit 8, the verifying unit 9d acquires the anonymous data 8b from the storage unit 8, and selects a record for which the number is "1."

Next, the verifying unit 9d searches the duplication number TBL 8d to check whether or not a record including a combination of registration contents of an item to be verified is present among registration contents of items of the selected record. For example, when the record for which the number is "1" in the anonymous data 8b illustrated in FIG. 8 is selected, the verifying unit 9d searches the duplication number TBL 8d to check whether or not a record including a combination of registration contents "male," "20 to 29," "160 to 169," and "60 to 69" of the item to be verified is present.

When a recording including a combination of registration contents of an item to be verified is obtained as a result of search, the verifying unit 9d increases the value registered to the item of "duplication number" of the obtained record by one. For example, when a record including a combination of "male," "20 to 29," "160 to 169," and "60 to 69" which are registration contents of an item to be verified is obtained as a result of searching the duplication number TBL 8d illustrated in FIG. 10, the verifying unit 9d performs the following process. In other words, the verifying unit 9d updates the duplication number "2" of the fifth record of the duplication number TBL 8d which includes a combination of "male," "20 to 29," "160 to 169," and "60 to 69" which are the registration contents of the item to be verified to "3."

However, when a record including a combination of registration contents of an item to be verified is not obtained as a result of search, the verifying unit 9d performs the following process. In other words, the verifying unit 9d generates a record including a combination of registration content of an item to be verified, adds the generated record to the duplication number TBL 8d, and registers "1" the item of "duplication number" of the added record. As described above, the verifying unit 9d updates the duplication number TBL 8d.

Further, the verifying unit 9d determines whether or not the duplication number registered to the item of "duplication number" of the recording including a combination of registration contents of the item to be verified in the duplication number TBL 8d is the threshold value "N" of the referred duplication number or more.

When the duplication number is less than "N," since the selected record is the record in which an individual is likely to be identified, the verifying unit 9d registers the selected record to the NG data TBL 8e. Then, the verifying unit 9d determines whether or not an unprocessed record is present among the records of the acquired anonymous data 8b. When it is determined that an unprocessed record is present, the verifying unit 9d selects an unprocessed record, and performs the above-described process on the selected unprocessed record again.

However, when the duplication number is "N" or more, the verifying unit 9d determines whether or not the duplication number registered to the item of "duplication number" of the record of the duplication number TBL 8d is the threshold value "N" of the referred duplication number. When the duplication number is "N," as the selected record is newly transmitted from the server 2 or the server 3, since the selected record is not the record in which an individual is likely to be identified, the verifying unit 9d performs the following process. In other words, the verifying unit 9d specifies a record which is registered to the NG data TBL 8e and has the registration contents of the items of the selected record excluding "record management ID", and deletes the specified record from the NG data TBL 8e. Further, the verifying unit 9d classifies the selected record into "OK" representing that an individual is unlikely to be identified. For example, the verifying unit 9d registers the selected record to an OK list developed in internal memory of the control unit 9. Further, the verifying unit 9d determines whether or not there is an unprocessed record among records of the acquired anonymous data 8b, selects an unprocessed record when there is an unprocessed record, and performs the above-described process on the selected unprocessed record again. The verifying unit 9d is an example of a counting unit.

The distribution control unit 9e distributes the anonymized data to the server 4 and the server 5 via the network 91. As an embodiment, first of all, the distribution control unit 9e determines whether or not there is a record newly registered to the NG data TBL 8e by the verifying unit 9d among records of the anonymous data 8b newly stored in the storage unit 8 through the anonymizing unit 9c.

When there is a record newly registered to the NG data TBL 8e, the distribution control unit 9e refers to an item, which is to be anonymized, represented by the definition data 8c. For example, when the definition data 8c illustrated in FIG. 9 remains stored in the storage unit 8, the distribution control unit 9e performs the following process. In other words, the distribution control unit 9e refers to the items of "age," "height," and "weight" in which "YES" is registered to the item of "anonymization" of the definition data 8c. Then, the distribution control unit 9e selects an unprocessed record among records newly registered to the NG data TBL 8e. Then, the distribution control unit 9e anonymizes registration content of an item, which is to be anonymized, represented by the definition data 8c among registration contents of items of the selected record. For example, the distribution control unit 9e performs anonymization of discarding registration content and registering "null" to each item so that an individual is unlikely to be identified. Specifically, the distribution control unit 9e sets "null" to registration contents of the items of "age," "height," and "weight" as illustrated in the record for which the number is "3" in the data illustrated in FIG. 6. Then, the distribution control unit 9e determines whether or not there is an unprocessed record among records newly registered to the NG data TBL 8e, selects an unprocessed record when it is determined that there is an unprocessed record, and performs the above-described process. As described above, the distribution control unit 9e performs the anonymizing process of anonymizing all records newly registered to the NG data TBL 8e. Here, the anonymization performed in the distribution control unit 9e is performed as "second anonymization" when the anonymization performed by the anonymizing unit 9c is performed as "first anonymization" so that the anonymization can be used as statistical processing. Further, the "second anonymization" may be performed by the anonymizing unit 9c instead of the distribution control unit 9e.

Then, when there is a record classified into "OK" by the anonymizing unit 9c, the distribution control unit 9e causes the record to be stored in the distributed data TBL 8f. In addition, when there is a record which has been subjected to the second anonymization, the distribution control unit 9e also causes the record of the second anonymization to be stored in the distributed data TBL 8f. Then, the distribution control unit 9e acquires data newly stored in the distributed data TBL 8f, and outputs the acquired data to the communication unit 7 so that the acquired data is transmitted to the server 4 and the server 5. As a result, for example, the data illustrated in the example of FIG. 6 is transmitted to the server 4 and the server 5. Further, the distribution control unit 9e is an example of an output unit.

Referring back to FIG. 7, when the update data is received, the update control unit 9f performs control such that a record that has newly increased in identifiability or data that has newly decreased in identifiability is updated among pieces of data accumulated in the server 4 and the server 5.

As an embodiment, when the update data transmitted from the server 2 and the server 3 is received, the update control unit 9f acquires an individual ID included in the update data, and acquires a record management ID corresponding to the acquired individual ID from the ID TBL 8g. For example, when the update data illustrated in FIG. 4 is received, the update control unit 9f acquires the individual ID "1098" included in the update data, and acquires the record management ID "aaa01" corresponding to the individual ID "1098" from the ID TBL 8g illustrated in the example of FIG. 12.

Subsequently, the update control unit 9f transmits an instruction for transmitting an update target record including the record management ID acquired by the update control unit 9f to the information processing device 6 to the communication unit 7 so that the instruction is transmitted to the server 4 or the server 5. As a result, the instruction for transmitting the update target record including the record management ID acquired by the update control unit 9f to the information processing device 6 is transmitted to the server 4 or the server 5. The server 4 or the server 5 that has received the instruction searches for the record represented by the instruction from among the records accumulated in the DB 4a or the DB 5a, and transmits the record obtained as a result of search to the information processing device 6 via the network 91. As a result, the update control unit 9f of the information processing device 6 can acquire the update target record including the acquired record management ID. For example, when data accumulated in the DB 4a or the DB 5a is the data illustrated in the example of FIG. 6 and the update control unit 9*f* transmits an instruction for transmitting the update target record including the record management ID "aaa01" to the communication unit 7, the update control unit 9*f* acquires the following record. In other words, the update control unit 9 acquires a record for which the number is "1" in the example of FIG. 6.

Then, the update control unit 9*f* searches for a record including the registration contents of the items of the acquired record excluding "record management ID" from among the records of the duplication number TBL 8*d*, and decreases the value registered to the item of "duplication number" of the record obtained as a result of search by one. For example, when the record (the record including registration contents of "male," "20 to 29," "160 to 169," "60 to 69," and "aaa01") for which the number is "1" in the example of FIG. 6 is acquired, the update control unit 9*f* performs the following process. In other words, the update control unit 9*f* searches for the record including the registration contents of "male," "20 to 29," "160 to 169," and "60 to 69" from among the records of the duplication number TBL 8*d* illustrated in the example of FIG. 10. Then, the update control unit 9*f* updates the value "2" registered to the item of "duplication number" of the fifth record of the duplication number TBL 8*d* illustrated in the example of FIG. 10 obtained as a result of search to "1." FIG. 13 is a diagram illustrating an example of the updated duplication number TBL. As a result, the registration contents of the duplication number TBL 8*d* illustrated in the example of FIG. 10 are updated to the registration contents of the duplication number TBL 8*d* illustrated in the example of FIG. 13. Further, when the duplication number is updated from "N" to "N−1," it means that the record acquired by the update control unit 9*f* is the record in which an individual is likely to be identified.

Thereafter, the update control unit 9*f* acquires the duplication number of the acquired record from the updated duplication number TBL 8*d*. For example, when the record for which the number is "1" in the example of FIG. 6 is acquired, the update control unit 9*f* acquires the duplication number "1" of the fifth record of the updated duplication number TBL 8*d* illustrated in the example of FIG. 13.

Thereafter, the update control unit 9*f* determines whether or not the acquired duplication number is the value "N−1" obtained by decreasing the threshold value "N" of the duplication number by one with reference to the threshold value "N" of the duplication number registered to the definition data 8*c*. Here, when N is 2, for example, the update control unit 9*f* determines that the acquired duplication number "1" is "N−1" when the duplication number "1" of the fifth record of the updated duplication number TBL 8*d* illustrated in the example of FIG. 13 is acquired.

When the acquired duplication number is "N−1," the update control unit 9*f* performs control such that the corresponding record accumulated in the server 4 and the server 5 is updated to a record in which an individual is unlikely to be identified. For example, the update control unit 9*f* transmits an instruction for transmitting the following record management ID among the record management IDs accumulated in the server 4 or the server 5 to the information processing device 6 to the communication unit 7 so that the instruction is transmitted to the server 4 or the server 5. In other words, an instruction for transmitting the record management ID which is included in the record including the registration contents of the items excluding "record management ID" in the record acquired by the update control unit 9*f* and is not the record management ID acquired by the update control unit 9*f* is transmitted to the communication unit 7. For example, when the record (the record including the registration contents of "male," "20 to 29," "160 to 169," "60 to 69," and "aaa01") for which the number is "1" in the example of FIG. 6 is acquired, the update control unit 9*f* performs the following process. In other words, the update control unit 9*f* transmits an instruction for transmitting the record management ID which is included in the record including the registration contents of "male," "20 to 29," "160 to 169," and "60 to 69" but is not "aaa01" to the information processing device 6 to the communication unit 7. Thus, the instruction is transmitted to the server 4 or the server 5, and the server 4 or the server 5 that has received the instruction acquires the record management ID represented by the instruction from the DB 4*a* or the DB 5*a*, and transmits the acquired record management ID to the information processing device 6. For example, when the instruction for transmitting the record management ID which is included in the record including the registration contents of "male," "20 to 29," "160 to 169," and "60 to 69" but is not "aaa01" is received and the data illustrated in FIG. 6 remains accumulated in the DB 4*a*, the server 4 performs the following process. In other words, the server 4 transmits the record management ID "aaa06" to the information processing device 6. As described above, the update control unit 9*f* newly acquires the record management ID from the server 4 or the server 5.

Further, the update control unit 9*f* generates a record including the registration contents of the items excluding "record management ID" in the record acquired by the update control unit 9*f* and the newly acquired record management ID, and registers the generated record to the NG data TBL 8*e*. For example, the update control unit 9*f* generates a record including registration contents of "male," "20 to 29," "160 to 169," and "60 to 69" and the newly acquired record management ID "aaa06," and adds the generated record to the NG data TBL 8*e* as illustrated in the example of FIG. 14. FIG. 14 is a diagram illustrating an example of the NG data TBL including the added record.

Then, the update control unit 9*f* acquires the record newly registered to the NG data TBL 8*e*, and anonymizes registration content of an item, which is to be anonymized, represented by the definition data 8*c* with reference to the definition data 8*c*. For example, the update control unit 9*f* anonymizes the acquired record such that registration content of an item to be anonymized is discarded. A concrete example will be described. The update control unit 9*f* performs anonymization of discarding registration contents of the items of "age," "height," and "weight" of the record and registering "null" to the items. For example, the update control unit 9*f* generates a record in which registration contents of "male," "null," "null," "null," and "aaa06" are registered to the respective items. As described above, the update control unit 9*f* anonymizes the acquired record. Instead of the update control unit 9*f*, the anonymizing unit 9*c* may anonymize the acquired record.

Further, the update control unit 9*f* specifies the record including the record management ID newly acquired by the update control unit 9*f* from among the records of the distributed data TBL 8*f*. Further, the update control unit 9*f* updates the distributed data TBL 8*f* such that registration content of the verification target item of the specified record is used as registration content of the verification target item of the anonymized record. For example, when the data illustrated in FIG. 6 remains registered to the distributed data TBL 8*f*, the update control unit 9*f* updates registration contents of the record including the record management ID "aaa06" to "male," "null," "null," and "null" as illustrated in FIG. 15. FIG. 15 is a diagram illustrating an example of updated data.

Next, the update control unit 9f acquires the record (the anonymized record) newly updated in the distributed data TBL 8f, and outputs the acquired record to the communication unit 7 so that the acquired record is transmitted to the server 4 and the server 5. As a result, for example, the record of the record management ID "aaa06" illustrated in the example of FIG. 15 is transmitted to the server 4 and the server 5. The server 4 and the server 5 that have received the record of the record management ID "aaa06" illustrated in the example of FIG. 15 specify the record of the record management ID "aaa06" among the records accumulated in the DB 4a and the DB 5a, respectively. Each of the server 4 and the server 5 updates the specified record based on the received record. As a result, the records of the server 4 and the server 5 in which an individual newly becomes likely to be identified are updated to the records in which an individual is unlikely to be identified. As described above, when the acquired duplication number is "N−1," the update control unit 9f updates the records of the server 4 and the server 5 in which an individual newly becomes likely to be identified to the records in which an individual is unlikely to be identified.

Further, the update control unit 9f performs the following process regardless of the value of the acquired duplication number. For example, first of all, the update control unit 9f updates registration content of the acquired update target record based on update content represented by the update data. FIGS. 16 and 17 are diagrams for describing an example of a process executed by the information processing device according to the first embodiment. For example, when the update data illustrated in FIG. 4 is received and the update target record illustrated in the example of FIG. 16 is acquired, the update control unit 9f updates an age registered to the item of "age" to "30" based on the update content included in the update data as illustrated in the example of FIG. 17.

Further, the update control unit 9f anonymizes registration content of an item, which is to be anonymized, represented by the definition data 8c among registration contents of the updated record with reference to the definition data 8c. For example, the update control unit 9f anonymizes the updated record such that registration content of an item to be anonymized becomes vague. FIG. 18 is a diagram for describing an example of a process executed by the information processing device according to the first embodiment. For example, the update control unit 9f performs anonymization such that registration contents of the items of "age," "height," and "weight" of the record as illustrated in FIG. 18. As a result, the anonymized record is generated. Further, the update control unit 9f does not anonymize registration content that belongs to an item to be anonymized but has become already vague.

Next, the update control unit 9f searches for the record including the registration contents of the items of the anonymized record excluding "record management ID" from among the records of the duplication number TBL 8d. When the record is obtained as a result of search, the update control unit 9f increases the value registered to the item of "duplication number" of the acquired record by one. FIG. 19 is a diagram for describing an example of a process executed by the information processing device according to the first embodiment. For example, when the record including the registration content of the items of the record illustrated in the example of FIG. 18 excluding "record management ID" remains registered as the fourth record of the duplication number TBL 8d as illustrated in the example of FIG. 13, the update control unit 9f performs the following process. In other words, the update control unit 9f updates the value "1" registered to the item of "duplication number" of the fourth record of the duplication number TBL 8d to "2" as illustrated in FIG. 19. Further, when the duplication number is updated from "N−1" to "N," it means that all records, which are accumulated in the server 4 and the server 5, including the registration contents of the items of the anonymized record excluding "record management ID" are updated to the records in which an individual is unlikely to be identified.

Meanwhile, when the record is not obtained as a result of search, the update control unit 9f adds a new record to the duplication number TBL 8d. Then, the update control unit 9f registers the registration contents of the anonymized record to the items of the added record excluding "duplication number." Next, the update control unit 9f registers "1" to the item of "duplication number" of the added record.

Next, the update control unit 9f acquires the duplication number of the record of the duplication number TBL 8d corresponding to the anonymized record. For example, the update control unit 9f acquires the duplication number "2" of the fourth record of the updated duplication number TBL 8d illustrated in the example of FIG. 19.

Next, the update control unit 9f determines whether or not the acquired duplication number is the threshold value "N" of the duplication number or more. As described above, the update control unit 9f verifies whether or not the verification target record is the record in which an individual is likely to be identified by determining the duplication number of the verification target record is N or more. The verification may be performed by the verifying unit 9d instead of the update control unit 9f.

When the acquired duplication number is less than the threshold value "N" of the duplication number, the update control unit 9f registers the anonymized record to the NG data TBL 8e. Then, the update control unit 9f anonymizes registration content of an item, which is to be anonymized, represented by the definition data 8c among registration contents of items of the record newly registered to the NG data TBL 8e. For example, the update control unit 9f performs anonymization of discarding the registration contents and registering "null" to the items so that an individual is unlikely to be identified. As described above, the update control unit 9f performs the anonymizing process of anonymizing the record newly registered to the NG data TBL 8e. As described above, the update control unit 9f anonymizes the record. The anonymization of the record may be performed by the anonymizing unit 9c instead of the update control unit 9f.

Further, the update control unit 9f searches a record including the record management ID of the record newly anonymized by the update control unit 9f among the records of the distributed data TBL 8f. Next, the update control unit 9f updates the distributed data TBL 8f such that registration content of a verification target item of the record obtained as a result of search is used as registration content of a verification target item of the newly anonymized record.

Next, the update control unit 9f acquires the record (the anonymized record) newly updated in the distributed data TBL 8f, and outputs the acquired record to the communication unit 7 so that the acquired record is transmitted to the server 4 and the server 5. As a result, the anonymized record is transmitted to the server 4 and the server 5. The server 4 and the server 5 that have received the anonymized record specify a record including the record management ID matching the record management ID included in the received record among the records accumulated in the DB 4a and the DB 5a, respectively. Then, each of the server 4 and the server 5 updates the specified record based on the received record.

Meanwhile, when the acquired duplication number is the threshold value "N" of the duplication number or more, the update control unit 9f determines whether or not the acquired duplication number is the threshold value "N" of the duplication number.

When the acquired duplication number is the threshold value "N" of the duplication number, the update control unit 9f acquires the record management ID of the record including the registration contents matching the registration contents of the items of the newly anonymized record excluding "record management ID" with reference to the NG data TBL 8e. For example, when the anonymized record illustrated in FIG. 18 is generated, the update control unit 9f acquires the record management ID "aaa10" of the fifth record of the NG data TBL 8e from the NG data TBL 8e illustrated in FIG. 14.

Further, the update control unit 9f specifies the record including the acquired record management ID among the records registered to the NG data TBL 8e, and deletes the specified record. For example, the update control unit 9f deletes the fifth record from the NG data TBL 8e illustrated in FIG. 14.

Further, the update control unit 9f specifies the record including the record management ID newly acquired by the update control unit 9f from among the records of the distributed data TBL 8f. Next, the update control unit 9f updates the distributed data TBL 8f such that registration content of a verification target item of the specified record is used as registration content of a verification target item of the newly anonymized record. FIG. 20 is a diagram illustrating an example of a process executed by the information processing device according to the first embodiment. For example, when the data illustrated in FIG. 15 remains registered to the distributed data TBL 8f, the update control unit 9f performs the following process when the record management ID "aaa10" is acquired. In other words, the update control unit 9f updates registration contents of the record including the record management ID "aaa10" of the distributed data TBL 8f to registration contents of "male," "30 to 39," "160 to 169," and "60 to 69" as illustrated in FIG. 20.

Next, the update control unit 9f acquires the record newly updated in the distributed data TBL 8f, and outputs the acquired record to the communication unit 7 so that the acquired record is transmitted to the server 4 and the server 5. As a result, for example, the record of the record management ID "aaa10" illustrated in the example of FIG. 20 is transmitted to the server 4 and the server 5. The server 4 and the server 5 that have received the record of the record management ID "aaa10" illustrated in the example of FIG. 20 specify the record of the record management ID "aaa10" among the records accumulated in the DB 4a and the DB 5a, respectively. Then, each of the server 4 and the server 5 updates the specified record based on the received record. As a result, the records of the server 4 and the server 5 in which an individual newly becomes unlikely to be identified are updated to be used for a variety of processing such as statistical processing. As described above, when the acquired duplication number is "N," the update control unit 9f updates the records of the server 4 and the server 5 in which an individual newly becomes unlikely to be identified so that the records can be used for a variety of processing such as statistical processing.

Further, when the duplication number is "N" or more, the update control unit 9f performs the following process regardless of a determination result on whether or not the duplication number is "N." In other words, the update control unit 9f specifies the recording including the record management ID of the record newly anonymized by the update control unit 9f among the records of the distributed data TBL 8f. Then, the update control unit 9f updates the distributed data TBL 8f such that registration content of a verification target item of the specified record is used as registration content of a verification target item of the newly anonymized record. FIG. 21 is a diagram illustrating an example of a process executed by the information processing device according to the first embodiment. For example, when the data illustrated in FIG. 20 remains registered to the distributed data TBL 8f, the update control unit 9f performs the following process when the anonymized record illustrated in the example of FIG. 18 is generated. In other words, the update control unit 9f updates the registration content of the age of record including the record management ID "aaa01" of the distributed data TBL 8f to "30 to 39" as illustrated in FIG. 21.

Next, the update control unit 9f acquires the record newly updated in the distributed data TBL 8f, and outputs the acquired record to the communication unit 7 so that the acquired record is transmitted to the server 4 and the server 5. As a result, for example, the record of the record management ID "aaa01" illustrated in the example of FIG. 21 is transmitted to the server 4 and the server 5. The server 4 and the server 5 that have received the record of the record management ID "aaa01" illustrated in the example of FIG. 21 specify the record of the record management ID "aaa01" among the records accumulated in the DB 4a and the DB 5a, respectively. Then, each of the server 4 and the server 5 updates the specified record based on the received record. As described above, the update control unit 9f can update the records of the server 4 and the server 5 based on the update data.

Referring back to FIG. 7, when the deletion data is received, the deletion control unit 9g performs control such that the record in which an individual newly becomes likely to be identified among pieces of data accumulated in the server 4 and the server 5 is updated.

As an embodiment, when the deletion data transmitted from the server 2 and the server 3 is received, the deletion control unit 9g acquires the individual ID included in the deletion data, and acquires the record management ID corresponding to the acquired individual ID from the ID TBL 8g. For example, when the deletion data illustrated in the example of FIG. 5 is received, the deletion control unit 9g acquires the individual ID "1098" included in the deletion data, and acquires the record management ID "aaa01" corresponding to the individual ID "1098" from the ID TBL 8g illustrated in the example of FIG. 12.

Next, the deletion control unit 9g transmits an instruction for transmitting a deletion target record including the record management ID acquired by the deletion control unit 9g to the information processing device 6 to the communication unit 7 so that the instruction is transmitted to the server 4 or the server 5. As a result, the instruction for transmitting the update target record including the record management ID acquired by the deletion control unit 9g to the information processing device 6 is transmitted to the server 4 or the server 5. The server 4 or the server 5 that has received the instruction searches for the record represented by the instruction from among the records accumulated in the DB 4a or the DB 5a, and transmits the record obtained as a result of search to the information processing device 6 via the network 91. As a result, the deletion control unit 9g of the information processing device 6 can acquire the deletion target record including the acquired record management ID. For example, when data accumulated in the DB 4a or the DB 5a is the data illustrated in the example of FIG. 6 and the deletion control unit 9g transmits an instruction for transmitting the deletion target record including the record management ID "aaa01" to the communication unit 7, the deletion control unit 9g acquires the following record. In other words, the deletion control unit 9g acquires the record for which the number is "1" in the example of FIG. 6.

Next, the deletion control unit 9g searches for a record including the registration contents of the items of the acquired record excluding "record management ID" from among the records of the duplication number TBL 8d, and decreases the value registered to the item of "duplication number" of the record obtained as a result of search by one. For example, when the record (the record including registration contents of "male," "20 to 29," "160 to 169," "60 to 69," and "aaa01") for which the number is 1 in the example of FIG. 6 is acquired, the deletion control unit 9g performs the following process. In other words, the deletion control unit 9g searches for the record including the registration contents of "male," "20 to 29," "160 to 169," and "60 to 69" from among the records of the duplication number TBL 8d illustrated in the example of FIG. 10. Then, the deletion control unit 9g updates the value "2" registered to the item of "duplication number" of the fifth record of the duplication number TBL 8d illustrated in the example of FIG. 10 obtained as a result of search to "1." As a result, the registration contents of the duplication number TBL 8d illustrated in the example of FIG. 10 are updated to the registration contents of the duplication number TBL 8d illustrated in the example of FIG. 13. Further, when the duplication number is updated from "N" to "N−1," it means that the record acquired by the deletion control unit 9g is the record in which an individual is likely to be identified.

Thereafter, the deletion control unit 9g acquires the duplication number of the acquired record from the updated duplication number TBL 8d. For example, when the record for which the number is "1" in the example of FIG. 6 is acquired, the deletion control unit 9g acquires the duplication number "1" of the fifth record of the updated duplication number TBL 8d illustrated in the example of FIG. 13.

Thereafter, the deletion control unit 9g determines whether or not the acquired duplication number is the value "N−1" obtained by decreasing the threshold value "N" of the duplication number by one with reference to the threshold value "N" of the duplication number registered to the definition data 8c. Here, when N is 2, for example, the deletion control unit 9g determines that the acquired duplication number "1" is "N−1" when the duplication number "1" of the fifth record of the updated duplication number TBL 8d illustrated in the example of FIG. 13 is acquired.

When the acquired duplication number is "N−1," the deletion control unit 9g performs control such that the corresponding record accumulated in the server 4 and the server 5 is updated to a record in which an individual is unlikely to be identified. For example, the deletion control unit 9g transmits an instruction for transmitting the following record management ID among the record management IDs accumulated in the server 4 or the server 5 to the information processing device 6 to the communication unit 7 so that the instruction is transmitted to the server 4 or the server 5. In other words, an instruction for transmitting the record management ID which is included in the record including the registration contents of the items excluding "record management ID" in the record acquired by the deletion control unit 9g and is not the record management ID acquired by the deletion control unit 9g is transmitted to the communication unit 7. For example, when the record (the record including the registration contents of "male," "20 to 29," "160 to 169," "60 to 69," and "aaa01") for which the number is "1" in the example of FIG. 6 is acquired, the deletion control unit 9g performs the following process. In other words, the deletion control unit 9g transmits an instruction for transmitting the record management ID which is included in the record including the registration contents of "male," "20 to 29," "160 to 169," and "60 to 69" but is not "aaa01" to the information processing device 6 to the communication unit 7. Thus, the instruction is transmitted to the server 4 or the server 5, and the server 4 or the server 5 that has received the instruction acquires the record management ID represented by the instruction from the DB 4a or the DB 5a, and transmits the acquired record management ID to the information processing device 6. For example, when the instruction for transmitting the record management ID which is included in the record including the registration contents of "male," "20 to 29," "160 to 169," and "60 to 69" but is not "aaa01" is received and the data illustrated in FIG. 6 remains accumulated in the DB 4a, the server 4 performs the following process. In other words, the server 4 transmits the record management ID "aaa06" to the information processing device 6. As described above, the deletion control unit 9g newly acquires the record management ID from the server 4 or the server 5.

Further, the deletion control unit 9g generates a record including the registration contents of the items excluding "record management ID" in the record acquired by the deletion control unit 9g and the newly acquired record management ID, and registers the generated record to the NG data TBL 8e. For example, the deletion control unit 9g generates a record including registration contents of "male," "20 to 29," "160 to 169," and "60 to 69" and the newly acquired record management ID "aaa06," and adds the generated record to the NG data TBL 8e as illustrated in the example of FIG. 14.

Then, the deletion control unit 9g acquires the record newly registered to the NG data TBL 8e, and anonymizes registration content of an item, which is to be anonymized, represented by the definition data 8c with reference to the definition data 8c. For example, the deletion control unit 9g anonymizes the acquired record such that registration content of an item to be anonymized is discarded. A concrete example will be described. The deletion control unit 9g performs anonymization of discarding registration contents of the items of "age," "height," and "weight" of the record and registering "null" to the items. For example, the deletion control unit 9g generates a record in which registration contents of "male," "null," "null," "null," and "aaa06" are registered to the respective items. As described above, the update control unit 9f anonymizes the acquired record. As described above, the deletion control unit 9g anonymizes the record. Instead of the deletion control unit 9g, the anonymizing unit 9c may anonymize the record.

Further, the deletion control unit 9g specifies the record including the record management ID newly acquired by the deletion control unit 9g from among the records of the distributed data TBL 8f. Further, the deletion control unit 9g updates the distributed data TBL 8f such that registration content of the verification target item of the specified record is used as registration content of the verification target item of the anonymized record. For example, when the data illustrated in FIG. 6 remains registered to the distributed data TBL 8f, the deletion control unit 9g updates registration contents of the record including the record management ID "aaa06" to "male," "null," "null," and "null" as illustrated in FIG. 15.

Next, the deletion control unit 9g acquires the record (the anonymized record) newly updated in the distributed data TBL 8f, and outputs the acquired record to the communication unit 7 so that the acquired record is transmitted to the server 4 and the server 5. As a result, for example, the record of the record management ID "aaa06" illustrated in the example of FIG. 15 is transmitted to the server 4 and the server 5. The server 4 and the server 5 that have received the record of the record management ID "aaa06" illustrated in the example of FIG. 15 specify the record of the record management ID "aaa06" among the records accumulated in the DB 4a and the DB 5a, respectively. Each of the server 4 and the server 5 updates the specified record based on the received record. As a result, the records of the server 4 and the server 5 in which an individual newly becomes likely to be identified are updated to the records in which an individual is unlikely to be identified. As described above, when the acquired duplication number is "N−1," the deletion control unit 9g updates the records of the server 4 and the server 5 in which an individual newly becomes likely to be identified to the records in which an individual is unlikely to be identified.

Further, the deletion control unit 9g performs the following process regardless of the value of the acquired duplication number. For example, the deletion control unit 9g specifies the record including the record management ID corresponding to the individual ID included in the deletion data among the records of the distributed data TBL 8f, and deletes the specified record.

Next, the deletion control unit 9g transmits an instruction for deleting the record including the record management ID corresponding to the individual ID included in the deletion data to the communication unit 7 so that the instruction is transmitted to the server 4 and the server 5. In other words, the deletion control unit 9g transmits the instruction for deleting the record represented by the deletion data to the communication unit 7. As a result, the instruction is transmitted to the server 4 and the server 5. The server 4 and the server 5 that have received the instruction specifies the record including the record management ID represented by the instruction among the records accumulated in the DB 4a and the DB 5a, and deletes the specified record.

Referring back to FIG. 7, when the definition data 8c transmitted from the client device 10 is received, the managing unit 9h stores the received definition data 8c in the storage unit 8.

The control unit 9 is an integrated circuit (IC) such as an application specific integrated circuit (ASIC). The control unit 9 may be a field programmable gate array (FPGA). Further, the control unit 9 may be an electronic circuit such as a central processing unit (CPU). Alternatively, the control unit 9 may be a micro processing unit (MPU).

Figure 22:
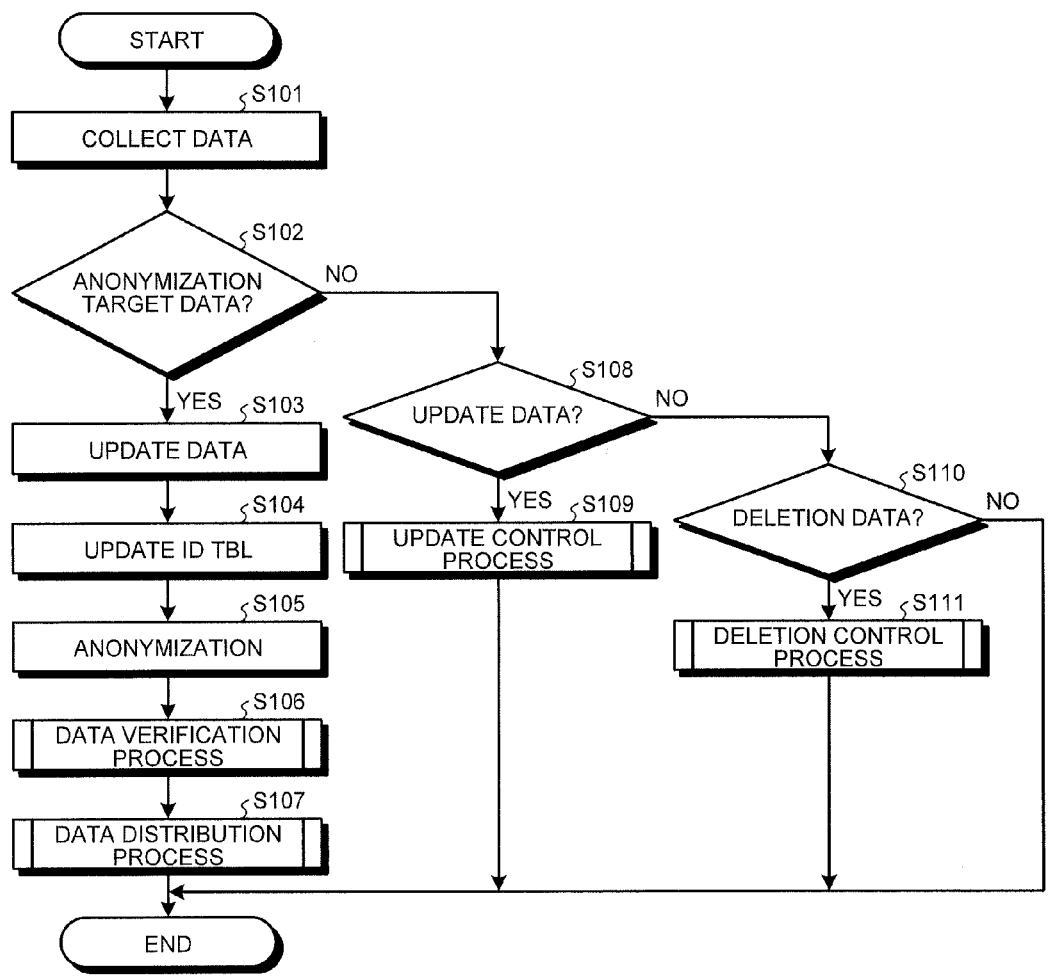
FIG. 22 is a flowchart illustrating a procedure of a control process according to the first embodiment.

Next, the flow of a process executed by the information processing device according to the present embodiment will be described. FIG. 22 is a flowchart illustrating a procedure of a control process according to the first embodiment.

As illustrated in FIG. 22, the collecting unit 9a collects a variety of data transmitted from the server 2 and the server 3 via the network 90 (Step S101).

Next, the determining unit 9b determines whether or not the type of the data collected by the collecting unit 9a is an anonymization target data (Step S102). When it is determined that the type of the data collected by the collecting unit 9a is an anonymization target data (Yes in Step S102), the determining unit 9b acquires an individual ID included in the anonymization target data, and generates a record management ID corresponding to the acquired individual ID. Then, the determining unit 9b discards the acquired individual ID included in the anonymization target data, registers the record management ID to the anonymization target data, and updates the anonymization target data (Step S103).

Then, the determining unit 9b updates the ID TBL 8g by registering the acquired individual ID and the generated record management ID to the ID TBL 8g (Step S104).

Next, the anonymizing unit 9c discards the registration content of the item represented by the definition data 8c from the registration content of each item of the updated anonymization target data with reference to the definition data 8c. Then, the anonymizing unit 9c anonymizes registration content of an item, which is to be anonymized, represented by the definition data 8c among the registration contents of the items which have not discarded from the registration contents of the items of the updated anonymization target data. Then, the anonymizing unit 9c stores the anonymous data 8b obtained as a result of anonymizing in the storage unit 8 (Step S105).

Figure 23:
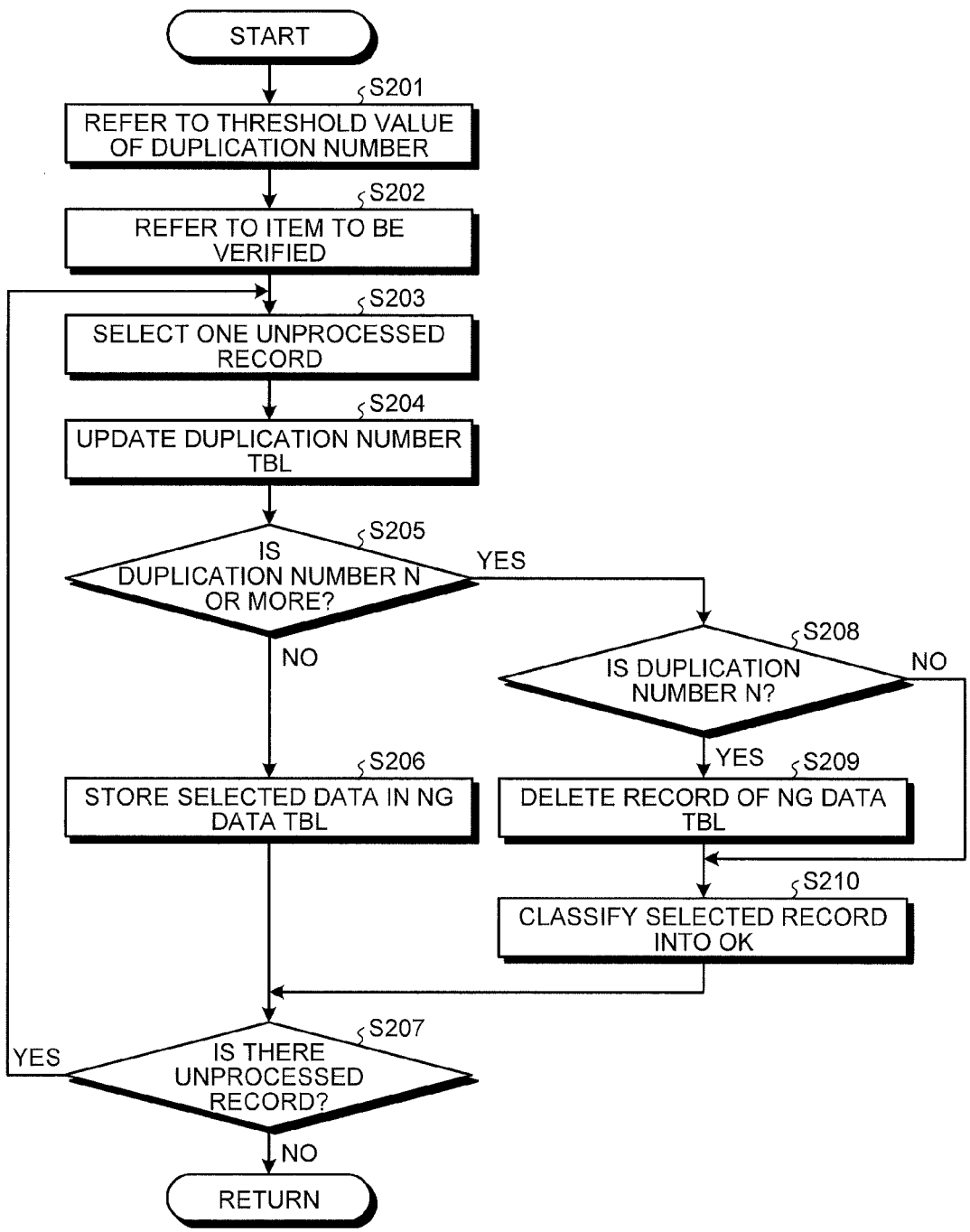
FIG. 23 is a flowchart illustrating a procedure of a data verification process according to the first embodiment.

Then, the verifying unit 9d executes a data verification process (Step S106). FIG. 23 is a flowchart illustrating a procedure of a data verification process according to the first embodiment. As illustrated in FIG. 23, the verifying unit 9d refers to the threshold value "N" of the duplication number registered to the definition data 8c (Step S201).

Next, the verifying unit 9d refers to an item, which is to be verified, represented by the definition data 8c (Step S202). Then, the verifying unit 9d acquires the anonymous data 8b which is newly generated and stored in the storage unit 8 from the storage unit 8, and selects an unprocessed record of the acquired anonymous data 8b (Step S203).

Next, the verifying unit 9d specifies a combination of registration content of an item to be verified from the registration contents of the items of the selected record, and searches the duplication number TBL 8d to check whether there is a record including a combination of the specified registration content. When a recording including a combination of registration contents of an item to be verified is obtained as a result of search, the verifying unit 9d increases the value registered to the item of "duplication number" of the obtained record by one, and updates the duplication number TBL 8d. However, when a combination of registration content of an item to be verified is not obtained as a result of search, the verifying unit 9d generates a record to which a combination of registration content of an item to be verified is registered, and adds the generated record to the duplication number TBL 8d. Then, the verifying unit 9d registers "1" to the item of "duplication number" of the added record. As described above, the verifying unit 9d updates the duplication number TBL 8d (Step S204).

Then, the verifying unit 9d determines whether or not the duplication number registered to the item of "duplication number" of the recording including a combination of registration contents of an item to be verified in the duplication number TBL 8d is the threshold value "N" of the referred duplication number or more (Step S205).

When it is determined that the duplication number is not more than "N," that is, when it is determined that the duplication number is less than "N" (No in Step S205), since the selected record is the record in which an individual is likely to be identified, the verifying unit 9d registers the selected record to the NG data TBL 8e (Step S206). Then, the verifying unit 9d determines whether or not there is an unprocessed record among the records of the acquired anonymous data 8b (Step S207). When it is determined that there is an unprocessed record (Yes in Step S207) the process returns to Step S203, and the verifying unit 9d selects an unprocessed record and performs the above-described process again.

However, when it is determined that the duplication number is "N" or more (Yes in Step S205), the verifying unit 9d determines whether or not the duplication number registered to the item of "duplication number" of the record of the duplication number TBL 8d is the threshold value "N" of the referred duplication number (Step S208). When it is determined that the duplication number is not "N" (No in Step S208), the process proceeds to Step S210. When it is determined that the duplication number is "N" (Yes in Step S208), the selected record is newly transmitted from the server 2 or the server 3, and thus since the selected record is not the record in which an individual is likely to be identified, the verifying unit 9*d* performs the following process. In other words, the verifying unit 9*d* specifies a record which remains registered to the NG data TBL 8*e* and has the registration contents of the items of the selected record excluding "record management ID", and deletes the specified record from the NG data TBL 8*e* (Step S209). Then, the verifying unit 9*d* classifies the selected record into "OK" representing that an individual is unlikely to be identified (Step S210), and the process proceeds to Step S207. Meanwhile, when it is determined that there is no unprocessed record (No in Step S207), the verifying unit 9*d* stores the processing result in internal memory, and returns.

Figure 24:
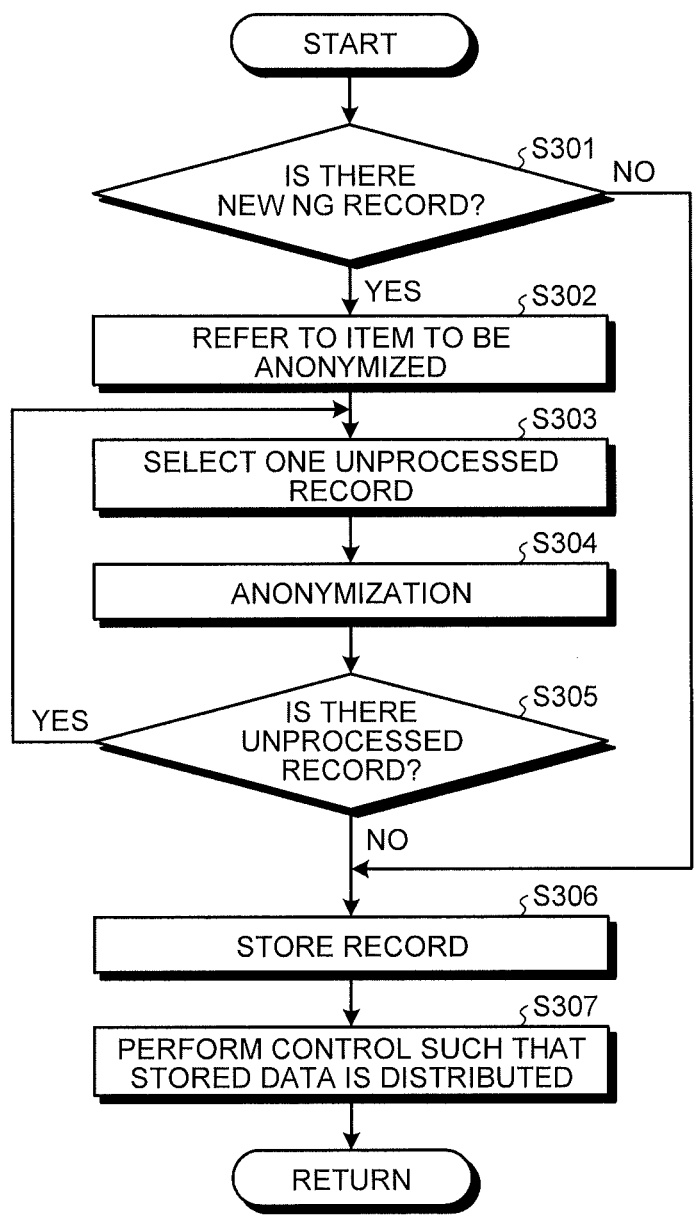
FIG. 24 is a flowchart illustrating a procedure of a data distribution process according to the first embodiment.

Referring back to FIG. 22, the distribution control unit 9*e* executes the data distribution process (Step S107), and then the process ends. FIG. 24 is a flowchart illustrating a procedure of a data distribution process according to the first embodiment. As illustrated in FIG. 24, the distribution control unit 9*e* determines whether or not there is a record newly registered to the NG data TBL 8*e* through the verifying unit 9*d* among the records of the anonymous data 8*b* newly stored in the storage unit 8 through the anonymizing unit 9*c* (Step S301). When it is determined that there is no record newly registered to the NG data TBL 8*e* (No in Step S301), the process proceeds to Step S306.

However, when it is determined that there is a record newly registered to the NG data TBL 8*e* (Yes in Step S301), the distribution control unit 9*e* refers to an item, which is to be anonymized, represented by the definition data 8*c* (Step S302). Then, the distribution control unit 9*e* selects an unprocessed record among records newly registered to the NG data TBL 8*e* (Step S303). Then, the distribution control unit 9*e* anonymizes registration content of an item, which is to be anonymized, represented by the definition data 8*c* among the registration contents of the items of the selected record (Step S304).

Then, the distribution control unit 9*e* determines whether or not there is an unprocessed record among records newly registered to the NG data TBL 8*e* (Step S305). When it is determined that there is an unprocessed record (Yes in Step S305), the distribution control unit 9*e* returns to Step S303, selects an unprocessed record, and performs the above-described process again.

When it is determined there is no unprocessed record (No in Step S305), the distribution control unit 9*e* stores the record classified into "OK" through the anonymizing unit 9*c* in the distributed data TBL 8*f*. In addition, when there is a record which has been subjected to the second anonymization, the distribution control unit 9*e* stores the record of the second anonymization in the distributed data TBL 8*f* (Step S306). Next, the distribution control unit 9*e* acquires data newly stored in the distributed data TBL 8*f*, outputs the acquired data to the communication unit 7 so that the acquired data is transmitted to the server 4 and the server 5 (Step S307), stores the processing result in internal memory, and then returns.

Referring back to FIG. 22, when it is determined that the type of the data collected by the collecting unit 9*a* is not the anonymization target data (No in Step S102), the determining unit 9*b* determines whether or not the type of the data collected by the collecting unit 9*a* is the update data (Step S108). When it is determined that the type of the data collected by the collecting unit 9*a* is the update data (Yes in Step S108), the update control unit 9*f* executes an update control process (Step S109), and then the process ends.

Figure 25:
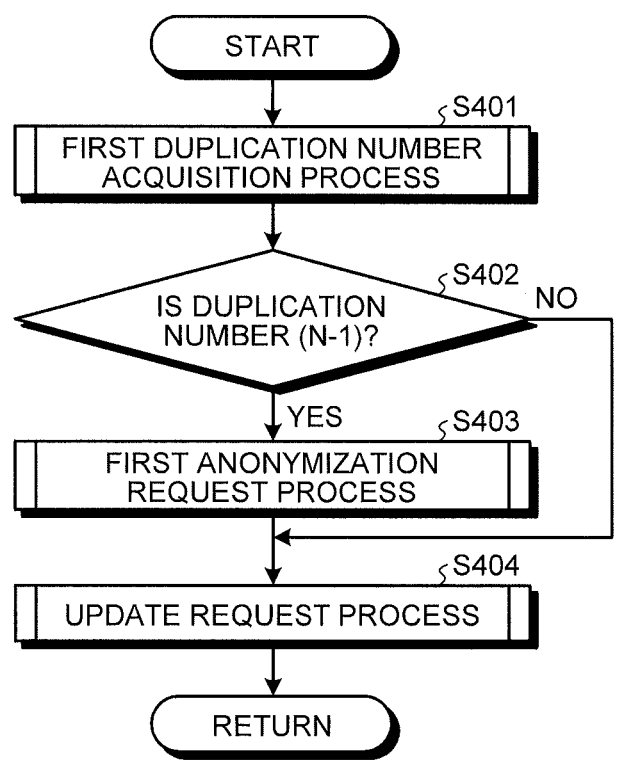
FIG. 25 is a flowchart illustrating a procedure of an update control process according to the first embodiment.

FIG. 25 is a flowchart illustrating a procedure of the update control process according to the first embodiment. As illustrated in FIG. 25, the update control unit 9*f* executes a first duplication number acquisition process (Step S401).

Figure 26:
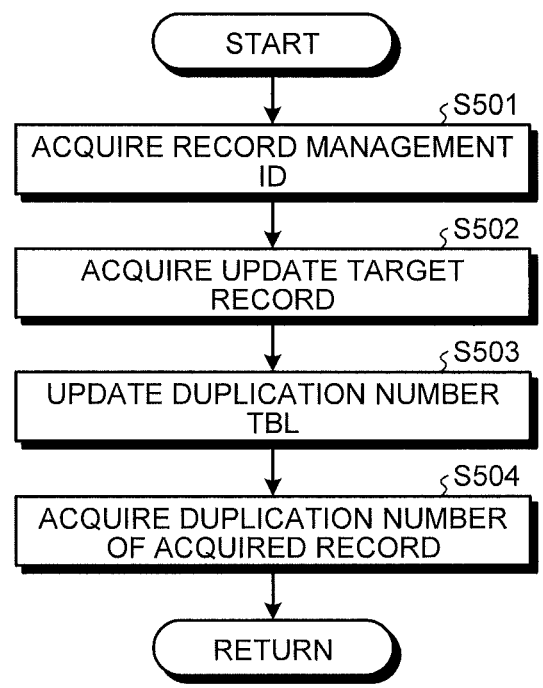
FIG. 26 is a flowchart illustrating a procedure of a first duplication number acquisition process according to the first embodiment.

FIG. 26 is a flowchart illustrating a procedure of the first duplication number acquisition process according to the first embodiment. As illustrated in FIG. 26, the update control unit 9*f* acquires the individual ID included in the update data, and acquires the record management ID corresponding to the acquired individual ID from the ID TBL 8*g* (Step S501).

Next, the update control unit 9*f* transmits an instruction for transmitting the update target record including the record management ID acquired by the update control unit 9*f* to the information processing device 6 to the communication unit 7 in order to transmit the instruction to the server 4 or the server 5. Then, the update control unit 9*f* acquires the update target record from the server 4 or the server 5 (Step S502).

Next, the update control unit 9*f* searches for the record including the registration contents of the items of the acquired record excluding "record management ID" among the records of the duplication number TBL 8*d*. Then, the update control unit 9*f* decreases the value registered to the item of "duplication number" of the record obtained as a result of search by one, and updates the duplication number TBL 8*d* (Step S503).

Next, the update control unit 9*f* acquires the duplication number of the acquired record from the updated duplication number TBL 8*d* (Step S504), stores the processing result in the internal memory, and then returns.

Referring back to FIG. 25, the update control unit 9*f* determines whether or not the acquired duplication number is the value "N−1" obtained by decreasing the threshold value "N" of the duplication number by one with reference to the threshold value "N" of the duplication number registered to the definition data 8*c* (Step S402).

When it is determined that the acquired duplication number is not "N−1" (No in Step S402), the process proceeds to Step S404. However, when it is determined that the acquired duplication number is "N−1" (Yes in Step S402), the update control unit 9*f* executes a first anonymization request process (Step S403).

Figure 27:
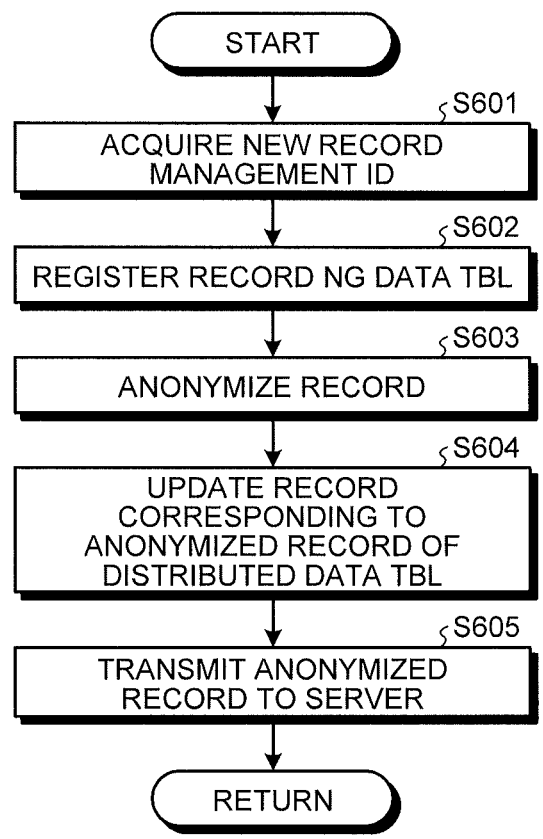
FIG. 27 is a flowchart illustrating a procedure of a first anonymization request process according to the first embodiment.

FIG. 27 is a flowchart illustrating a procedure of the first anonymization request process according to the first embodiment. As illustrated in FIG. 27, the update control unit 9*f* transmits an instruction for transmitting the following record management ID among the record management IDs accumulated in the server 4 or the server 5 to the information processing device 6 to the communication unit 7 in order to transmit the instruction to the server 4 or the server 5. In other words, the update control unit 9*f* transmits an instruction for transmitting the record management ID which is included in the record including the registration contents of the items of the acquired record excluding "record management ID" and is not acquired by the update control unit 9*f* to the communication unit 7. As described above, the update control unit 9*f* newly acquires the record management ID from the server 4 or the server 5 (Step S601).

Then, the update control unit 9*f* generates a record including the registration contents of the items excluding "record management ID" in the record acquired by the update control unit 9*f* and the newly acquired record management ID, and registers the generated record to the NG data TBL 8*e* (Step S602).

Then, the update control unit 9*f* acquires the record newly registered to the NG data TBL 8*e*, and anonymizes registration content of an item, which is to be anonymized, represented by the definition data 8c with reference to the definition data 8c (Step S603).

Further, the update control unit 9f specifies the record including the record management ID newly acquired by the update control unit 9f from among the records of the distributed data TBL 8f. Next, the update control unit 9f updates the distributed data TBL 8f such that registration content of a verification target item of the specified record is used as a registration content of a verification target item of the anonymized record (Step S604).

Next, the update control unit 9f acquires the record (the anonymized record) newly updated in the distributed data TBL 8f, and outputs the acquired record to the communication unit 7 so that the acquired record is transmitted to the server 4 and the server 5 (Step S605). Then, the update control unit 9f stores the processing result in the internal memory, and then returns.

Referring back to FIG. 25, the update control unit 9f executes an update request process (Step S404), stores the processing result in the internal memory, and then returns.

Figure 28:
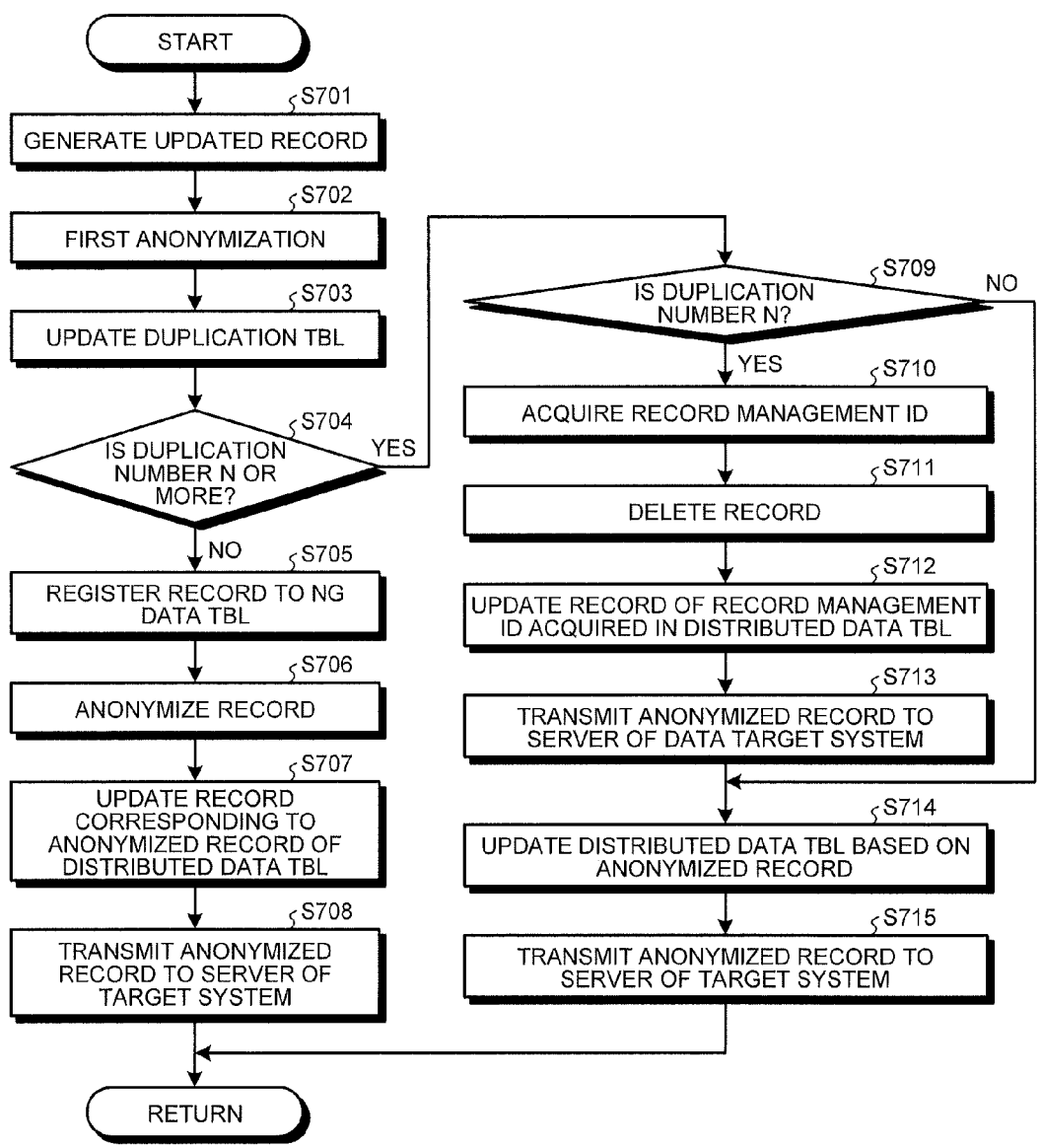
FIG. 28 is a flowchart illustrating a procedure of an update request process according to the first embodiment.

FIG. 28 is a flowchart illustrating a procedure of the update request process according to the first embodiment. As illustrated in FIG. 28, the update control unit 9f updates the registration contents of the acquired update target record based on the update content represented by the update data, and generates the updated record (Step S701).

Then, the update control unit 9f anonymizes registration content of an item, which is to be anonymized, represented by the definition data 8c among the registration contents of the updated record with reference to the definition data 8c (Step S702). Next, the update control unit 9f searches for the record including the registration contents of the items of the anonymized record excluding "record management ID" among the records of the duplication number TBL 8d. When a record is obtained as a result of search, the update control unit 9f increases the value registered to the item of "duplication number" of the obtained record by one. However, when a record is not obtained as a result of search, the update control unit 9f adds a new record to the duplication number TBL 8d. Then, the update control unit 9f records the registration contents of the anonymized record to the items of the added record excluding "duplication number." Next, the update control unit 9f registers "1" to the item of "duplication number" of the added record. As described above, the update control unit 9f updates the duplication number TBL 8d (Step S703).

Next, the update control unit 9f acquires the duplication number of the record of the duplication number TBL 8d corresponding to the anonymized record, and determines whether or not the acquired duplication number is the threshold value "N" of the duplication number or more (Step S704). When it is determined that the acquired duplication number is less than the threshold value "N" of the duplication number (No in Step S704), the update control unit 9f registers the anonymized record to the NG data TBL 8e (Step S705).

Then, the update control unit 9f anonymizes registration content of an item, which is to be anonymized, represented by the definition data 8c among the registration contents of the items of the record newly registered to the NG data TBL 8e (Step S706).

Then, the update control unit 9f searches for a record including the record management ID of the record newly anonymized by the update control unit 9f among the records of the distributed data TBL 8f. Next, the update control unit 9f updates the distributed data TBL 8f such that registration content of a verification target item of the record obtained as a result of search is used as registration content of a verification target item of the newly anonymized record (Step S707).

Next, the update control unit 9f acquires the record (the anonymized record) newly updated in the distributed data TBL 8f, and outputs the acquired record to the communication unit 7 so that the acquired record is transmitted to the server 4 and the server 5 (Step S708). Then, the update control unit 9f stores the processing result in the internal memory, and then returns.

Meanwhile, when it is determined that the acquired duplication number is the threshold value "N" of the duplication number or more (Yes in Step S704), the update control unit 9f determines whether or not the acquired duplication number is the threshold value "N" of the duplication number (Step S709). When it is determined the acquired duplication number is not the threshold value "N" of the duplication number (No in Step S709), the process proceeds to Step S714.

However, when it is determined that the acquired duplication number is the threshold value "N" of the duplication number (Yes in Step S709), the update control unit 9f performs the following process. In other words, the update control unit 9f acquires the record management ID of the record including the registration contents matching the registration contents of the items of the newly anonymized record excluding "record management ID" with reference to the NG data TBL 8e (Step S710).

Further, the update control unit 9f specifies the record including the acquired record management ID among the records registered to the NG data TBL 8e, and deletes the specified record (Step S711). Then, the update control unit 9f specifies the record including newly acquired record management ID among the records of the distributed data TBL 8f. Next, the update control unit 9f updates the distributed data TBL 8f such that registration content of a verification target item of the specified record is used as registration content of a verification target item of the newly anonymized record (Step S712). Next, the update control unit 9f acquires the record newly updated in the distributed data TBL 8f, and outputs the acquired record to the communication unit 7 so that the acquired record is transmitted to the server 4 and the server 5 (Step S713).

Next, the update control unit 9f specifies the record including the record management ID of the record newly anonymized by the update control unit 9f among the records of the distributed data TBL 8f. Then, the update control unit 9f updates the distributed data TBL 8f such that registration content of a verification target item of the specified record is used as registration content of a verification target item of the newly anonymized record (Step S714). Next, the update control unit 9f acquires the record newly updated in the distributed data TBL 8f, and outputs the acquired record to the communication unit 7 so that the acquired record is transmitted to the server 4 and the server 5 (Step S715). Then, the update control unit 9f stores the processing result in the internal memory, and then returns.

Referring back to FIG. 22, when it is determined that the type of the data collected by the collecting unit 9a is not the update data (No in Step S108), the determining unit 9b determines whether or not the type of the data collected by the collecting unit 9a is the deletion data (Step S110). When it is determined that the type of the data collected by the collecting unit 9a is not the deletion data (No in Step S110), the process ends. However, when it is determined that the type of the data collected by the collecting unit 9a is the deletion data (Yes in Step S110), the deletion control unit 9g executes a deletion control process (Step S111), and the process ends.

Figure 29:
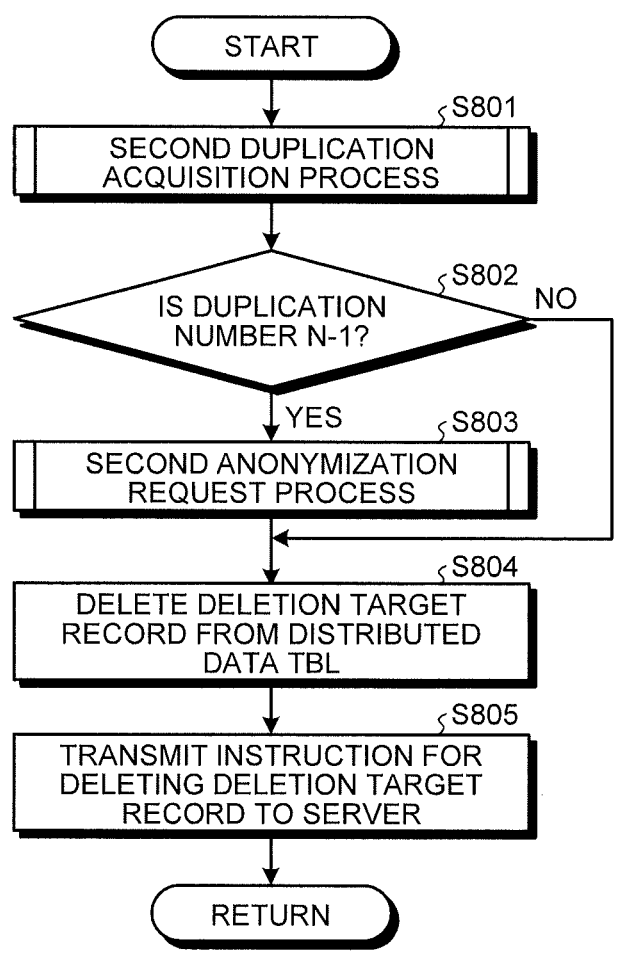
FIG. 29 is a flowchart illustrating a procedure of a deletion control process according to the first embodiment.

FIG. 29 is a flowchart illustrating a procedure of the deletion control process according to the first embodiment. As illustrated in FIG. 29, the deletion control unit 9g executes a second duplication number acquisition process (Step S801).

Figure 30:
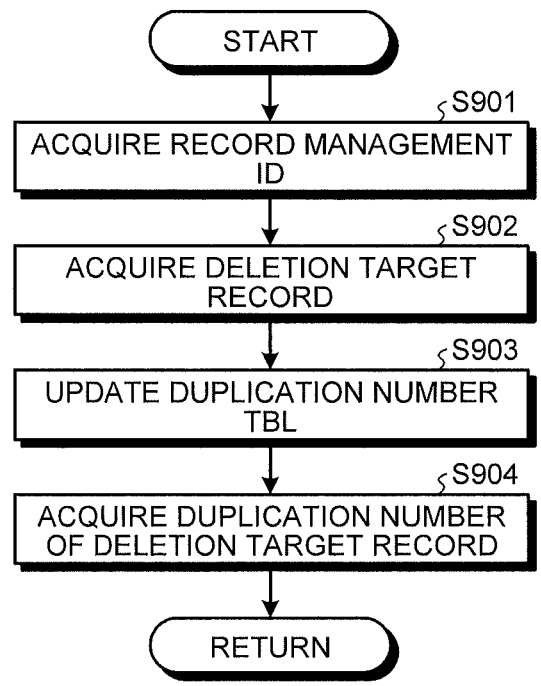
FIG. 30 is a flowchart illustrating a procedure of a second duplication number acquisition process according to the first embodiment.

FIG. 30 is a flowchart illustrating a procedure of the second duplication number acquisition process according to the first embodiment. As illustrated in FIG. 30, the deletion control unit 9g acquires the individual ID included in the deletion data, and acquires the record management ID corresponding to the acquired individual ID from the ID TBL 8g (Step S901).

Next, the deletion control unit 9g transmits an instruction for transmitting the deletion target record including the record management ID acquired by the deletion control unit 9g to the information processing device 6 to the communication unit 7 in order to transmit the instruction to the server 4 or the server 5. As a result, the deletion control unit 9g acquires the deletion target record including the acquired record management ID (Step S902).

Next, the deletion control unit 9g searches for the record including the registration contents of the items of the acquired record excluding "record management ID" among the records of the duplication number TBL 8d, and decreases the value registered to the item of "duplication number" of the record obtained as a result of search by one. As described above, the deletion control unit 9g updates the duplication number TBL 8d (Step S903).

Next, the deletion control unit 9g acquires the duplication number of the acquired record from the updated duplication number TBL 8d (Step S904), stores the processing result in the internal memory, and then returns.

Referring back to FIG. 29, the deletion control unit 9g determines whether or not the acquired duplication number is the value "N−1" obtained by decreasing the threshold value "N" of the duplication number by one with reference to the threshold value "N" of the duplication number registered to the definition data 8c (Step S802). When it is determined that the acquired duplication number is not "N−1" (No in Step S802), the process proceeds to Step S804.

Figure 31:
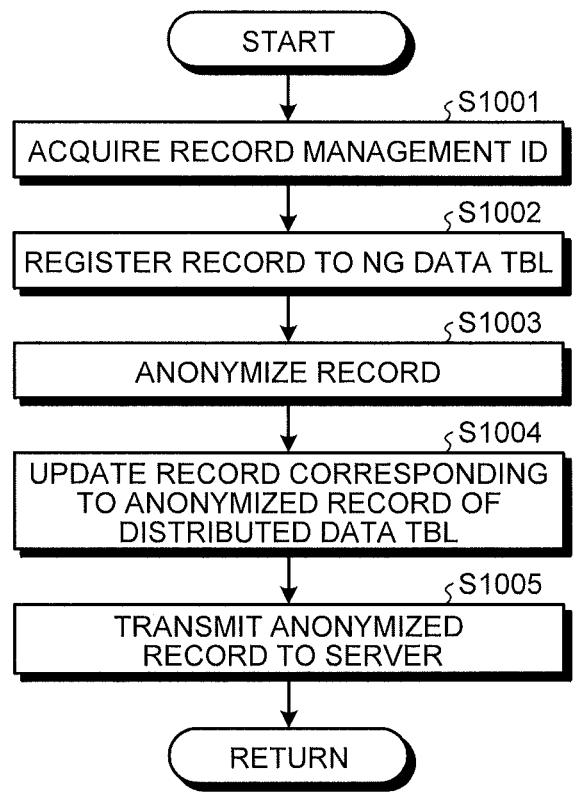
FIG. 31 is a flowchart illustrating a procedure of a second anonymization request process according to the first embodiment.

However, when it is determined that the acquired duplication number is "N−1" (Yes in Step S802), the deletion control unit 9g executes the second anonymization request process according to the first embodiment (Step S803). FIG. 31 is a flowchart illustrating a procedure of the second anonymization request process according to the first embodiment. As illustrated in FIG. 31, the deletion control unit 9g transmits an instruction for transmitting the following record management ID among the record management IDs of the record accumulated in the server 4 or the server 5 to the information processing device 6 to the communication unit 7 in order to transmit the instruction to the server 4 or the server 5. In other words, an instruction for transmitting the record management ID which is included in the record including the registration contents of the items excluding "record management ID" in the record acquired by the deletion control unit 9g and is not the record management ID acquired by the deletion control unit 9g is transmitted to the communication unit 7. As a result, the deletion control unit 9g newly acquires the record management ID from the server 4 or the server 5 (Step S1001).

Then, the deletion control unit 9g generates a record including the registration contents of the items excluding "record management ID" in the record acquired by the deletion control unit 9g and the newly acquired record management ID, and registers the generated record to the NG data TBL 8e (Step S1002).

Then, the deletion control unit 9g acquires the record newly registered to the NG data TBL 8e, and anonymizes registration content of an item, which is to be anonymized, represented by the definition data 8c with reference to the definition data 8c (Step S1003).

Then, the deletion control unit 9g specifies the record including the record management ID newly acquired by the deletion control unit 9g from among the records of the distributed data TBL 8f. Next, the deletion control unit 9g updates the distributed data TBL 8f such that registration content of a verification target item of the specified record is used as a registration content of a verification target item of the anonymized record (Step S1004).

Next, the deletion control unit 9g acquires the record (the anonymized record) newly updated in the distributed data TBL 8f, and outputs the acquired record to the communication unit 7 so that the acquired record is transmitted to the server 4 and the server 5 (Step S1005). Then, the deletion control unit 9g stores the processing result in the internal memory, and then returns.

Referring back to FIG. 29, the deletion control unit 9g specifies a record matching the deletion target record acquired by the deletion control unit 9g among the records of the distributed data TBL 8f, and deletes the specified record (Step S804).

Next, the deletion control unit 9g controls the communication unit 7 such that an instruction for deleting the record including the record management ID acquired by the deletion control unit 9g is transmitted to the server 4 and the server 5 (Step S805), stores the processing result in the internal memory, and then returns.

As described above, the information processing device 6 according to the present embodiment counts the number of records having a predetermined relation on the record included in the collected data, for example, the number of records that are the same in a combination of registration content of an item to be verified. When the counted number is N or more, the information processing device 6 outputs a plurality of records having a predetermined relation to the server 4 and the server 5. Further, when data is newly collected, the information processing device 6 counts the number of records having a predetermined relation on the records which are included in the previously collected data and the newly collected data. Thereafter, when the number of records having a predetermined relation which is counted on the records which are included in the previously collected data and the newly collected data is N or more, the information processing device 6 performs the following process. In other words, the information processing device 6 outputs the record included in the newly collected data among the plurality of records having the predetermined relation to the server 4 and the server 5. Thus, according to the information processing device 6, it is possible to suppress the amount of records which are determined not to satisfy a predetermined condition between records such as "match of record" among the records included in the collected data. As a result, many records can be effectively used when predetermined processing such as statistical processing is performed in the server 4 and the server 5 of the target system.

Further, when the number of records having a predetermined relation which is counted on the records which are included in the collected data is less than N, the information processing device 6 performs the following process. In other words, the information processing device 6 performs anonymization for discarding the registration content of the item to be anonymized on the plurality of records having a predetermined relation, and outputs a plurality of anonymized records to the server 4 and the server 5. Further, when data is newly collected, the information processing device 6 performs the following process when the number of records having a predetermined relation which is counted on the records which are included in the previously collected data and the newly collected data is less than N. In other words, the information processing device 6 performs anonymization for discarding the registration content of the item to be anonymized on the record included in the newly collected data among the plurality of records having a predetermined relation, and outputs the anonymized record to the server 4 and the server 5. Thus, according to the information processing device 6, the record in which the number of records having a predetermined relation is less than N can be subjected to anonymization for causing an individual to be unlikely to be identified, and then transmitted to the server 4 and the server 5.

Further, the information processing device 6 counts the number of records having a predetermined relation which are included in the collected data, and registers the counted number and the records having the predetermined relation to the duplication number TBL 8d in association with each other. Then, when data is newly collected, the information processing device 6 performs the following process. In other words, the information processing device 6 counts the number of records, which are included in the newly collected data, having a predetermined relation with the records registered to the duplication number TBL 8d and the records of the newly collected data, and updates the value of the number of the duplication number TBL 8d based on the counted number. Thus, according to the information processing device 6, it is possible to count the number of records having a predetermined relation in view of an output record using a table having a small amount of information such as the duplication number TBL 8d in which the number is registered for each record.

Further, when the update target record included in the previously collected data or the newly collected data is updated, the information processing device 6 counts the number of records having a predetermined relation on a non-updated update target record. Then, when the number of records having a predetermined relation which is counted on non-updated update target record is N−1, the information processing device 6 performs the following process. In other words, the information processing device 6 outputs an instruction of performing anonymization, for example, for discarding the registration content on the records having a predetermined relation with the non-updated update target record to the server 4 and the server 5. Thus, according to the information processing device 6, the records, accumulated in the server 4 and the server 5, in which an individual becomes likely to be identified can be updated to the records in which an individual is unlikely to be identified through the record update.

Further, the information processing device 6 counts the number of records having a predetermined relation on an updated update target record. Then, when the number of data having a predetermined relation which is counted on the updated update target record is N, the information processing device 6 outputs an instruction for releasing anonymity on the records having a predetermined relation with the updated record to the server 4 or the server 5. Thus, according to the information processing device 6, the records, accumulated in the server 4 and the server 5, in which an individual becomes unlikely to be identified through the record update can be updated to be used for a variety of processing such as statistical processing.

Further, when the number of records having a predetermined relation which is counted on the updated update target record is N or more, the information processing device 6 outputs the updated update target record to the server 4 and the server 5. Further, when the number of records having a predetermined relation which is counted on the updated update target record is less than N, the information processing device 6 anonymizes the updated update target record. Then, the information processing device 6 outputs the anonymized record to the server 4 and the server 5.

In addition, when the record included in the previously collected data or the newly collected data is deleted, the information processing device 6 counts the number of records having a predetermined relation on the deleted record. Then, when the number of records having a predetermined relation which is counted on the deleted record is N−1, the information processing device 6 outputs an instruction for anonymizing the record having a predetermined relation with the deleted data to the server 4 and the server 5. Thus, according to the information processing device 6, the records, accumulated in the server 4 and the server 5, in which an individual becomes likely to be identified through the record deletion can be updated to the records in which an individual becomes unlikely to be identified.

[b] Second Embodiment

The first embodiment has been described in connection with the example in which a variety of processing is performed using the duplication number TBL 8d and the NG data TBL 8e, but the information processing device according to this disclosure is not limited to this example. A second embodiment will be described in connection with an example in which a variety of processing is performed using a group ID string TBL 19c, an NGID TBL 19b, and a group ID TBL 19a which will be described later.

Figure 32:
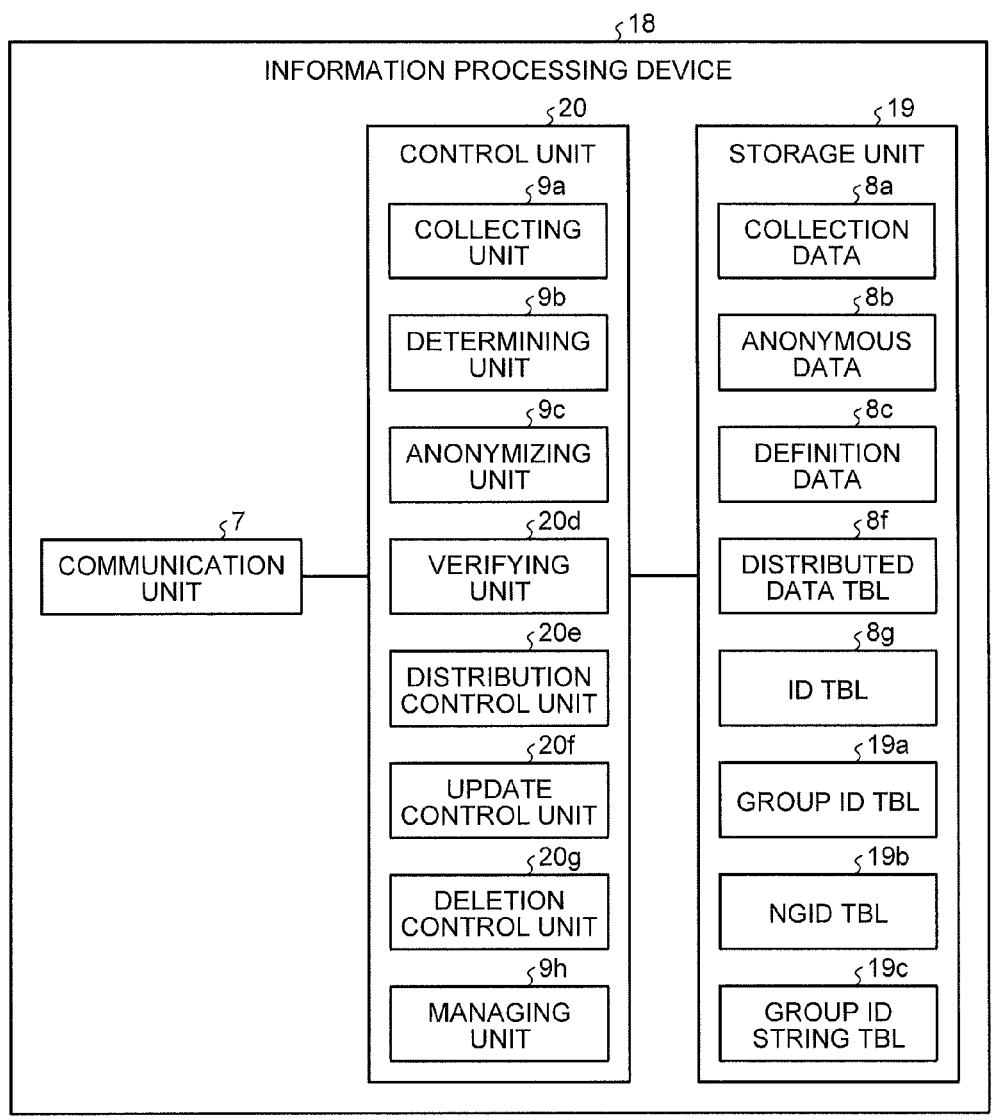
FIG. 32 is a diagram illustrating an example of a functional configuration of an information processing device according to a second embodiment.

FIG. 32 is a diagram illustrating an example of a functional configuration of an information processing device according to the second embodiment. An information processing device 18 includes the communication unit 7, a storage unit 19, and a control unit 20 as illustrated in FIG. 32. The storage unit 19 stores the group ID string TBL 19c, the NGID TBL 19b and the group ID TBL 19a, and differs from the storage unit 8 according to the first embodiment illustrated in FIG. 7 in this point. The control unit 20 includes a verifying unit 20d, a distribution control unit 20e, an update control unit 20f, and a deletion control unit 20g, and differs from the control unit 9 according to the first embodiment illustrated in FIG. 7 in this point. In the following, components having the same functions as in the first embodiment are denoted by the same reference numerals as in FIG. 7, and a description thereof will not be made. The configuration of the system according to the second embodiment is the same as the configuration of the system according to the first embodiment, and thus a description thereof will not be made.

For example, the server 2 and the server 3 transmit the data illustrated in the example of FIG. 3 to the information processing device 18, similarly to the first embodiment. Further, the information processing device 18 transmits the data illustrated in the example of FIG. 6 to the server 4 and the server 5, similarly to the first embodiment.

A group ID of a group to which a record belongs is registered to the group ID TBL 19a. FIG. 33 is a diagram illustrating an example of a data structure of the group ID TBL. A record of the group ID TBL 19a illustrated in the example of FIG. 33 includes items of "sex," "age," "height," and "weight" in which "YES" is registered to the item of "verification" among items for which names are registered to "item name" in the definition data 8c and an item of "group ID." For example, a first record of the group ID TBL 19a illustrated in the example of FIG. 33 represents that a group ID of a group to which a record of a sex "male," an age "20 to 29," the height "170 to 179," and the weight "60 to 69" belongs is "grp1." Further, records that are the same in registration content of a verification target item belong to the same group. In other words, the records that are the same in registration content of a verification target item are the same in the group ID registered to the group ID TBL 19a. The information processing device 6 according to the present embodiment counts the duplication number of the record by counting the group IDs registered to the group ID TBL 19a.

A record management ID included in a record in which the duplication number is less than N is registered to the NGID TBL 19b. FIG. 34 is a diagram illustrating an example of a data structure of the NGID TBL. A record of the NGID TBL 19b illustrated in the example of FIG. 34 includes an item of "record management ID." The NGID TBL 19b illustrated in the example of FIG. 34 represents an example in which the record management ID included in the record in which the duplication number is less than N is registered.

The record management ID and the group ID are registered to the group ID string TBL 19c in association with each other. FIG. 35 is a diagram illustrating an example of a data structure of the group ID string TBL. The group ID string TBL 19c illustrated in the example of FIG. 35 includes items of "record management ID" and "group ID." The record management ID is registered to the item of "record management ID." A group ID of a group to which a record including the record management ID registered to the item of "record management ID" belongs is registered to the item of "group ID." The first record of the group ID string TBL 19c of FIG. 35 represents that a record including a record management ID "aaa01" belongs to a group represented by a group ID "grp5."

For example, the storage unit 19 is a semiconductor memory device such as flash memory or a storage device such as a hard disk or an optical disk. The storage unit 19 is not limited to the storage devices of the above types and may be RAM (Random Access Memory) or ROM (Read Only Memory).

The control unit 20 includes internal memory that stores a program in which various processing procedures are specified and control data, and executes various kinds of processing based on the program and the control data. The control unit 20 includes the collecting unit 9a, the determining unit 9b, the anonymizing unit 9c, the verifying unit 20d, the distribution control unit 20e, the update control unit 20f, the deletion control unit 20g, and the managing unit 9h as illustrated in FIG. 32.

The collecting unit 9a, the determining unit 9b, the anonymizing unit 9c, and the managing unit 9h have the same configuration as in the first embodiment, and a description thereof will not be repeated.

The verifying unit 20d determines whether or not the duplication number of the record of the verification target is N or more, and verifies whether or not a verification target record is a record in which an individual is likely to be identified.

As an embodiment, when the anonymous data 8b is generated by the anonymizing unit 9c, the verifying unit 20d refers to the threshold value "N" of the duplication number registered to the definition data 8c. For example, when the definition data 8c illustrated in FIG. 9 remains stored in the storage unit 8, the verifying unit 20d refers to the threshold value "2" of the duplication number of the definition data 8c. The following description will proceed in connection with the example in which "2" remains registered to the definition data 8c as a threshold value of the duplication number, but an arbitrary value can be employed as the threshold value of the duplication number as long as the threshold value "N" of the duplication number registered to the definition data 8c is a natural number.

Next, the verifying unit 20d refers to an item, which is to be verified, represented by the definition data 8c. For example, when the definition data 8c illustrated in FIG. 9 remains stored in the storage unit 8, the verifying unit 20d refers to the items of "sex," "age," "height," and "weight" in which "YES" is registered to the item of "verification" of the definition data 8c.

Then, the verifying unit 20d performs the following process on an unprocessed record until an unprocessed record which is not subjected to the following process executed by the verifying unit 20d disappears. In other words, first of all, the verifying unit 20d acquires the anonymous data 8b which is newly generated and stored in the storage unit 8 from the storage unit 8, and selects an unprocessed record of the acquired anonymous data 8b. For example, when the anonymous data 8b illustrated in FIG. 8 is newly generated by the anonymizing unit 9c and then stored in the storage unit 8, the verifying unit 20d acquires the anonymous data 8b from the storage unit 8, and selects a record for which the number is "1."

Next, the verifying unit 20d acquires a combination of registration contents of items to be verified among registration contents of the items of the selected record. For example, when the record for which the number is "1" in the anonymous data 8b illustrated in FIG. 8 is selected, the verifying unit 20d acquires a combination of registration contents "male," "20 to 29," "160 to 169," and "60 to 69" of an item to be verified.

Then, the verifying unit 20d searches the group ID TBL 19a to check whether or not there is a group ID corresponding to the acquired registration content combination. When a group ID corresponding to the acquired combination of the registration contents is obtained as a result of search, the verifying unit 20d registers the acquired group ID and the record management ID included in the selected record to the group ID string TBL 19c in association with each other. For example, the verifying unit 20d obtains the group ID "grp1" when searching the group ID TBL 19a illustrated in FIG. 33 to check whether or not there is a group ID corresponding to a combination of registration contents "male," "20 to 29," "160 to 169," and "60 to 69." Then, the verifying unit 20d registers the acquired group ID "grp1" and the record management ID "aaa01" of the record for which the selected number is "1" to the group ID string TBL 19c in association with each other, and updates the group ID string TBL 19c.

Meanwhile, when the group ID corresponding to the acquired combination of the registration content is not obtained as a result of search, the verifying unit 20d generates a new group ID. Then, the verifying unit 20d registers the generated new group ID and the acquired registration content combination to the group ID TBL 19a in association with each other. In other words, the verifying unit 20d adds a record including the generated new group ID and the acquired registration content combination to the group ID TBL 19a. Then, the verifying unit 20d registers the generated new group ID and the record management ID included in the selected record to the group ID string TBL 19c in association with each other, and updates the group ID string TBL 19c.

When the group ID string TBL 19c is updated, the verifying unit 20d counts the number of the group IDs obtained by the verifying unit 20d or the generated new group IDs which are group IDs registered to the updated group ID string TBL 19c. For example, when a group ID "grp5" is obtained as a result of searching the group ID TBL 19a, the verifying unit 20d performs the following process when the registration content of the updated group ID string TBL 19c is content illustrated in FIG. 35. In other words, the verifying unit 20d counts the number of group ID "grp5," that is, "2" from the registration content illustrated in the example of FIG. 35. As described above, the verifying unit 20d calculates the duplication number of the selected record.

Then, the verifying unit 20d determines whether or not the duplication number of the selected record is the threshold value "N" of the referred duplication number or more.

When the duplication number is less than "N," since the selected record is the record in which an individual is likely to be identified, the verifying unit 20d registers the record management ID included in the selected record to the NGID TBL 19b. FIG. 36 is a diagram for describing an example of a process executed by the information processing device according to the second embodiment. For example, when the record management ID included in the selected record is "aaa06," the verifying unit 20d registers the record management ID "aaa06" to the NGID TBL 19b as illustrated in FIG. 36.

Meanwhile, when the duplication number is "N" or more, the verifying unit 20d determines whether or not the duplication number of the selected record is the threshold value "N" of the referred duplication number. When the duplication number is "N," as the selected record is newly transmitted from the server 2 or the server 3, since the selected record is not a record in which an individual is likely to be identified, the verifying unit 20d performs the following process. In other words, the verifying unit 20d acquires all the record management IDs corresponding to the acquired group ID or the new group ID from the group ID string TBL 19c, and deletes all the acquired record management IDs from the NGID TBL 19b. Further, the verifying unit 20d classifies the selected record into "OK" representing that an individual is unlikely to be identified. For example, the verifying unit 20d registers the selected record to an OK list developed in internal memory of the control unit 20. Further, the verifying unit 20d determines whether or not there is an unprocessed record among the records of the acquired anonymous data 8b, selects an unprocessed record when there is an unprocessed record, and performs the above-described process on the selected unprocessed record again.

The distribution control unit 20e distributes the anonymized data to the server 4 and the server 5 via the network 91. As an embodiment, first of all, the distribution control unit 20e determines whether or not there is a record management ID newly registered to the NGID TBL 19b by the verifying unit 20d among the record management ID of the records of the anonymous data 8b newly stored in the storage unit 8 through the anonymizing unit 9c.

When there is a record management ID newly registered to the NGID TBL 19b, the distribution control unit 20e refers to an item, which is to be anonymized, represented by the definition data 8c. For example, when the definition data 8c illustrated in FIG. 9 remains stored in the storage unit 19, the distribution control unit 20e performs the following process. In other words, the distribution control unit 20e refers to the items of "age," "height," and "weight" in which "YES" is registered to the item of "anonymization" of the definition data 8c. Then, the distribution control unit 20e selects an unprocessed record management ID among the record management IDs newly registered to the NGID TBL 19b. Then, the distribution control unit 20e acquires the record of the anonymous data 8b including the selected record management ID, and anonymizes registration content of an item, which is to be anonymized, represented by the definition data 8c among registration contents of items of the acquired record. For example, the distribution control unit 20e performs anonymization of discarding the registration contents and registering "null" to the items so that an individual is unlikely to be identified. Specifically, the distribution control unit 20e sets "null" to registration contents of the items of "age," "height," and "weight" as illustrated in the record for which the number is "3" in the data illustrated in FIG. 6. Then, the distribution control unit 20e determines whether or not there is an unprocessed record management ID among the record management IDs newly registered to the NGID TBL 19b, selects an unprocessed record management ID when it is determined that there is an unprocessed record management ID, and then performs the above-described process. As described above, the distribution control unit 20e performs the anonymizing process of anonymizing the records of the anonymous data 8b corresponding to all the record management IDs newly registered to the NGID TBL 19b. Here, the anonymization performed in the distribution control unit 20e is performed as "second anonymization" when the anonymization performed by the anonymizing unit 9c is performed as "first anonymization" so that the anonymization can be used as statistical processing. Further, the "second anonymization" may be performed by the anonymizing unit 9c instead of the distribution control unit 20e.

Then, when there is a record classified into "OK" by the anonymizing unit 9c, the distribution control unit 20e causes the record to be stored in the distributed data TBL 8f. In addition, when there is a record which has been subjected to the second anonymization, the distribution control unit 20e also causes the record of the second anonymization to be stored in the distributed data TBL 8f. Then, the distribution control unit 20e acquires data newly stored in the distributed data TBL 8f, and outputs the acquired data to the communication unit 7 so that the acquired data is transmitted to the server 4 and the server 5. As a result, for example, the data illustrated in the example of FIG. 6 is transmitted to the server 4 and the server 5.

Referring back to FIG. 32, when the update data is received, the update control unit 20f performs control such that a record that has newly increased in identifiability or data that has newly decreased in identifiability is updated among pieces of data accumulated in the server 4 and the server 5.

As an embodiment, when the update data transmitted from the server 2 and the server 3 is received, the update control unit 20f acquires the individual ID included in the update data, and acquires the record management ID corresponding to the acquired individual ID from the ID TBL 8g. For example, when the update data illustrated in the example of FIG. 4 is received, the update control unit 20f acquires the individual ID "1098" included in the update data, and acquires the record management ID "aaa01" corresponding to the individual ID "1098" from the ID TBL 8g illustrated in the example of FIG. 12.

Then, the update control unit 20f acquires the group ID corresponding to the acquired record management ID from the group ID string TBL 19c. For example, the update control unit 20f acquires the group ID "grp5" corresponding to the record management ID "aaa01" from the group ID string TBL 19c illustrated in FIG. 35. Then, the update control unit 20f deletes the record including the acquired record management ID from the group ID string TBL 19c. For example, the update control unit 20f deletes the record including the record management ID "aaa01" from the group ID string TBL 19c illustrated in FIG. 35. As a result, the registration content of the group ID string TBL 19c has the registration content illustrated in FIG. 37. FIG. 37 is a diagram illustrating an example of the registration content of the group ID string TBL. Then, the update control unit 20f calculates the duplication number of the record belonging to the group represented by the acquired group ID by counting the number of acquired group IDs with reference to the group ID string TBL 19c. For example, the update control unit 20f calculates the number of the group IDs "grp5," that is, "1" when acquiring the group ID "grp5" and referring to the group ID string TBL 19c illustrated in FIG. 37. In other words, the update control unit 20f calculates the duplication number "1" of the record belonging to the group represented by the group ID "grp5." Further, when the duplication number is "N−1," this means that the record belonging to the group ID acquired by the update control unit 20f is changed to the record in which an individual is likely to be identified.

Thereafter, the update control unit 20f determines whether or not the calculated duplication number is the value "N−1" obtained by decreasing the threshold value "N" of the duplication number by one with reference to the threshold value "N" of the duplication number registered to the definition data 8c. Here, when N is 2, for example, the update control unit 20f determines that the calculated duplication number "1" is "N−1" when the duplication number "1" of the record belonging to the acquired group ID is calculated.

When the calculated duplication number is "N−1," the update control unit 20f performs control such that the corresponding record accumulated in the server 4 and the server 5 is updated to a record in which an individual is unlikely to be identified. For example, the update control unit 20f acquires the record management ID corresponding to the acquired group ID from the group ID string TBL 19c. Specifically, the update control unit 20f acquires the record management ID "aaa06" corresponding to the group ID "grp5" from the group ID string TBL 19c illustrated in FIG. 37. Then, the update control unit 20f registers the acquired record management ID to the NGID TBL 19b. For example, the update control unit 20f registers the acquired record management ID "aaa06" to the NGID TBL 19b illustrated in FIG. 34. As a result, the registration content of the NGID TBL 19b has the registration content illustrated in FIG. 36.

Then, the update control unit 20f acquires registration content of a verification target item corresponding to the acquired group ID from the group ID TBL 19a. For example, the update control unit 20f acquires registration contents of "male," "20 to 29," "160 to 169," and "60 to 69" corresponding to the group ID "grp5" from the group ID TBL 19a illustrated in FIG. 33. Then, the update control unit 20f generates a record including the acquired registration content and the newly acquired record management ID. For example, the update control unit 20f generates a record including registration contents of "male," "20 to 29," "160 to 169," and "60 to 69" and the newly acquired record management ID "aaa06." Then, the update control unit 20f anonymizes registration content of an item, which is to be anonymized, represented by the definition data 8c on the generated record with reference to the definition data 8c. For example, the update control unit 20f performs anonymization for discarding registration content of an item to be anonymized on the generated record. A concrete example will be described. The update control unit 20f performs anonymization for discarding the registration contents of the items of "age," "height," and "weight" of the record and registering "null" to the items. For example, the update control unit 20f generates an anonymized record in which registration contents of "male," "null," "null," "null," and "aaa06" are registered to the items. As described above, the update control unit 20f anonymizes the generated record.

Further, instead of the update control unit 20f, the anonymizing unit 9c may anonymize the generated record.

Then, the update control unit 20f specifies the record including the record management ID newly acquired by the update control unit 20f among the records of the distributed data TBL 8f. Then, the update control unit 20f updates the distributed data TBL 8f such that registration content of the verification target item of the specified record is used as registration content of the verification target item of the anonymized record. For example, when the data illustrated in FIG. 6 remains registered to the distributed data TBL 8f, the update control unit 20f updates registration contents of the record including the record management ID "aaa06" to "male," "null," "null," and "null" as illustrated in FIG. 15.

Next, the update control unit 20f acquires the record (the anonymized record) newly updated in the distributed data TBL 8f, and outputs the acquired record to the communication unit 7 so that the acquired record is transmitted to the server 4 and the server 5. As a result, for example, the record of the record management ID "aaa06" illustrated in the example of FIG. 15 is transmitted to the server 4 and the server 5. The server 4 and the server 5 that have received the record of the record management ID "aaa06" illustrated in the example of FIG. 15 specify the record of the record management ID "aaa06" among the records accumulated in the DB 4a and the DB 5a, respectively. Then, each of the server 4 and the server 5 updates the specified record based on the received record. As a result, the records of the server 4 and the server 5 in which an individual newly becomes likely to be identified are updated to the records in which an individual is unlikely to be identified. As described above, when the calculated duplication number is "N−1," the update control unit 20f updates the records of the server 4 and the server 5 in which an individual newly becomes likely to be identified to the records in which the individual is unlikely to be identified.

Further, the update control unit 20f performs the following process regardless of the value of the calculated duplication number. For example, the update control unit 20f generates a record including the record management ID corresponding to the individual ID included in the update data and the registration content of the verification target item corresponding to the acquired group ID. Specifically, the update control unit 20f generates a record including the record management ID "aaa01" corresponding to the individual ID "1098" included in the update data illustrated in FIG. 4 and the following registration content. In other words, the update control unit 20f generates a record including registration contents "male," "20 to 29," "160 to 169," and "60 to 69" corresponding to the group ID "grp5." As a result, the record illustrated in the example of FIG. 16 is generated. Then, the update control unit 20f updates the registration content of the generated record based on the update content represented by the update data. For example, when the update data illustrated in FIG. 4 is received and the record illustrated in the example of FIG. 16 is generated, the update control unit 20f updates the age registered to the item of "age" to "30" based on the update content included in the update data as illustrated in the example of FIG. 17.

Then, the update control unit 20f anonymizes registration content of an item, which is to be anonymized, represented by the definition data 8c among the registration contents of the updated record with reference to the definition data 8c. For example, the update control unit 20f anonymizes the updated record such that the registration content of the item to be anonymized becomes vague. For example, the update control unit 20f performs anonymization for making vague registration contents of the items of "age," "height," and "weight" of the record as illustrated in FIG. 18. As a result, the anonymized record is generated.

Next, the update control unit 20f acquires a combination of registration content of an item to be verified among the registration contents of the items of the anonymized record. For example, when the record is anonymized as illustrated in FIG. 18, the update control unit 20f acquires a combination of registration contents "male," "30 to 39," "160 to 169," and "60 to 69" of the items to be verified.

Then, the update control unit 20f searches the group ID TBL 19a to check whether or not there is a group ID corresponding to the acquired registration content combination. When a group ID corresponding to the acquired combination of the registration contents is obtained as a result of search, the update control unit 20f registers the acquired group ID to the group ID string TBL 19c in association with the record management ID included in the anonymized record. For example, the update control unit 20f obtains the group ID "grp4" when searching the group ID TBL 19a illustrated in FIG. 33 to check whether or not there is a group ID corresponding to a combination of the registration contents "male," "30 to 39," "160 to 169," and "60 to 69." Then, the update control unit 20f registers the acquired group ID "grp4" to the group ID string TBL 19c in association with the record management ID "aaa01" included in the anonymized record as illustrated in FIG. 38, and updates the group ID string TBL 19c. FIG. 38 is a diagram illustrating an example of the registration content of the group ID string TBL.

Meanwhile, when the group ID corresponding to the acquired combination of the registration content is not obtained as a result of search, the update control unit 20f generates a new group ID. Then, the update control unit 20f registers the generated new group ID and the acquired registration content combination to the group ID TBL 19a in association with each other. In other words, the update control unit 20f adds a record including the generated new group ID and the acquired registration content combination to the group ID TBL 19a. Then, the update control unit 20f registers the generated new group ID and the record management ID included in the selected record to the group ID string TBL 19c in association with each other, and updates the group ID string TBL 19c.

When the group ID string TBL 19c is updated, the update control unit 20f counts the number of group IDs obtained by the update control unit 20f or the generated new group IDs, which are group IDs registered to the updated group ID string TBL 19c. For example, when the group ID "grp4" is obtained as a result of searching the group ID TBL 19a and the registration content of the updated group ID string TBL 19c is the content illustrated in FIG. 38, the update control unit 20f performs the following process. In other words, the update control unit 20f counts the number of the group IDs "grp4," that is, "2" from the registration content illustrated in the example of FIG. 38. As described above, the update control unit 20f calculates the duplication number of the record belonging to the group represented by the acquired group ID or the generated new group ID.

Then, the update control unit 20f determines whether or not the duplication number of the record belonging to the group represented by the acquired group ID or the generated new group ID is the threshold value "N" of the referred duplication number or more.

When the duplication number is less than "N," since the record belonging to the group represented by the acquired group ID or the generated new group ID is the record in which an individual is likely to be identified, the update control unit 20f performs the following process. In other words, the update control unit 20f registers the record management ID corresponding to the individual ID included in the update data to the NGID TBL 19b.

Then, the update control unit 20f anonymizes registration content of an item, which is to be anonymized, represented by the definition data 8c on the newly anonymized record with reference to the definition data 8c. For example, the update control unit 20f performs anonymization for discarding registration content of an item to be anonymized on the anonymized record. As described above, the update control unit 20f performs the second anonymization on the anonymized record. Instead of the update control unit 20f, the anonymizing unit 9c may perform the second anonymization.

Then, the update control unit 20f specifies the record including the record management ID corresponding to the individual ID included in the update data among the records of the distributed data TBL 8f. Then, the update control unit 20f updates the distributed data TBL 8f such that registration content of the verification target item of the specified record is used as registration content of the verification target item of the anonymized record.

Next, the update control unit 20f acquires the record (the anonymized record) newly updated in the distributed data TBL 8f, and outputs the acquired record to the communication unit 7 so that the acquired record is transmitted to the server 4 and the server 5. As a result, for example, the acquired record is transmitted to the server 4 and the server 5. The server 4 and the server 5 that have received the record specify the record including the record management ID included in the received record among the records accumulated in the DB 4a and the DB 5a, respectively. Then, each of the server 4 and the server 5 updates the specified record based on the received record. As a result, the records of the server 4 and the server 5 are updated based on the update data.

Meanwhile, when the duplication number is "N" or more, the update control unit 20f determines whether or not the duplication number of the record belonging to the group represented by the acquired group ID or the generated new group ID is the threshold value "N" of the referred duplication number. When it is determined that the duplication number is "N," since all the records belonging to the group to which the updated record belongs are not the record in which an individual is likely to be identified due to the update of the record, the update control unit 20f performs the following process. In other words, the update control unit 20f acquires all the record management IDs corresponding to the acquired group ID or the new group ID from the group ID string TBL 19c. Then, the update control unit 20f deletes the record management IDs excluding the record management ID included in the update data among all the acquired record management IDs from the NGID TBL 19b. FIG. 39 is a diagram for describing an example of a process executed by the information processing device according to the second embodiment. For example, the update control unit 20f acquires all the record management IDs "aaa01" and "aaa10" corresponding to the group ID "grp4" from the group ID string TBL 19c illustrated in FIG. 38. Then, the update control unit 20f deletes the record management ID "aaa10" excluding the record management ID "aaa01" included in the update data in the record management IDs "aaa01" and "aaa10" from the NGID TBL 19b. As a result, for example, the NGID TBL 19b is updated from the registration content illustrated in FIG. 36 to the registration content illustrated in FIG. 39.

Then, the update control unit 20f searches for the record including the record management IDs excluding the record management ID included in the update data among the record management IDs newly acquired by the update control unit 20f from among the records of the distributed data TBL 8f. For example, the update control unit 20f searches for the record including the record management ID "aaa10" excluding the record management ID "aaa01" included in the update data in the newly acquired record management IDs "aaa01" and "aaa10." Then, the update control unit 20f updates the distributed data TBL 8f such that registration content of a verification target item of the record obtained as a result of search is used as registration content of a verification target item of the newly anonymized record. For example, the update control unit 20f updates registration contents "male," "null," "null," and "null" of the record including the record management ID "aaa01" in the distributed data TBL 8f as follows. In other words, the update control unit 20f updates the anonymized record to have registration contents "male," "30 to 39," "160 to 169," and "60 to 69."

Next, the update control unit 20f acquires the record (the anonymized record) newly updated in the distributed data TBL 8f, and outputs the acquired record to the communication unit 7 so that the acquired record is transmitted to the server 4 and the server 5. As a result, for example, the record of the record management ID "aaa10" illustrated in the example of FIG. 20 is transmitted to the server 4 and the server 5. The server 4 and the server 5 that have received the record of the record management ID "aaa10" illustrated in the example of FIG. 20 specify the record of the record management ID "aaa10" among the records accumulated in the DB 4a and the DB 5a, respectively. Then, each of the server 4 and the server 5 updates the specified record based on the received record. As a result, the records of the server 4 and the server 5 in which an individual newly becomes unlikely to be identified are updated to be used for a variety of processing such as statistical processing. As described above, when the duplication number is "N," the update control unit 20f updates the records of the server 4 and the server 5 in which an individual newly becomes unlikely to be identified so that the records can be used for a variety of processing such as statistical processing.

Further, when the duplication number is "N" or more, the update control unit 20f performs the following process regardless of a determination result on whether or not the duplication number is "N." In other words, the update control unit 20f specifies the record including the record management ID of the record newly anonymized by the update control unit 20f among the records of the distributed data TBL 8f. Then, the update control unit 20f updates the distributed data TBL 8f such that registration content of a verification target item of the specified record is used as registration content of a verification target item of the newly anonymized record. For example, when the date illustrated in FIG. 20 remains registered to the distributed data TBL 8f, the update control unit 20f performs the following process when the anonymized record illustrated in the example of FIG. 18 is generated. In other words, the update control unit 20f updates the registration content of the age of record including the record management ID "aaa01" of the distributed data TBL 8f to "30 to 39" as illustrated in FIG. 21.

Next, the update control unit 20f acquires the record newly updated in the distributed data TBL 8f, and outputs the acquired record to the communication unit 7 so that the acquired record is transmitted to the server 4 and the server 5. As a result, for example, the record of the record management ID "aaa01" illustrated in the example of FIG. 21 is transmitted to the server 4 and the server 5. The server 4 and the server 5 that have received the record of the record management ID "aaa01" illustrated in the example of FIG. 21 specify the record of the record management ID "aaa01" among the records accumulated in the DB 4a and the DB 5a, respectively. Then, each of the server 4 and the server 5 updates the specified record based on the received record. As described above, the update control unit 20f can update the records of the server 4 and the server 5 based on the update data.

Referring back to FIG. 32, when the deletion data is received, the deletion control unit 20g performs control such that the record in which an individual newly becomes likely to be identified among pieces of data accumulated in the server 4 and the server 5 is updated.

As an embodiment, when the deletion data transmitted from the server 2 and the server 3 is received, the deletion control unit 20g acquires the individual ID included in the deletion data, and acquires the record management ID corresponding to the acquired individual ID from the ID TBL 8g. For example, when the deletion data illustrated in the example of FIG. 5 is received, the deletion control unit 20g acquires the individual ID "1098" included in the deletion data, and acquires the record management ID "aaa01" corresponding to the individual ID "1098" from the ID TBL 8g illustrated in the example of FIG. 12.

Next, the deletion control unit 20g acquires the group ID corresponding to the acquired record management ID from the group ID string TBL 19c. For example, the deletion control unit 20g acquires the group ID "grp5" corresponding to the record management ID "aaa01" from the group ID string TBL 19c illustrated in FIG. 35. Next, the deletion control unit 20g deletes the record including the acquired record management ID from the group ID string TBL 19c. For example, the deletion control unit 20g deletes the record including the record management ID "aaa01" from the group ID string TBL 19c illustrated in FIG. 35. As a result, the registration content of the group ID string TBL 19c has the registration content illustrated in FIG. 37. Then, the deletion control unit 20g calculates the duplication number of the record belonging to the group represented by the acquired group ID by counting the number of acquired group IDs with reference to the group ID string TBL 19c. For example, the deletion control unit 20g calculates the number of the group IDs "grp5," that is, "1" when acquiring the group ID "grp5" and referring to the group ID string TBL 19c illustrated in FIG. 37. In other words, the deletion control unit 20g calculates the duplication number "1" of the record belonging to the group represented by the group ID "grp5." Further, when the duplication number is "N−1," this means that the record belonging to the group ID acquired by the deletion control unit 20g is changed to the record in which an individual is likely to be identified.

Thereafter, the deletion control unit 20g determines whether or not the calculated duplication number is the value "N−1" obtained by decreasing the threshold value "N" of the duplication number by one with reference to the threshold value "N" of the duplication number registered to the definition data 8c. Here, when N is 2, for example, the deletion control unit 20g determines that the calculated duplication number "1" is "N−1" when the duplication number "1" of the record belonging to the acquired group ID is calculated.

When the calculated duplication number is "N−1," the deletion control unit 20g performs control such that the corresponding record accumulated in the server 4 and the server 5 is updated to a record in which an individual is unlikely to be identified. For example, the deletion control unit 20g acquires the record management ID corresponding to the acquired group ID from the group ID string TBL 19c. Specifically, the deletion control unit 20g acquires the record management ID "aaa06" corresponding to the group ID "grp5" from the group ID string TBL 19c illustrated in FIG.

37. Then, the deletion control unit 20g registers the acquired record management ID to the NGID TBL 19b. For example, the deletion control unit 20g registers the acquired record management ID "aaa06" to the NGID TBL 19b illustrated in FIG. 34. As a result, the registration content of the NGID TBL 19b has the registration content illustrated in FIG. 36.

Then, the deletion control unit 20g acquires registration content of a verification target item corresponding to the acquired group ID from the group ID TBL 19a. For example, the deletion control unit 20g acquires registration contents of "male," "20 to 29," "160 to 169," and "60 to 69" corresponding to the group ID "grp5" from the group ID TBL 19a illustrated in FIG. 33. Then, the deletion control unit 20g generates a record including the acquired registration content and the newly acquired record management ID. For example, the deletion control unit 20g generates a record including registration contents of "male," "20 to 29," "160 to 169," and "60 to 69" and the newly acquired record management ID "aaa06." Then, the deletion control unit 20g anonymizes registration content of an item, which is to be anonymized, represented by the definition data 8c on the generated record with reference to the definition data 8c. For example, the deletion control unit 20g performs anonymization for discarding registration content of an item to be anonymized on the generated record. A concrete example will be described. The deletion control unit 20g performs anonymization for discarding the registration contents of the items of "age," "height," and "weight" of the record and registering "null" to the items. For example, the deletion control unit 20g generates an anonymized record in which registration contents of "male," "null," "null," "null," and "aaa06" are registered to the items. As described above, the deletion control unit 20g anonymizes the generated record. Further, instead of the deletion control unit 20g, the anonymizing unit 9c may anonymize the generated record.

Then, the deletion control unit 20g specifies the record including the record management ID newly acquired by the deletion control unit 20g among the records of the distributed data TBL 8f. Then, the deletion control unit 20g updates the distributed data TBL 8f such that registration content of the verification target item of the specified record is used as registration content of the verification target item of the anonymized record. For example, when the data illustrated in FIG. 6 remains registered to the distributed data TBL 8f, the deletion control unit 20g updates registration contents of the record including the record management ID "aaa06" to "male," "null," "null," and "null" as illustrated in FIG. 15.

Next, the deletion control unit 20g acquires the record (the anonymized record) newly updated in the distributed data TBL 8f, and outputs the acquired record to the communication unit 7 so that the acquired record is transmitted to the server 4 and the server 5. As a result, for example, the record of the record management ID "aaa06" illustrated in the example of FIG. 15 is transmitted to the server 4 and the server 5. The server 4 and the server 5 that have received the record of the record management ID "aaa06" illustrated in the example of FIG. 15 specify the record of the record management ID "aaa06" among the records accumulated in the DB 4a and the DB 5a, respectively. Then, each of the server 4 and the server 5 updates the specified record based on the received record. As a result, the records of the server 4 and the server 5 in which an individual newly becomes likely to be identified are updated to the records in which an individual is unlikely to be identified. As described above, when the calculated duplication number is "N−1," the deletion control unit 20g updates the records of the server 4 and the server 5 in which an individual newly becomes likely to be identified to the records in which the individual is unlikely to be identified.

Further, the deletion control unit 20g performs the following process regardless of the value of the acquired duplication number. For example, the deletion control unit 20g specifies the record including the record management ID corresponding to the individual ID included in the deletion data among the records of the distributed data TBL 8f, and deletes the specified record.

Next, the deletion control unit 20g transmits an instruction for deleting the record including the record management ID corresponding to the individual ID included in the deletion data to the communication unit 7 so that the instruction is transmitted to the server 4 and the server 5. In other words, the deletion control unit 20g transmits the instruction for deleting the record represented by the deletion data to the communication unit 7. As a result, the instruction is transmitted to the server 4 and the server 5. The server 4 and the server 5 that have received the instruction specifies the record including the record management ID represented by the instruction among the records accumulated in the DB 4a and the DB 5a, and deletes the specified record.

The control unit 20 is an IC such as ASIC. The control unit 20 may be an FPGA. The control unit 20 may be an electronic circuit such as a CPU. Alternatively, the control unit 20 may be an MPU.

Figure 40:
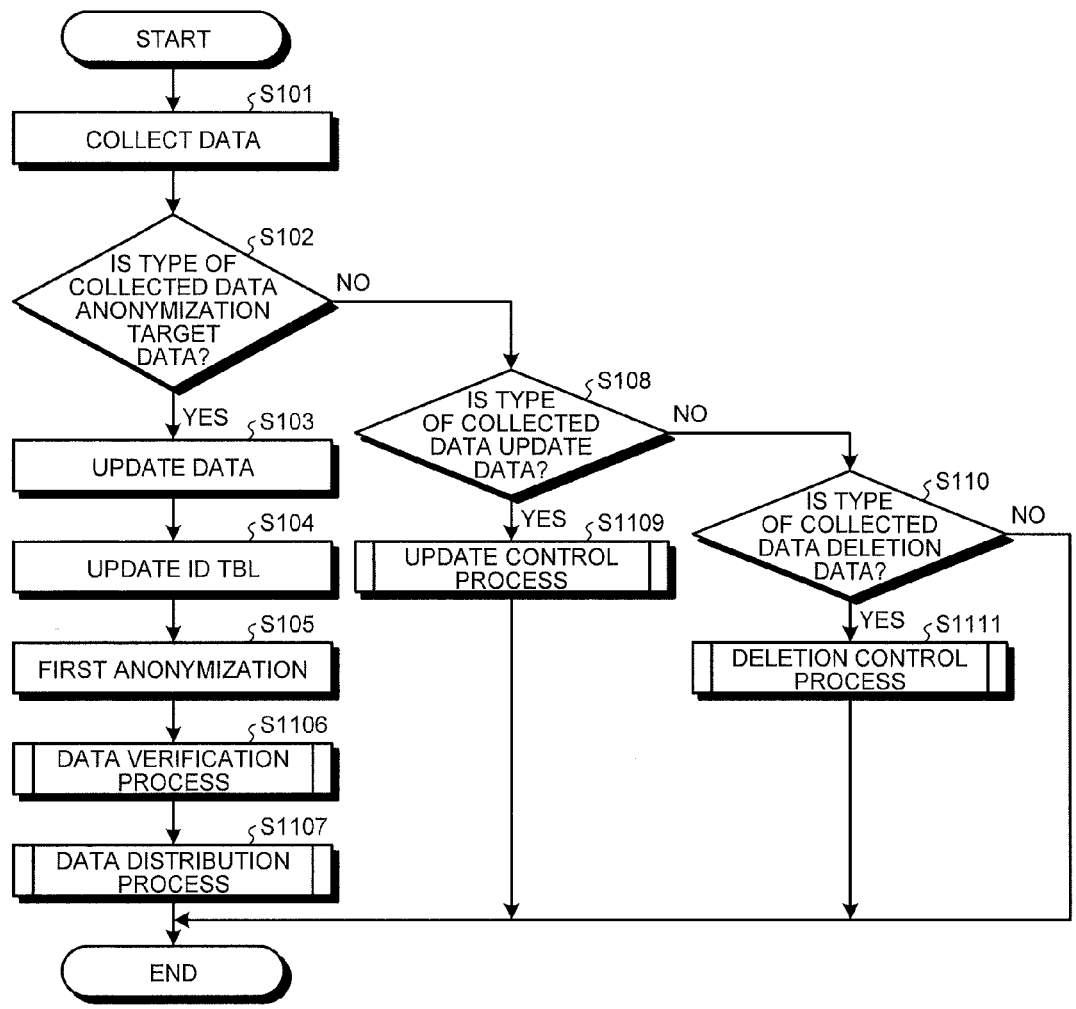
FIG. 40 is a flowchart illustrating a procedure of a control process according to the second embodiment.

Next, the flow of the process executed by the information processing device according to the present embodiment will be described. FIG. 40 is a flowchart illustrating a procedure of a control process according to the second embodiment.

As illustrated in FIG. 40, the collecting unit 9a collects a variety of data transmitted from the server 2 and the server 3 via the network 90 (Step S101).

Next, the determining unit 9b determines whether or not the type of the data collected by the collecting unit 9a is an anonymization target data (Step S102). When it is determined that the type of the data collected by the collecting unit 9a is the anonymization target data (Yes in Step S102), the determining unit 9b acquires an individual ID included in the anonymization target data, and generates a record management ID corresponding to the acquired individual ID. Then, the determining unit 9b discards the acquired individual ID, registers the anonymization target data to the record management ID, and updates the anonymization target data (Step S103).

Then, the determining unit 9b updates the ID TBL 8g by registering the acquired individual ID and the generated record management ID to the ID TBL 8g (Step S104) in association with each other.

Next, the anonymizing unit 9c discards the registration content of the item to be discarded, represented by the definition data 8c from the registration content of each item of the updated anonymization target data with reference to the definition data 8c. Then, the anonymizing unit 9c anonymizes registration content of an item, which is to be anonymized, represented by the definition data 8c among the registration contents of the items which have not been discarded from the registration contents of the items of the updated anonymization target data. Then, the anonymizing unit 9c stores the anonymous data 8b obtained as a result of anonymizing in the storage unit 8 (Step S105). Then, the verifying unit 20d executes a data verification process (Step S1106).

Figure 41:
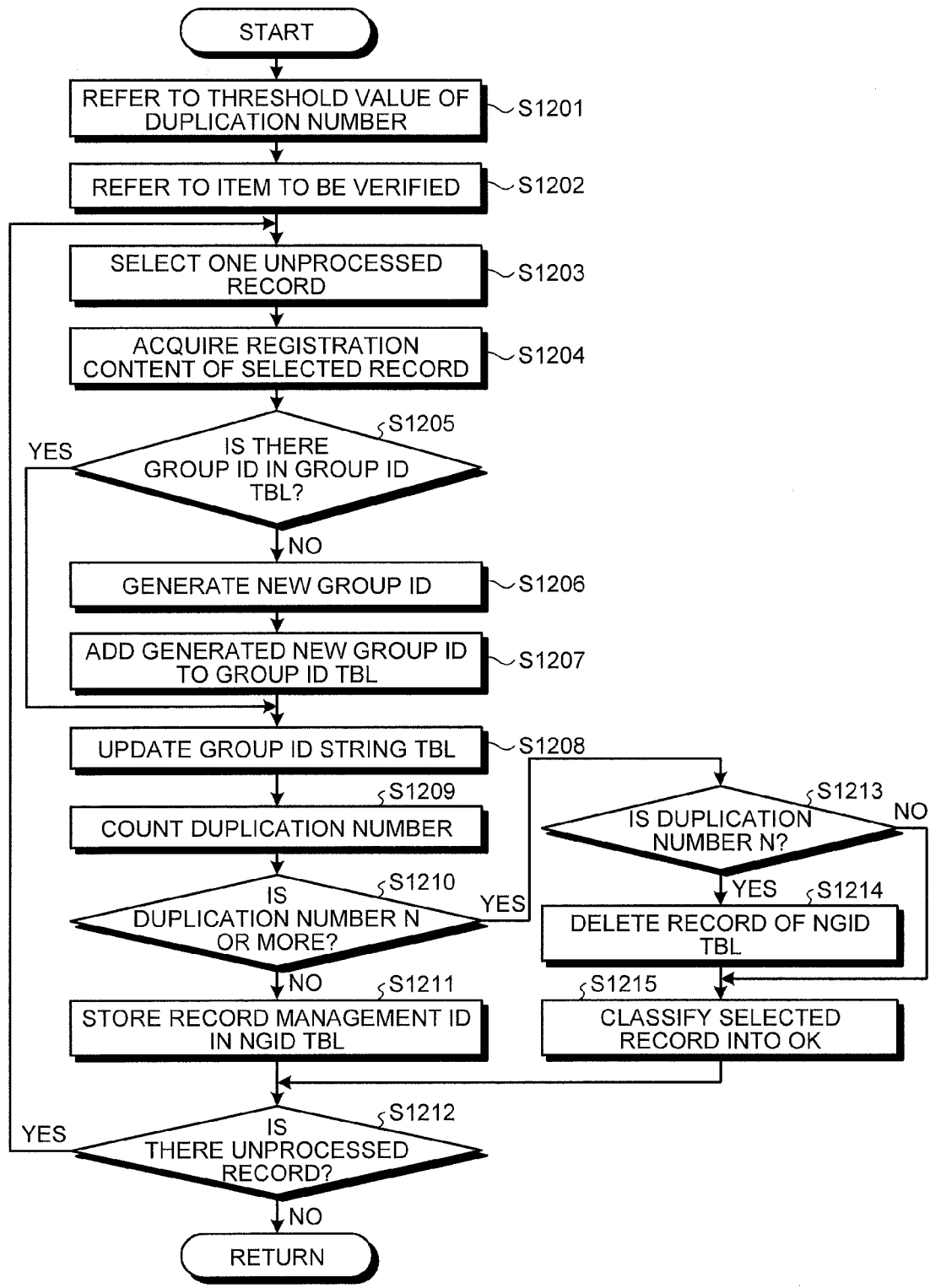
FIG. 41 is a flowchart illustrating a procedure of a data verification process according to the second embodiment.

FIG. 41 is a flowchart illustrating a procedure of a data verification process according to the second embodiment. As illustrated in FIG. 41, the verifying unit 20d refers to the threshold value "N" of the duplication number registered to the definition data 8c (Step S1201). Then, the verifying unit 20d refers to an item, which is to be verified, represented by the definition data 8c (Step S1202).

Next, the verifying unit 20d acquires the anonymous data 8b which is newly generated and stored in the storage unit 8 from the storage unit 8, and selects an unprocessed record of the acquired anonymous data 8b (Step S1203). Then, the verifying unit 20d acquires a combination of registration content of an item to be verified among registration contents of the items of the selected record (Step S1204).

Thereafter, the verifying unit 20d searches the group ID TBL 19a to check whether or not there is a group ID corresponding to the acquired registration content combination (Step S1205). When the group ID corresponding to the acquired combination of the registration content is obtained as a result of search (Yes in Step S1205), the verifying unit 20d performs the following process. In other words, the verifying unit 20d registers the acquired group ID and the record management ID included in the selected record to the group ID string TBL 19c in association with each other, and update the group ID string TBL 19c (Step S1208).

Meanwhile, when the group ID corresponding to the acquired combination of the registration content is not obtained as a result of search (No in Step S1205), the verifying unit 20d generates a new group ID (Step S1206). Then, the verifying unit 20d registers the generated new group ID and the acquired registration content combination to the group ID TBL 19a in association with each other (Step S1207). Then, the verifying unit 20d registers the generated new group ID and the record management ID included in the selected record to the group ID string TBL 19c in association with each other, and updates the group ID string TBL 19c (Step S1208).

Next, the verifying unit 20d counts the number of the group IDs acquired by the verifying unit 20d or the generated new group IDs which are registered to the updated group ID string TBL 19c, and counts the duplication number of the selected record (Step S1209).

Then, the verifying unit 20d determines whether or not the duplication number of the selected record is the threshold value "N" of the referred duplication number or more (Step S1210).

When it is determined that the duplication number is less than "N" (No in Step S1210), the verifying unit 20d registers the record management ID included in the selected record to the NGID TBL 19b (Step S1211). Then, the verifying unit 20d determines whether or not there is an unprocessed record among the records of the acquired anonymous data 8b (Step S1212). When it is determined that there is an unprocessed record (Yes in Step S1212), the verifying unit 20d causes the process to return to Step S1203, selects an unprocessed record, and then performs the above-described process again. However, when it is determined that there is no unprocessed record (No in Step S1212), the verifying unit 20d stores the processing result in the internal memory, and then returns.

Meanwhile, when the duplication number is "N" or more (Yes in Step S1210), the verifying unit 20d determines whether or not the duplication number of the selected record is the threshold value "N" of the referred duplication number (Step S1213). When it is determined that the duplication number is not "N" (No in Step S1213), the verifying unit 20d causes the process to proceed to Step S1215. However, when it is determined that the duplication number is "N" (Yes in Step S1213), the verifying unit 20d performs the following process. In other words, the verifying unit 20d acquires all the record management IDs corresponding to the acquired group ID or the new group ID from the group ID string TBL 19c, and deletes all the acquired record management IDs from the NGID TBL 19b (Step S1214).

Then, the verifying unit 20d classifies the selected record into "OK" representing that an individual is unlikely to be identified (Step S1215), and then the process proceeds to Step S1212.

Figure 42:
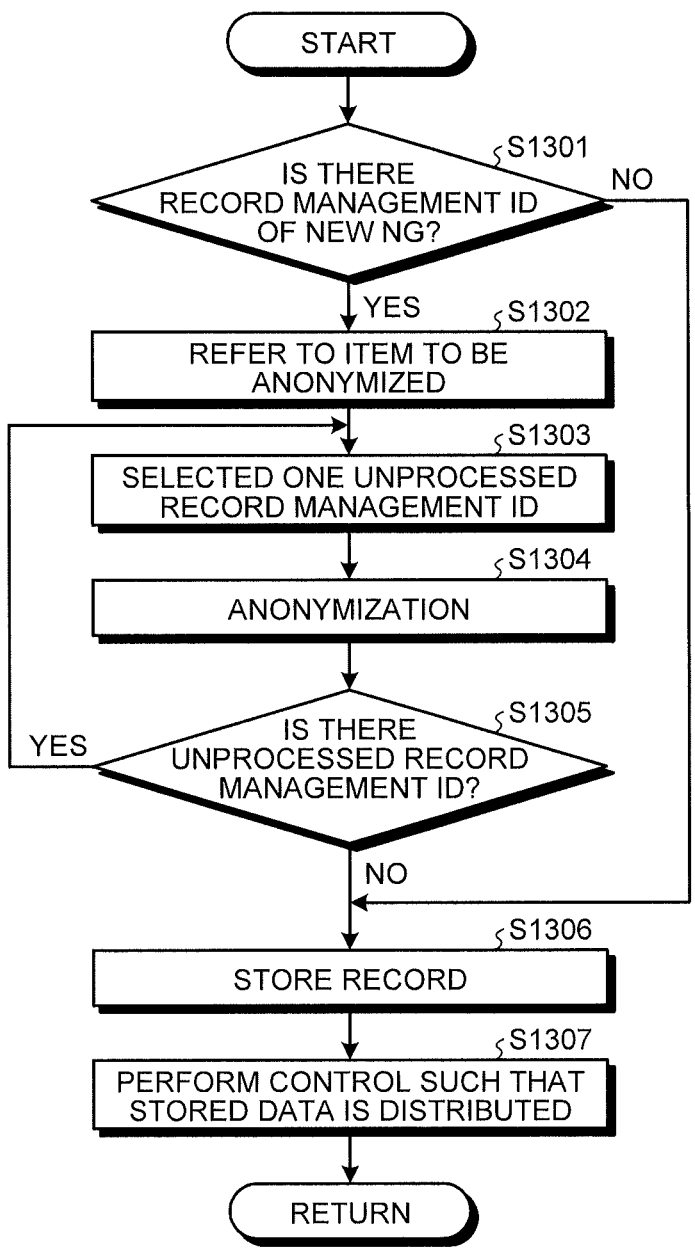
FIG. 42 is a flowchart illustrating a procedure of a data distribution process according to the second embodiment.

Referring back to FIG. 40, the distribution control unit 20e executes the data distribution process (Step S1107). FIG. 42 is a flowchart illustrating a procedure of the data distribution process according to the second embodiment. As illustrated in FIG. 42, the distribution control unit 20e determines whether or not there is a record management ID newly registered to the NGID TBL 19b through the verifying unit 20d among record management IDs of the records of the anonymous data 8b newly stored in the storage unit 8 through the anonymizing unit 9c (Step S1301). When it is determined that there is no record management ID registered to the NGID TBL 19b among record management IDs of the records of the anonymous data 8b (No in Step S1301), the distribution control unit 20e causes the process to proceed to Step S1306. However, when it is determined that there is record management ID registered to the NGID TBL 19b among record management IDs of the records of the anonymous data 8a (Yes in Step S1301), the distribution control unit 20e performs the following process. In other words, the distribution control unit 20e refers to an item, which is to be anonymized, represented by the definition data 8c (Step S1302).

Then, the distribution control unit 20e selects an unprocessed record management ID among the record management IDs newly registered to the NGID TBL 19b (Step S1303). Then, the distribution control unit 20e acquires the record the anonymous data 8b including the selected record management ID, and anonymizes registration content of an item, which is to be anonymized, represented by the definition data 8c among registration contents of items of the acquired record (Step S1304). Then, the distribution control unit 20e determines whether or not there is an unprocessed record management ID among the record management IDs newly registered to the NGID TBL 19b (Step S1305). When it is determined that there is an unprocessed record management ID (Yes in Step S1305), the distribution control unit 20e causes the process to proceed to Step S1303, selects an unprocessed record management ID, and performs the above-described process again.

However, when it is determined that there is no unprocessed record management ID (No in Step S1305), the distribution control unit 20e performs the following process. In other words, when there is a record classified into "OK" through the anonymizing unit 9c, the distribution control unit 20e stores the record in the distributed data TBL 8f. In addition, when there is a record which has been subjected to the second anonymization, the distribution control unit 20e also causes the record of the second anonymization to be stored in the distributed data TBL 8f (Step S1306). Next, the distribution control unit 20e acquires data newly stored in the distributed data TBL 8f, and outputs the acquired data to the communication unit 7 so that the acquired data is transmitted to the server 4 and the server 5 (Step S1307). Then, the distribution control unit 20e stores the processing result in the internal memory, and then returns.

Referring back to FIG. 40, when it is determined that the type of the data collected by the collecting unit 9a is not the anonymization target data (No in Step S102), the determining unit 9b determines whether or not the type of the data collected by the collecting unit 9a is the updated data (Step S108). When it is determined that the type of the data collected by the collecting unit 9a is the updated data (Yes in Step S108), the update control unit 20f executes the update control process (Step S1109), and then the process ends.

Figure 43:
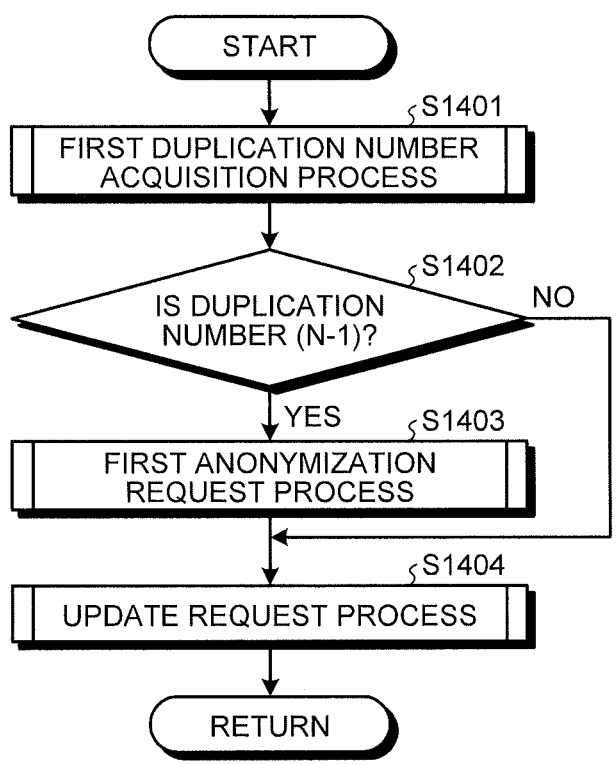
FIG. 43 is a flowchart illustrating a procedure of an update control process according to the second embodiment.

FIG. 43 is a flowchart illustrating a procedure of an update control process according to the second embodiment. As illustrated in FIG. 43, the update control unit 20*f* executes the first duplication number acquisition process (Step S1401).

Figure 44:
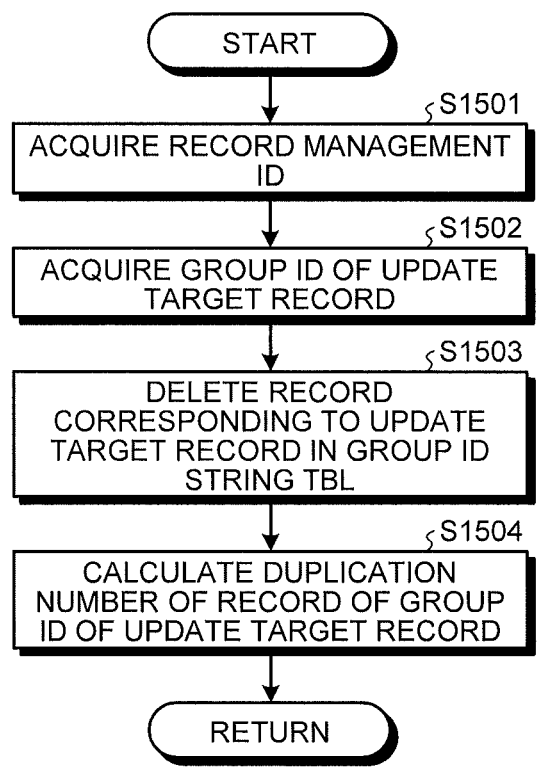
FIG. 44 is a flowchart illustrating a procedure of a first duplication number acquisition process according to the second embodiment.

FIG. 44 is a flowchart illustrating a procedure of the first duplication number acquisition process according to the second embodiment. As illustrated in FIG. 44, the update control unit 20*f* acquires the individual ID included in the update data, and acquires the record management ID corresponding to the acquired individual ID from the ID TBL 8*g* (Step S1501).

Next, the update control unit 20*f* acquires the group ID corresponding to the acquired record management ID from the group ID string TBL 19*c* (Step S1502). Next, the update control unit 20*f* deletes the record including the acquired record management ID from the group ID string TBL 19*c* (Step S1503). Then, the update control unit 20*f* calculates the duplication number of the record belonging to the group represented by the acquired group ID by counting the number of the acquired group IDs with reference to the group ID string TBL 19*c* (Step S1504), stores the processing result in the internal memory, and then returns.

Referring back to FIG. 43, the update control unit 20*f* determines whether or not the calculated duplication number is the value "N–1" obtained by decreasing the threshold value "N" of the duplication number by one with reference to the threshold value "N" of the duplication number registered to the definition data 8*c* (Step S1402).

When it is determined that the acquired duplication number is not "N–1" (No in Step S1402), the update control unit 20*f* causes the process to proceed to Step S1404. However, when it is determined that the acquired duplication number is "N–1" (Yes in Step S1402), the update control unit 20*f* executes the first anonymization request process (Step S1403).

Figure 45:
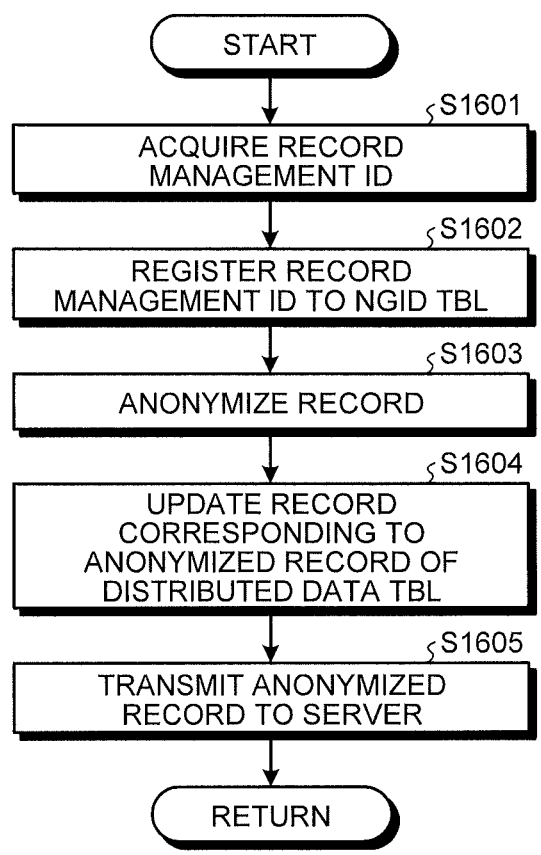
FIG. 45 is a flowchart illustrating a procedure of a first anonymization request process according to the second embodiment.

FIG. 45 is a flowchart illustrating a procedure of the first anonymization request process according to the second embodiment. As illustrated in FIG. 45, the update control unit 20*f* acquires the record management ID corresponding to the acquired group ID from the group ID string TBL 19*c* (Step S1601). Then, the update control unit 20*f* registers the acquired record management ID to the NGID TBL 19*b* (Step S1602).

Then, the update control unit 20*f* acquires registration content of a verification target item corresponding to the acquired group ID from the group ID TBL 19*a*, and generates a record including the acquired registration content and the newly acquired record management ID. Next, the update control unit 20*f* anonymizes registration content of an item, which is to be anonymized, represented by the definition data 8*c* on the generated record with reference to the definition data 8*c* (Step S1603).

Then, the update control unit 20*f* specifies the record including the record management ID newly acquired by the update control unit 20*f* among the records of the distributed data TBL 8*f*. Next, the update control unit 20*f* updates the distributed data TBL 8*f* such that registration content of a verification target item of the specified record is used as a registration content of a verification target item of the anonymized record (Step S1604).

Thereafter, the update control unit 20*f* acquires the record (the anonymized record) newly updated in the distributed data TBL 8*f*, and outputs the acquired record to the communication unit 7 so that the acquired record is transmitted to the server 4 and the server 5 (Step S1605). Then, the update control unit 20*f* stores the processing result in the internal memory, and then returns.

Referring back to FIG. 43, the update control unit 20*f* executes the update request process (Step S1404), stores the processing result in the internal memory, and then returns.

Figure 46:
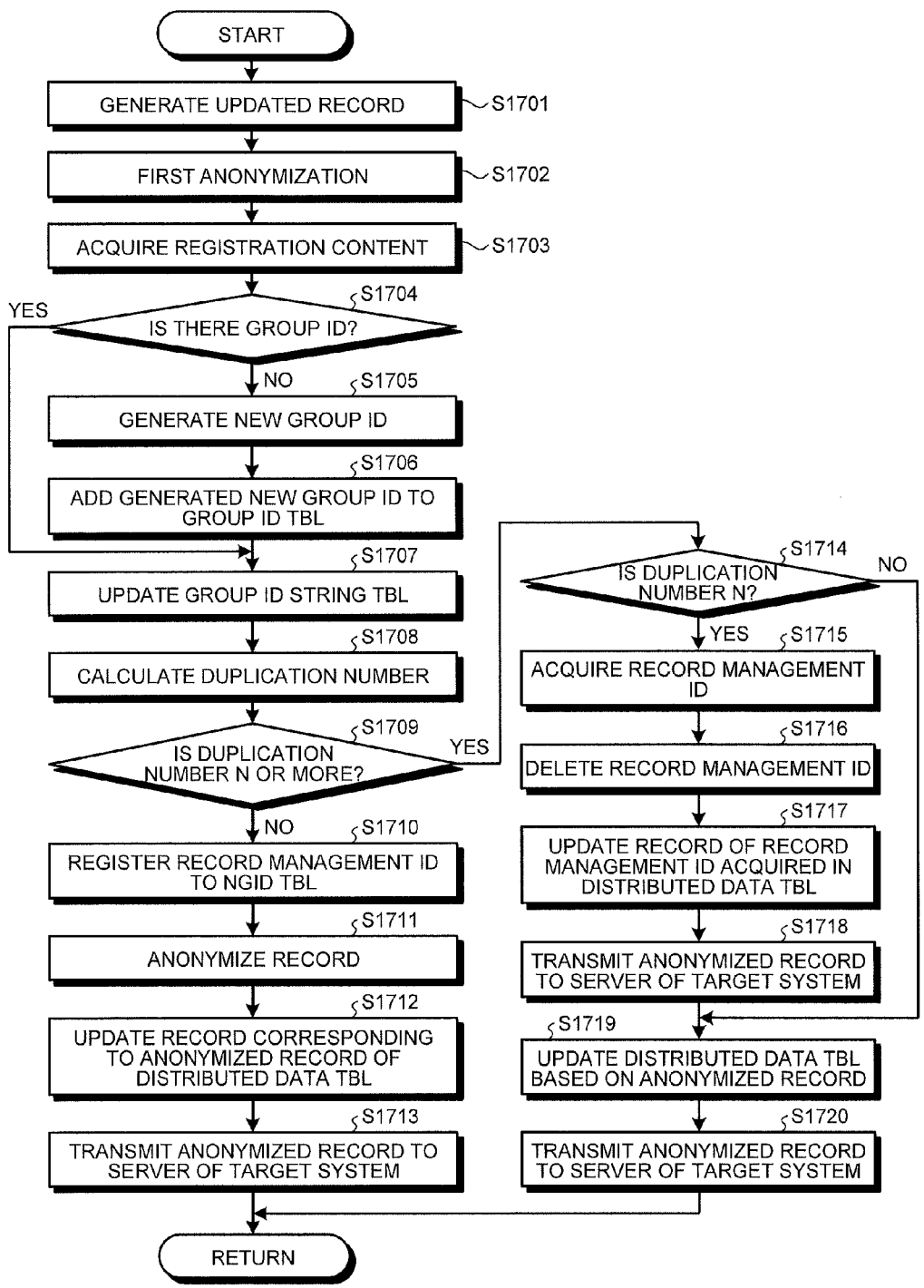
FIG. 46 is a flowchart illustrating a procedure of an update request process according to the second embodiment.

FIG. 46 is a flowchart illustrating a procedure of the update request process according to the second embodiment. As illustrated in FIG. 46, the update control unit 20*f* generates a record including the record management ID corresponding to the individual ID included in the update data and registration content of a verification target item corresponding to the acquired group ID. Then, the update control unit 20*f* updates the registration content of the generated record based on the update content represented by the update data (Step S1701).

Then, the update control unit 20*f* anonymizes registration content of an item, which is to be anonymized, represented by the definition data 8*c* among the registration contents of the updated record with reference to the definition data 8*c* (Step S1702). Next, the update control unit 20*f* acquires a combination of registration content of an item to be verified among the registration contents of the items of the anonymized record (Step S1703).

Then, the update control unit 20*f* searches the group ID TBL 19*a* to check whether or not there is a group ID corresponding to the acquired registration content combination (Step S1704). When the group ID corresponding to the acquired combination of the registration content is obtained as a result of search (Yes in Step S1704), the update control unit 20*f* performs the following process. In other words, the update control unit 20*f* registers the acquired group ID and the group ID string TBL 19*c* in association with the record management ID included in the anonymized record (Step S1707). Then, the update control unit 20*f* causes the process to proceed to Step S1708.

However, when the group ID corresponding to the acquired combination of the registration content is not obtained as a result of search (No in Step S1704), the update control unit 20*f* generates a new group ID (Step S1705). Then, the update control unit 20*f* registers the generated new group ID and the acquired registration content combination to the group ID TBL 19*a* in association with each other (Step S1706). Then, the update control unit 20*f* registers the generated new group ID and the record management ID included in the selected record to the group ID string TBL 19*c* in association with each other (Step S1707).

Then, the update control unit 20*f* counts the number of the group IDs acquired by the update control unit 20*f* or the generated new group IDs which are registered to the updated group ID string TBL 19*c*, and calculates the duplication number (Step S1708).

Then, the update control unit 20*f* determines whether or not the duplication number of the record belonging to the group represented by the acquired group ID or the generated new group ID is the threshold value "N" of the referred duplication number or more (Step S1709).

When it is determined that the duplication number is less than "N" (No in Step S1709), the update control unit 20*f* registers the record management ID corresponding to the individual ID included in the update data to the NGID TBL 19*b* (Step S1710).

Then, the update control unit 20*f* anonymizes registration content of an item, which is to be anonymized, represented by the definition data 8*c* on the newly anonymized record with reference to the definition data 8*c* (Step S1711).

Then, the update control unit 20*f* specifies the record including the record management ID corresponding to the individual ID included in the update data among the records of the distributed data TBL 8*f*. Then, the update control unit 20*f* updates the distributed data TBL 8*f* such that registration content of a verification target item of the specified record is used as a registration content of a verification target item of the anonymized record (Step S1712).

Next, the update control unit 20f acquires the record (the anonymized record) newly updated in the distributed data TBL 8f, and outputs the acquired record to the communication unit 7 so that the acquired record is transmitted to the server 4 and the server 5 (Step S1713). Then, the update control unit 20f stores the processing result in the internal memory, and then returns.

However, when it is determined that the duplication number is "N" or more (Yes in Step S1709), the update control unit 20f performs the following process. In other words, the update control unit 20f determines whether or not the duplication number of the record belonging to the group represented by the acquired group ID or the generated new group ID is the threshold value "N" of the referred duplication number (Step S1714). When it is determined that the duplication number is "N" (Yes in Step S1714), the update control unit 20f acquires all the record management IDs corresponding to the acquired group ID or the new group ID from the group ID string TBL 19c (Step S1715). Then, the update control unit 20f deletes the record management IDs excluding the record management ID included in the update data among all the acquired record management IDs from the NGID TBL 19b (Step S1716).

Then, the update control unit 20f searches for the record including the record management IDs excluding the record management ID included in the update data among the record management IDs newly acquired by the update control unit 20f from among the records of the distributed data TBL 8f. Next, the update control unit 20f updates the distributed data TBL 8f such that registration content of a verification target item of the record obtained as a result of search is used as registration content of a verification target item of the newly anonymized record (Step S1717).

Next, the update control unit 20f acquires the record (the anonymized record) newly updated in the distributed data TBL 8f, and outputs the acquired record to the communication unit 7 so that the acquired record is transmitted to the server 4 and the server 5 (Step S1718).

Then, the update control unit 20f specifies the record including the record management ID of the record newly anonymized by the update control unit 20f among the records of the distributed data TBL 8f. Then, the update control unit 20f updates the distributed data TBL 8f such that registration content of a verification target item of the specified record is used as registration content of a verification target item of the newly anonymized record (Step S1719).

Next, the update control unit 20f acquires the record newly updated in the distributed data TBL 8f, and outputs the acquired record to the communication unit 7 so that the acquired record is transmitted to the server 4 and the server 5 (Step S1720). Then, the update control unit 20f stores the processing result in the internal memory, and then returns.

Referring back to FIG. 40, when it is determined that the type of the data collected by the collecting unit 9a is not the update data (No in Step S108), the determining unit 9b determines whether or not the type of the data collected by the collecting unit 9a is the deletion data (Step S110). When it is determined that the type of the data collected by the collecting unit 9a is not the deletion data (No in Step S110), the process ends. However, when it is determined that the type of the data collected by the collecting unit 9a is the deletion data (Yes in Step S110), the deletion control unit 20g executes the deletion control process (Step S1111), and then the process ends.

Figure 47:
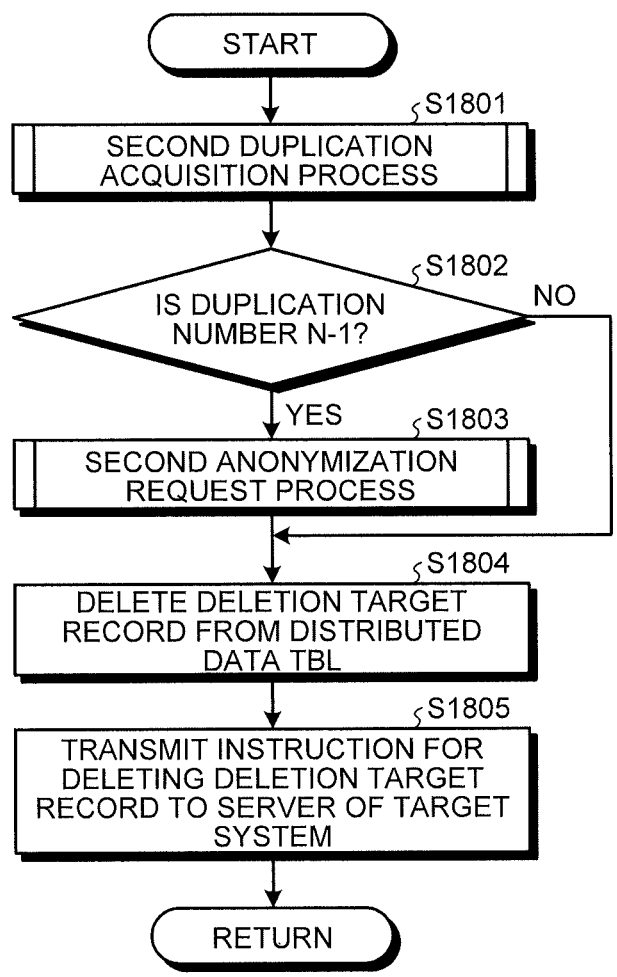
FIG. 47 is a flowchart illustrating a procedure of a deletion control process according to the second embodiment.

FIG. 47 is a flowchart illustrating a procedure of a deletion control process according to the second embodiment. As illustrated in FIG. 47, the deletion control unit 20g executes the second duplication number acquisition process (Step S1801).

Figure 48:
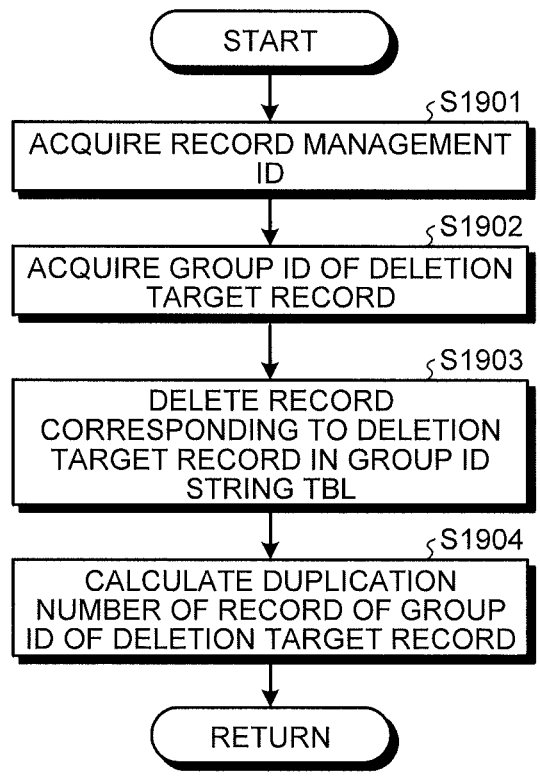
FIG. 48 is a flowchart illustrating a procedure of a second duplication number acquisition process according to the second embodiment.

FIG. 48 is a flowchart illustrating a procedure of the second duplication number acquisition process according to the second embodiment. As illustrated in FIG. 48, the deletion control unit 20g acquires the individual ID included in the deletion data, and acquires the record management ID corresponding to the acquired individual ID from the ID TBL 8g (Step S1901).

Next, the deletion control unit 20g acquires the group ID corresponding to the acquired record management ID from the group ID string TBL 19c (Step S1902). Next, the deletion control unit 20g deletes the record including the acquired record management ID from the group ID string TBL 19c (Step S1903). Then, the deletion control unit 20g calculates the duplication number of the record belonging to the group represented by the acquired group ID by counting the number of acquired group IDs with reference to the group ID string TBL 19c (Step S1904). Then, the deletion control unit 20g stores the processing result in the internal memory, and then returns.

Referring back to FIG. 47, the deletion control unit 20g determines whether or not the calculated duplication number is the value "N-1" obtained by decreasing the threshold value "N" of the duplication number by one (1) with reference to the threshold value "N" of the duplication number registered to the definition data 8c (Step S1802). When it is determined that the acquired duplication number is not "N-1" (No in Step S1802), the process proceeds to Step S1804.

Figure 49:
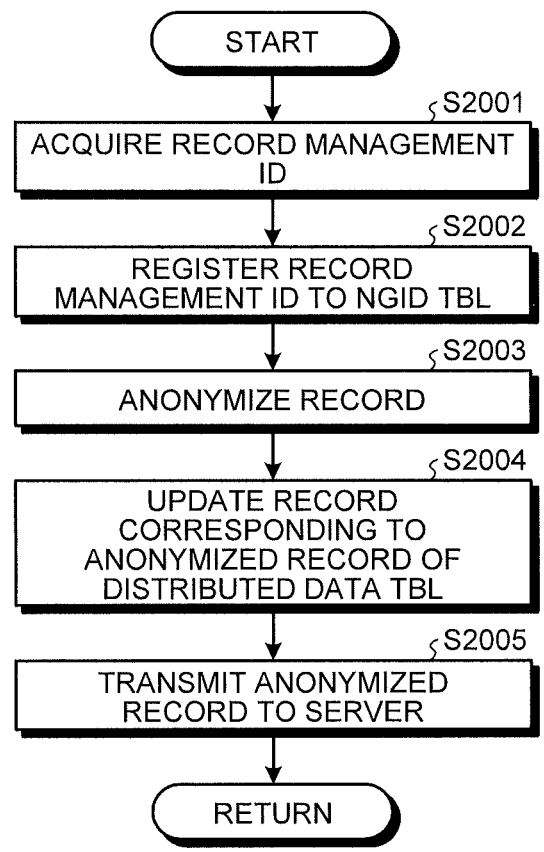
FIG. 49 is a flowchart illustrating a procedure of a second anonymization request process according to the second embodiment.

However, when it is determined that the acquired duplication number is "N-1" (Yes in Step S1802), the deletion control unit 20g executes the second anonymization request process (Step S1803). FIG. 49 is a flowchart illustrating a procedure of the second anonymization request process according to the second embodiment. As illustrated in FIG. 49, the deletion control unit 20g acquires the record management ID corresponding to the acquired group ID from the group ID string TBL 19c (Step S2001). Then, the deletion control unit 20g registers the acquired record management ID to the NGID TBL 19b (Step S2002).

Then, the deletion control unit 20g acquires registration content of a verification target item corresponding to the acquired group ID from the group ID TBL 19a, and generates a record including the acquired registration content and the newly acquired record management ID. Then, the deletion control unit 20g anonymizes registration content of an item, which is to be anonymized, represented by the definition data 8c on the generated record with reference to the definition data 8c (Step S2003).

Then, the deletion control unit 20g specifies the record including the record management ID newly acquired by the deletion control unit 20g among the records of the distributed data TBL 8f. Then, the deletion control unit 20g updates the distributed data TBL 8f such that registration content of a verification target item of the specified record is used as a registration content of a verification target item of the anonymized record (Step S2004).

Next, the deletion control unit 20g acquires the record (the anonymized record) newly updated in the distributed data TBL 8f, and outputs the acquired record to the communication unit 7 so that the acquired record is transmitted to the server 4 and the server 5 (Step S2005). Then, the deletion control unit 20g stores the processing result in the internal memory, and then returns.

Referring back to FIG. 47, the deletion control unit 20g specifies the record including the record management ID corresponding to the individual ID included in the deletion data among the records of the distributed data TBL 8f, and deletes the specified record (Step S1804).

Next, the deletion control unit 20g transmits an instruction for deleting the record including the record management ID corresponding to the individual ID included in the deletion data to the communication unit 7 so that the instruction is transmitted to the server 4 and the server 5 (Step S1805). Then, the deletion control unit 20g stores the processing result in the internal memory, and then returns.

As described above, the information processing device 18 according to the present embodiment counts the number of records having a predetermined relation on the record included in the collected data, for example, the number of records that are the same in a combination of registration content of an item to be verified. When the counted number is N or more, the information processing device 18 outputs a plurality of records having a predetermined relation to the server 4 and the server 5. Further, when data is newly collected, the information processing device 18 counts the number of records having a predetermined relation on the records which are included in the previously collected data and the newly collected data. Thereafter, when the number of records having a predetermined relation on the records which are counted on the records which are included in the previously collected data and the newly collected data is N or more, the information processing device 18 performs the following process. In other words, the information processing device 18 outputs the record included in the newly collected data among the plurality of records having the predetermined relation to the server 4 and the server 5. Thus, according to the information processing device 18, it is possible to suppress the amount of records which are determined not to satisfy a predetermined condition between records such as "match of record" among the records included in the collected data. As a result, many records can be effectively used when predetermined processing such as statistical processing is performed in the server 4 and the server 5 of the target system.

Further, when the number of records having a predetermined relation which is counted on the records which are included in the collected data is less than N, the information processing device 18 performs the following process. In other words, the information processing device 18 performs anonymization for discarding the registration content of the item to be anonymized on the plurality of records having a predetermined relation, and outputs a plurality of anonymized records to the server 4 and the server 5. Further, when data is newly collected, the information processing device 18 performs the following process when the number of records having a predetermined relation which is counted on the records which are included in the previously collected data and the newly collected data is less than N. In other words, the information processing device 18 performs anonymization for discarding the registration content of the item to be anonymized on the record included in the newly collected data among the plurality of records having a predetermined relation, and outputs the anonymized record to the server 4 and the server 5. Thus, according to the information processing device 18, the record in which the number of records having a predetermined relation is less than N can be subjected to anonymization for causing an individual to be unlikely to be identified, and then transmitted to the server 4 and the server 5.

Further, the information processing device 18 registers a different group ID to the group ID TBL 19a or the group ID string TBL 19c in association with each of the records included in the collected data for each combination of the records having a predetermined relation included in the collected data. Further, the information processing device 18 counts the number of records having a predetermined relation on the record included in the collected data by counting the number of group IDs registered to the group ID string TBL 19c. Further, when data is newly collected, the information processing device 18 performs the following process when counting the number of records having a predetermined relation on the records included in the previously collected data and the newly collected data. In other words, the information processing device 18 performs the following process using a different group ID for each combination of records having a predetermined relation with the record registered to the group ID TBL 19a and the record included in the newly collected data. In other words, the information processing device 18 registers the group ID to the group ID TBL 19a or the group ID string TBL 19c in association with each of the record included in the newly collected data. Then, the information processing device 18 counts the number of data having a predetermined relation on the records included in the previously collected data and the newly collected data by counting the number of group IDs registered to the group ID string TBL 19c.

Further, when the update target record included in the previously collected data or the newly collected data is updated, the information processing device 18 counts the number of records having a predetermined relation on the non-updated update target record. Then, when the number of records having a predetermined relation which is counted on the non-updated update target record is N−1, the information processing device 18 performs the following process. In other words, the information processing device 18 outputs an instruction for anonymizing the record having a predetermined relation with the non-updated update target record, for example, an instruction for discarding the registration content thereof to the server 4 and the server 5. Thus, according to the information processing device 18, the records, accumulated in the server 4 and the server 5, in which an individual becomes likely to be identified can be updated to the records in which an individual is unlikely to be identified through the record update.

Further, the information processing device 18 counts the number of records having a predetermined relation on an updated update target record. Then, when the number of data having a predetermined relation which is counted on the updated update target record is N, the information processing device 18 outputs an instruction for releasing anonymity on the records having a predetermined relation with the updated record to the server 4 or the server 5. Thus, according to the information processing device 18, the records, accumulated in the server 4 and the server 5, in which an individual becomes unlikely to be identified through the record update can be updated to be used for a variety of processing such as statistical processing.

Further, when the number of records having a predetermined relation which is counted on the updated update target record is N or more, the information processing device 18 outputs the updated update target record to the server 4 and the server 5. Further, when the number of records having a predetermined relation which is counted on the updated update target record is less than N, the information processing device 18 anonymizes the updated update target record. Then, the information processing device 18 outputs the anonymized record to the server 4 and the server 5.

In addition, when the record included in the previously collected data or the newly collected data is deleted, the information processing device 18 counts the number of records having a predetermined relation on the deleted record. Then, when the number of records having a predetermined relation which is counted on the deleted record is N−1, the information processing device 18 outputs an instruction for anonymizing the record having a predetermined relation with the deleted data to the server 4 and the server 5. Thus, according to the information processing device 18, the records, accumulated in the server 4 and the server 5, in which an individual becomes likely to be identified through the record deletion can be updated to the records in which an individual becomes unlikely to be identified.

Further, the information processing device 18 stores the registration content of the item to be verified of the record in association with the group ID. Thus, the information processing device 18 can control update or deletion of the record of the server 4 or the server 5 using the stored group ID and the registration content without acquiring the update target record or the deletion target record from the server 4 or the server 5.

The embodiments related to the system of the disclosure have been described so far, but the present invention can be implemented in various different forms in addition to the above embodiments. In this regard, other embodiments included in the present invention will be described below.

For example, various kinds of processing such as the update control process and the deletion control process can be executed when the user inputs an instruction for executing the processing to the information processing devices 6 and 18 through a client device 10.

Further, among the processes described in the above embodiments, the processes described to be automatically performed may be manually performed in whole or in part. Further, among the processes described in the present embodiment, the processes described to be manually performed may be automatically performed in whole or in part by a well-known method.

Further, the processes of steps of the processes described in the above embodiment may be arbitrarily divided finally or combined together according to various kinds of loads, use statuses, or the like. Further, a part of the processes of steps can be omitted.

Further, the processes of steps of the processes described in the above embodiment may be changed according to various kinds of loads, use statuses, or the like.

In addition, the components of the respective described devices illustrated in the drawings are functional and conceptual, and need not be necessarily configured physically as illustrated in the drawings. In other words, a concrete form of distribution or integration of the respective devices is not limited to ones illustrated in the drawings, and the respective devices in whole or in part may be functionally or physically distributed or integrated in arbitrary units according to various kinds of loads, use statuses, or the like.

Control Program

Figures 50, 51:
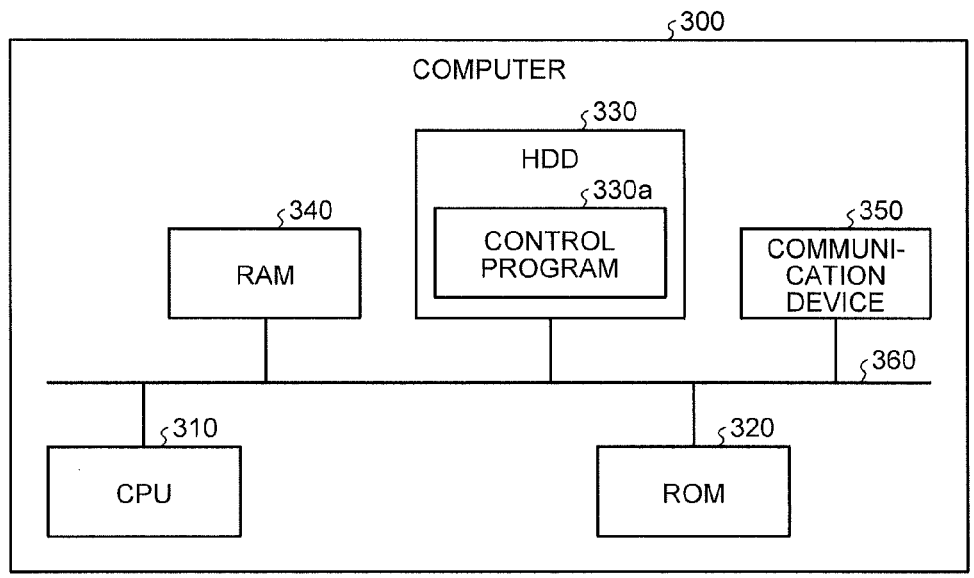
FIG. 50 is a diagram illustrating a computer executing a control program.
FIG. 51 is a diagram for describing an example of an anonymizing technique.
Figure 52:
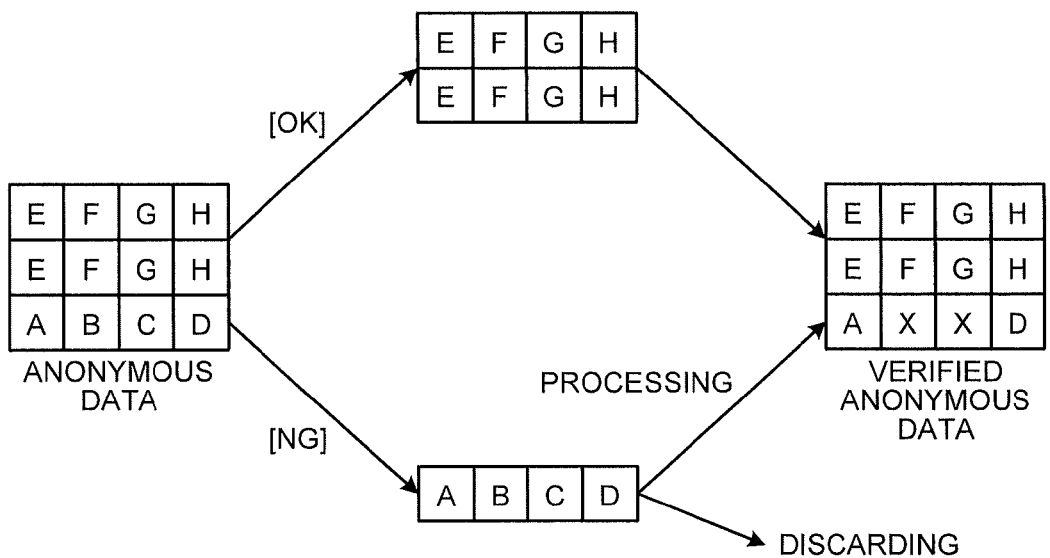
FIG. 52 is a diagram for describing an example of a related art.
Figure 53:
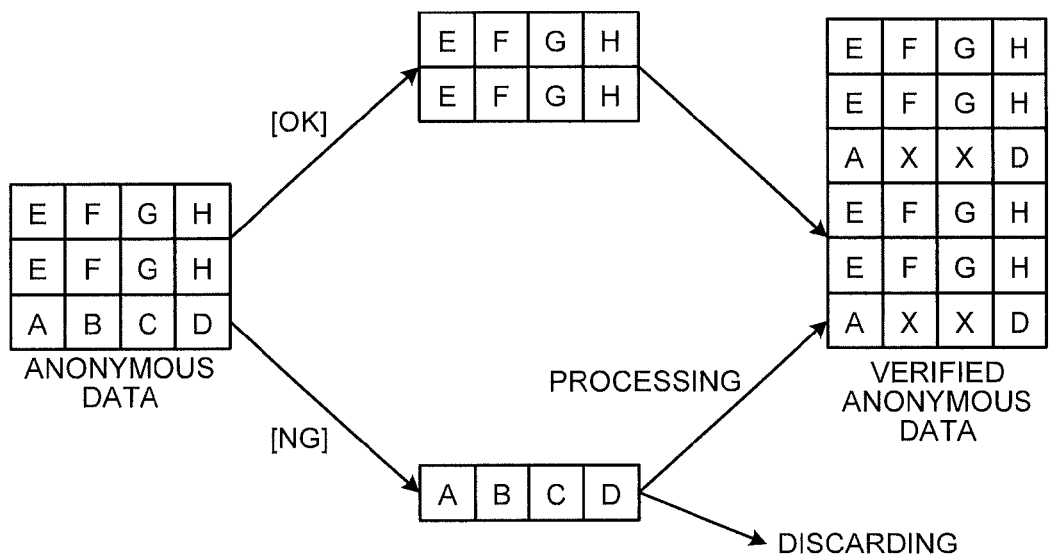
FIG. 53 is a diagram for describing an example of a related art.

Further, various kinds of processing of the information processing devices 6 and 18 described in the above embodiments may be implemented by executing a previously prepared control program through a computer system such as a personal computer or a workstation. In this regard, the following description will proceed with an example of a computer for executing a control program having the same function as the information processing devices 6 and 18 described in the above embodiments with reference to FIG. 50. FIG. 50 is a diagram illustrating a computer executing a control program.

A computer 300 includes a CPU 310, a ROM 320, a hard disk drive (HDD) 330, a RAM 340, and a communication device 350 as illustrated in FIG. 50. The CPU 310, the ROM 320, the HDD 330, the RAM 340, and the communication device 350 are connected with one another via a bus 360.

The ROM 320 stores a basic program such as an operating system (OS). The HDD 330 stores a control program 330a that performs the same functions as the collecting unit 9a, the determining unit 9b, the anonymizing unit 9c, the verifying unit 9d and 20d, the distribution control unit 9e and 20e, the update control unit 9f and 20f, the deletion control unit 9g and 20g, and the managing unit 9h described in the above embodiments. The control program 330a may be appropriately separated. The HDD 330 is provided with collection data, anonymous data, definition data, a duplication number TBL, an NG data TBL, a distributed data TBL, an ID TBL, a group ID TBL, a group ID string TBL, and an NGID TBL. The collection data, the anonymous data, the definition data, the duplication number TBL, the NG data TBL, and the distributed data TBL correspond to the collection data 8a, the anonymous data 8b, the definition data 8c, the duplication number TBL 8d, the NG data TBL 8e, and the distributed data TBL 8f, respectively. The ID TBL, the group ID TBL, the group ID string TBL, and the NGID TBL correspond to the ID TBL 8g, the group ID TBL 19a, the group ID string TBL 19c, and the NGID TBL 19b, respectively.

The CPU 310 reads the control program 330a from the HDD 330 and executes the control program 330a.

Further, the CPU 310 reads the collection data, the anonymous data, the definition data, the duplication number TBL, the NG data TBL, the distributed data TBL, the ID TBL, the group ID TBL, the group ID string TBL, and the NGID TBL, and stores the read information in the RAM 340. Further, the CPU 310 executes the control program 330a using various kinds of data stored in the RAM 340. All the data stored in the RAM 340 needs not be necessarily stored in the RAM 340. Data used for processing is preferably stored in the RAM 340.

The control program 330a needs not be stored in the HDD 330 from the initial stage.

For example, the control program 330a may be stored in a "portable physical medium" such as a flexible disk (FD), a CD-ROM, a DVD disc, a magnetic optical disc, or an IC card which is inserted into the computer 300. Then, the computer 300 may read the control program 330a from the portable physical medium and then executes the control program 330a.

In addition, the control program 330a may be stored in "another computer (or server)" connected to the computer 300 via a public line, the Internet, a LAN, a WAN, or the like. Then, the computer 300 may read the program 330a from another computer (or server) and then execute the program 330a.

It is possible to suppress the amount of data determined not to satisfy a predetermined inter-data condition among pieces of data included in a data group.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory, recording medium having stored therein a control program that causes a computer to execute a process, the process comprising:
   first counting the number of data having a predetermined relation on data included in a first data group;
   performing control such that a plurality of data having the predetermined relation is output to an output destination when the first counted number is a predetermined number or more, the predetermined number being a natural number greater than 1;
   second counting the number of data having the predetermined relation on data included in the first data group and a second data group different from the first data group; and
   performing control such that data included in the second data group among a plurality of data having the predetermined relation on data included in the first data group and the second data group is output to the output destination when the second counted number is the predetermined number or more.

2. The computer-readable, non-transitory, recording medium according to claim 1, wherein the process further comprises:
   anonymizing data included in the first data group having the predetermined relation when the first counted number is less than the predetermined number;
   performing control such that the anonymized data is output to the output destination;
   anonymizing data included in the second data group among a plurality of data having the predetermined relation on data included in the first data group and the second data group when the second counted number is less than the predetermined number; and
   performing control such that the anonymized data is output to the output destination.

3. The computer-readable, non-transitory, recording medium according to claim 2, wherein the process further comprises:
   counting the number of data having the predetermined relation on updated update target data; and
   performing control such that an instruction for releasing anonymity on data having the predetermined relation with updated update target data is output to the output destination when the number of data having the predetermined relation which is counted on the updated update target data is the predetermined number.

4. The computer-readable, non-transitory, recording medium according to claim 3, wherein the process further comprises:
   performing control such that the updated update target data is output to the output destination when the number of data having the predetermined relation which is counted on the updated update target data is the predetermined number or more.

5. The computer-readable, non-transitory, recording medium according to claim 3, wherein the process further comprises:
   anonymizing the updated update target data when the number of data having the predetermined relation which is counted on the updated update target data is less than the predetermined number; and
   performing control such that the anonymized updated update target data is output to the output destination.

6. The computer-readable, non-transitory, recording medium according to claim 1,
   wherein the first counting includes counting the number of data having the predetermined relation on data included in the first data group and storing the first counted number as a count number and the data having the predetermined relation in a storage unit in association with each other, and
   the second counting includes counting the number of data that has the predetermined relation on the data stored in the storage unit and data included in the second data group and is included in the second data group and updating the count number stored in the storage unit in association with the data having the predetermined relation based on the second counted number.

7. The computer-readable, non-transitory, recording medium according to claim 1,
   wherein the first counting includes storing an identifier in a storage unit in association with each data included in the first data group, the identifier being different for each combination of data having the predetermined relation included in the first data group, and counting the number of identifiers stored in the storage unit, and
   the second counting includes storing an identifier in the storage unit in association with each data included in the second data group, the identifier being different for each combination of data having the predetermined relation with the data stored in the storage unit and the data included in the second data group, and counting the number of identifiers stored in the storage unit.

8. The computer-readable, non-transitory, recording medium according to claim 1, wherein the process further comprises:
   counting the number of data having the predetermined relation on update target data, which is to be updated, included in the first data group or the second data group when the update target data is updated; and
   performing control such that an instruction for anonymizing data having the predetermined relation with the update target data to be updated is output to the output destination when the number of data having the predetermined relation which is counted on the update target data to be updated is the predetermined number minus one.

9. The computer-readable, non-transitory, recording medium according to claim 1, wherein the process further comprises:
   counting the number of data having the predetermined relation on data included in the first data group or the second data group when data included in the data having the predetermined relation is deleted; and
   performing control such that an instruction for anonymizing data having the predetermined relation with the deleted data is output to the output destination when the counted number is the predetermined number minus one.

10. The computer-readable, non-transitory, recording medium according to claim 1,
    wherein the predetermined relation includes a relation in which a predetermined part of data and the predetermined part of another data are in common.

11. An information processing device, comprising:
    a memory; and
    a processor coupled to the memory, wherein the processor executes a process comprising:
    first counting the number of data having a predetermined relation on data included in a first data group;

outputting a plurality of data having the predetermined relation to an output destination when the number counted by the first counting is a predetermined number or more, the predetermined number being a natural number greater than 1;

second counting the number of data having a predetermined relation on data included in the first data group and a second data group different from the first data group; and outputting data included in the second data group to the output destination among a plurality of data having the predetermined relation on data included in the first data group and the second data group when the number counted by the second counting is the predetermined number or more.

12. A system, comprising:

a first server that includes an output unit outputting a first data group including a plurality of data and a second data group being different from the first data group and including a plurality of data;

an information processing device including a counting unit that counts a first number of data having a predetermined relation on data included in the first data group when the first data group is output from the first server, and counts a second number of data having a predetermined relation on data included in the first data group and the second data group when the second data group is output from the first server, and an output unit that outputs a plurality of data having the predetermined relation on the data included in the first data group when the first number is a predetermined number or more, the predetermined number being a natural number greater than 1, and outputs the data included in the second data group among a plurality of data having the predetermined relation on the data included in the first data group and the second data group when the second number is the predetermined number or more; and a second server including a processing executing unit that executes predetermined processing based on data output from the information processing device.

* * * * *